US008885956B2

(12) United States Patent
Sato

(10) Patent No.: US 8,885,956 B2
(45) Date of Patent: Nov. 11, 2014

(54) IMAGE PROCESSING DEVICE AND METHOD

(75) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 348 days.

(21) Appl. No.: 13/380,478

(22) PCT Filed: Jun. 23, 2010

(86) PCT No.: PCT/JP2010/060605
§ 371 (c)(1),
(2), (4) Date: Dec. 22, 2011

(87) PCT Pub. No.: WO2011/001865
PCT Pub. Date: Jan. 6, 2011

(65) Prior Publication Data
US 2012/0093426 A1    Apr. 19, 2012

(30) Foreign Application Priority Data

Jul. 1, 2009 (JP) ............................. P2009-156563
Oct. 23, 2009 (JP) ............................. P2009-244753

(51) Int. Cl.

| G06K 9/64 | (2006.01) |
| H04N 19/159 | (2014.01) |
| H04N 19/117 | (2014.01) |
| H04N 19/82 | (2014.01) |
| G06T 9/00 | (2006.01) |
| H04N 19/46 | (2014.01) |
| H04N 19/80 | (2014.01) |
| H04N 19/86 | (2014.01) |
| H04N 19/11 | (2014.01) |
| H04N 19/50 | (2014.01) |
| H04N 19/176 | (2014.01) |

(52) U.S. Cl.
CPC ... *H04N 19/00042* (2013.01); *H04N 19/00218* (2013.01); *H04N 19/00066* (2013.01); *H04N 19/00896* (2013.01); *G06T 9/004* (2013.01); *H04N 19/00545* (2013.01); *H04N 19/0089* (2013.01); *H04N 19/00909* (2013.01); *H04N 19/00569* (2013.01); *H04N 19/00278* (2013.01)
USPC .......................................... 382/233; 382/300

(58) Field of Classification Search
None
See application file for complete search history.

(56) References Cited

U.S. PATENT DOCUMENTS 7,876,833 B2 * 1/2011 Segall et al. ............. 375/240.24
2004/0071356 A1 * 4/2004 Sudharsanan et al. ........ 382/244

(Continued)

FOREIGN PATENT DOCUMENTS

| CN | 1596546 A | 3/2005 |
| EP | 1 720 358 | 11/2006 |

(Continued)

OTHER PUBLICATIONS

Dec. 24, 2013, JP Office Action for related Japanese application No. 2009-244753.

(Continued)

*Primary Examiner* — Jingge Wu
(74) *Attorney, Agent, or Firm* — Sherr & Jiang, PLLC

(57) ABSTRACT

The present invention relates to an image processing device and method enabling noise removal to be performed according to images and bit rates.

A low-pass filter setting unit 93 sets, from filter coefficients stored in a built-in filter coefficient memory 94, a filter coefficient corresponding to intra prediction mode information and a quantization parameter. A neighboring image setting unit 81 uses the filter coefficient set by the low-pass filter setting unit 93 to subject neighboring pixel values of a current block from frame memory 72 to filtering processing. A prediction image generating unit 82 performs intra prediction using the neighboring pixel values subjected to filtering processing, from the neighboring image setting unit 81, and generates a prediction image. The present invention can be applied to an image encoding device which encodes with the H.264/AVC format, for example.

11 Claims, 46 Drawing Sheets

(56) References Cited

U.S. PATENT DOCUMENTS

| | | | |
|---|---|---|---|
| 2004/0136458 A1 | 7/2004 | Dahlhoff et al. | |
| 2005/0025236 A1 | 2/2005 | Yan et al. | |
| 2008/0199090 A1* | 8/2008 | Tasaka et al. | 382/233 |
| 2009/0003716 A1* | 1/2009 | Sekiguchi et al. | 382/238 |
| 2009/0034857 A1* | 2/2009 | Moriya et al. | 382/238 |
| 2009/0207911 A1* | 8/2009 | Minamoto | 375/240.03 |
| 2010/0002892 A1* | 1/2010 | Togawa et al. | 381/71.12 |
| 2010/0014763 A1 | 1/2010 | Wittmann et al. | |
| 2010/0098345 A1 | 4/2010 | Andersson et al. | |
| 2011/0026599 A1* | 2/2011 | Andersson et al. | 375/240.16 |
| 2013/0077682 A1* | 3/2013 | Han et al. | 375/240.12 |

FOREIGN PATENT DOCUMENTS

| | | |
|---|---|---|
| JP | 2005-512419 | 4/2005 |
| JP | 2007-150913 | 6/2007 |
| WO | WO 2007/111292 A1 | 10/2007 |
| WO | WO 2008/085109 A1 | 7/2008 |

OTHER PUBLICATIONS

Jun. 12, 2013, EP communication issued for related EP application No. 10794034.8.

Dec. 17, 2012, EPO Communication issued for related EP Application No. 10 79 4034.

Dorea et al., A Direction-Adaptive In-Loop Deartifacting Filter for Video Coding, Thomson Corporate Research, Princeton, NJ 08540, USA.

Huchet et al., Decision Trees for Denoising in H.264/AVC Video Sequences, Radiocommunication and Signal Processing Laboratory, Laval University, Quebec, QC, Canada/Advanced Video Systems Group, Communication Research Center, Ottawa, ON, Canada.

Mar. 18, 2014, Japanese Office Action for related JP application No. 2009-244753.

Feb. 19, 2014, Chinese Office Action for related CN application No. 201080028028.6.

Karczewicz; "Improved Intra Coding", VCEG-AF15, ITU—Telecommunications Standardization Sector, pp. 1-4, (2007).

Chen; "Second Order Prediction (SOP) in P Slice", VCEG-A127, ITU—Telecommunications Standardization Sector, pp. 1-7, (2008).

QUALCOMM Inc.; "Video Coding Using Extended Block Sizes", ITU—Telecommunications Standardization Sector, pp. 1-4, (2009).

English-language translation of International Search Report from the Japanese Patent Office for International Application No. PCT/JP2010/060605, mailing date Sep. 28, 2010.

Aug. 20, 2013, JP communication issued for related JP application No. 2012-194913.

* cited by examiner

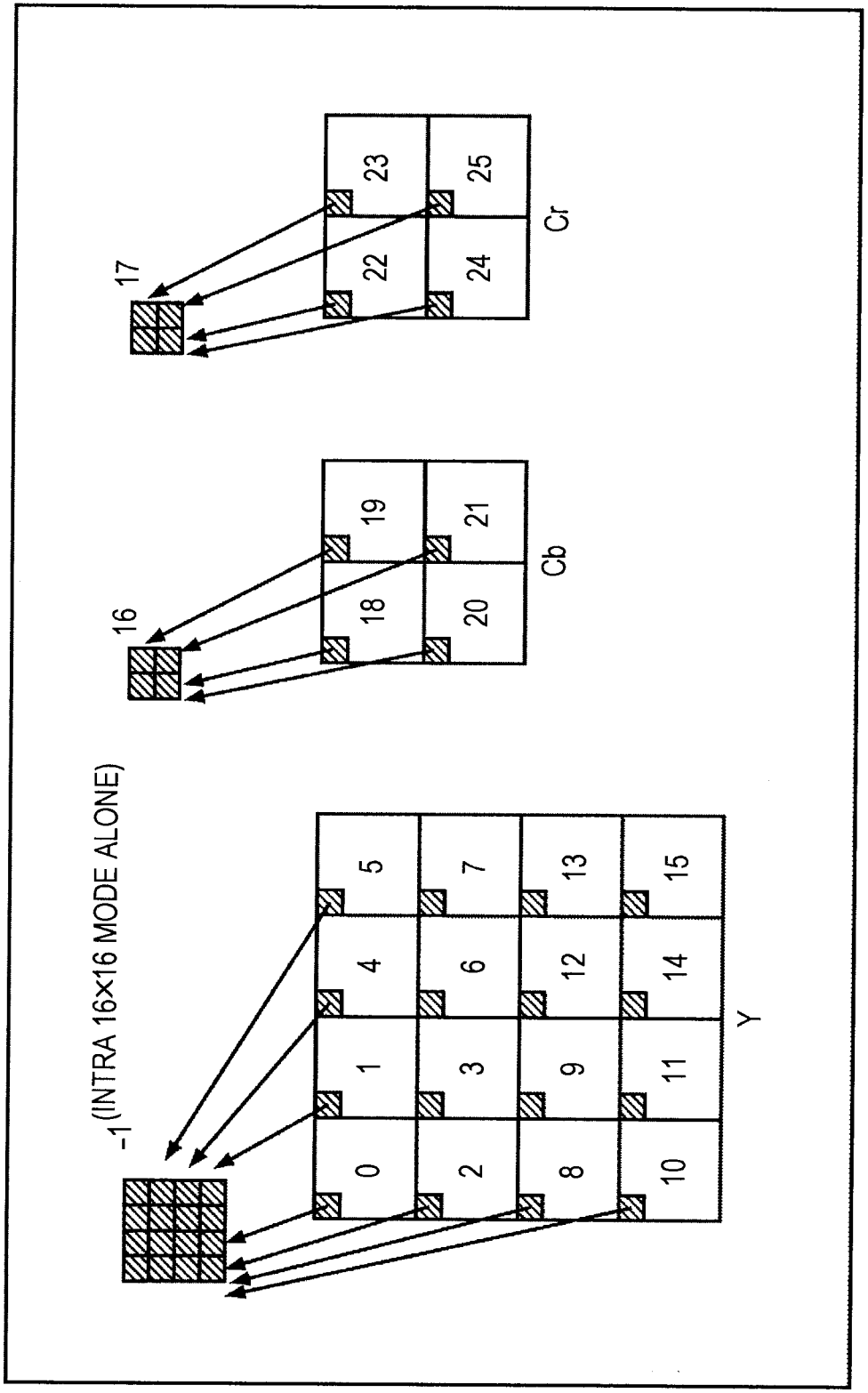

FIG. 3

| Intra4x4PredMode[4x4LumaBlkIdx] | Name of Intra4x4LumaPredMode[4x4LumaBlkIdx] |
|---|---|
| 0 | Intra_4x4_Vertical(prediction mode) |
| 1 | Intra_4x4_Horizontal(prediction mode) |
| 2 | Intra_4x4_DC(prediction mode) |
| 3 | Intra_4x4_Diagonal_Down_Left(prediction mode) |
| 4 | Intra_4x4_Diagonal_Down_Right(prediction mode) |
| 5 | Intra_4x4_Vertical_Right(prediction mode) |
| 6 | Intra_4x4_Horizontal_Down(prediction mode) |
| 7 | Intra_4x4_Vertical_Left(prediction mode) |
| 8 | Intra_4x4_Horizontal_Up(prediction mode) |

FIG. 5
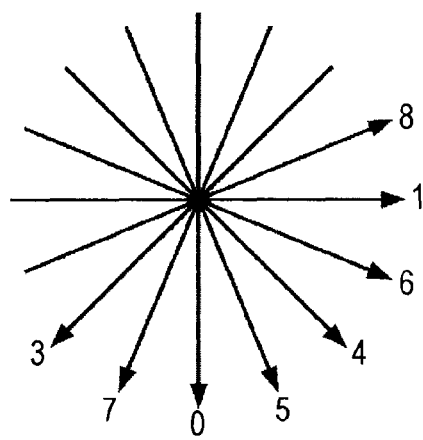
FIG. 6
| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |
FIG. 7
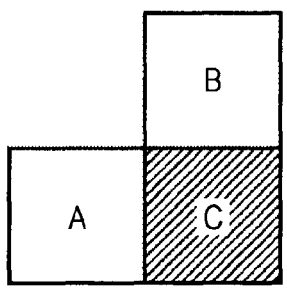

FIG. 9

| Intra8×8LumaPredMode[8×8LumaBlkIdx] | Name of Intra8×8LumaPredMode[8×8LumaBlkIdx] |
|---|---|
| 0 | Intra_8×8_Vertical(prediction mode) |
| 1 | Intra_8×8_Horizontal(prediction mode) |
| 2 | Intra_8×8_DC(prediction mode) |
| 3 | Intra_8×8_Diagonal_Down_Left(prediction mode) |
| 4 | Intra_8×8_Diagonal_Down_Right(prediction mode) |
| 5 | Intra_8×8_Vertical_Right(prediction mode) |
| 6 | Intra_8×8_Horizontal_Down(prediction mode) |
| 7 | Intra_8×8_Vertical_Left(prediction mode) |
| 8 | Intra_8×8_Horizontal_Up(prediction mode) |

FIG. 10

| Intra_16×16_pred_mode | Name of Intra_16×16_pred_mode |
|---|---|
| 0 | Intra_16×16_Vertical(prediction_mode) |
| 1 | Intra_16×16_Horizontal(prediction_mode) |
| 2 | Intra_16×16_DC(prediction_mode) |
| 3 | Intra_16×16_Plane(prediction_mode) |

| Intra_chroma_pred_mode | Name of Intra_chroma_pred_mode |
|---|---|
| 0 | Intra_chroma_DC(prediction mode) |
| 1 | Intra_chroma_Horizontal(prediction mode) |
| 2 | Intra_chroma_Vertical(prediction mode) |
| 3 | Intra_chroma_Plane(prediction mode) |

FIG. 15

| $b_{-1}$ | $b_0$ | $b_1$ | $b_2$ | $b_3$ | $b_4$ |
|---|---|---|---|---|---|
| | $a_{00}$ | $a_{01}$ | $a_{02}$ | $a_{03}$ | |
| | $a_{10}$ | $a_{11}$ | $a_{12}$ | $a_{13}$ | |
| | $a_{20}$ | $a_{21}$ | $a_{22}$ | $a_{23}$ | |
| | $a_{30}$ | $a_{31}$ | $a_{32}$ | $a_{33}$ | |

IMAGE PROCESSING DEVICE AND METHOD

TECHNICAL FIELD

The present invention relates to an image processing device and method, and specifically relates to an image processing device and method which enable prediction efficiency to be improved.

BACKGROUND ART

In recent years, there have come into widespread use devices which subject an image to compression encoding by employing an encoding format for handling image information as digital signals, and taking advantage of redundancy peculiar to the image information with transmission and storage of high effective information taken as an object at that time to compress the image by orthogonal transform such as discrete cosine transform or the like and motion compensation. Examples of this encoding method include MPEG (Moving Picture Experts Group) and so forth.

In particular, MPEG2 (ISO/IEC 13818-2) is defined as a general-purpose image encoding format, and is a standard encompassing both of interlaced scanning images and sequential-scanning images, and standard resolution images and high definition images. For example, MPEG2 has widely been employed now by broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example. Also, by employing the MPEG2 compression format, a code amount (bit rate) of 18 through 22 Mbps is allocated in the event of an interlaced scanning image of high resolution having 1920×1088 pixels, for example. Thus, a high compression rate and excellent image quality can be realized.

With MPEG2, high image quality encoding adapted to broadcasting usage is principally taken as a object, but a lower code amount (bit rate) than the code amount of MPEG1, i.e., an encoding format having a higher compression rate is not handled. According to spread of personal digital assistants, it has been expected that needs for such an encoding format will be increased from now on, and in response to this, standardization of the MPEG4 encoding format has been performed. With regard to an image encoding format, the specification thereof was confirmed as international standard as ISO/IEC 14496-2 in December in 1998.

Further, in recent years, standardization of a standard serving as H.26L (ITU-T Q6/16 VCEG) has progressed with image encoding, originally intended for television conference usage. With H.26L, it has been known that as compared to a conventional encoding format such as MPEG2 or MPEG4, though greater computation amount is requested for encoding and decoding thereof, higher encoding efficiency is realized. Also, currently, as part of activity of MPEG4, standardization for also taking advantage of a function that is not supported by H.26L with this H.26L taken as a base, to realize higher encoding efficiency, has been performed as Joint Model of Enhanced-Compression Video Coding. As a schedule of standardization, H.264 and MPEG-4 Part10 (Advanced Video Coding, hereafter referred to as H.264/AVC) become an international standard in March, 2003.

Further, as an extension thereof, standardization of FRExt (Fidelity Range Extension) including a coding tool necessary for business use such as RGB, 4:2:2, or 4:4:4, 8×8DCT and quantization matrix stipulated by MPEG-2 has been completed in February, 2005. Thus, H.264/AVC has become a encoding format capable of suitably expressing even film noise included in movies, and has been employed for wide ranging applications such as Blu-Ray Disc (registered trademark) and so forth.

However, nowadays, needs for further high-compression encoding have been increased, such as intending to compress an image having around 4000×2000 pixels, which is quadruple of a high-vision image. Alternatively, needs for further high-compression encoding have been increased, such as intending to distribute a high-vision image within an environment with limited transmission capacity like the Internet. Therefore, with the above-mentioned VCEG (=Video Coding Expert Group) under the control of ITU-T, studies relating to improvement of encoding efficiency have continuously been performed.

Now, one factor that can be given why the H.264/AVC format realizes high encoding efficiency as compared to the conventional MPEG2 format or the like is employing an intra prediction method.

With the intra prediction method, the intra prediction modes of nine kinds of 4×4 pixel and 8×8 pixel block units, and four kinds of 16×16 pixel macro block units are determined regarding luminance signals. The intra prediction modes of four kinds of 8×8 pixel block units are determined regarding color difference signals. The intra prediction modes for color difference signals may be set independently from the intra prediction modes for luminance signals.

There are particular patterns for each intra prediction mode regarding how residual following such intra prediction is manifested.

As a method to eliminate such redundancy and further raise encoding efficiency, NPL 1 proposes the following method.

That is to say, intra image encoding processing is performed by normal H.264/AVC format using training signals in offline processing beforehand, orthogonal transform such as Karhunen-Loéve transform or the like is performed for each intra prediction mode as to each block, and optimal transform coefficients are calculated.

Then, in the actual encoding processing, processing using orthogonal transform coefficients optimized for each mode by the aforementioned Karhunen-Loéve transform are used instead of the orthogonal transform stipulated by the H.264/AVC format.

Also, NPL 2 proposes a method of combining the aforementioned intra prediction with inter prediction.

That is to say, with NPL 2, difference information is generated as to motion vector information obtained in inter prediction not only for a current block but also for neighboring pixel values around the current block. Performing intra prediction between the difference information relating to the current block, and the difference information relating to neighboring pixels, generated in this way, generates second order difference information. The generated second order difference information is then subjected to orthogonal transform and quantization, and output downstream along with a compressed image.

Thus, encoding efficiency is further improved.

Also, as described above, the macro block size is 16×16 pixels with the H.264/AVC format. However, a macro block size of 16×16 pixels is not optimal for large image frames such as UHD (Ultra High Definition; 4000×2000 pixels) which will be handled by next-generation encoding methods.

Accordingly, NPL 3 and so forth propose enlarging the macro block size to a size of 32×32 pixels, for example.

CITATION LIST

Non Patent Literature

NPL 1: "Improved Intra Coding", VCEG-AF15, ITU-Telecommunications Standardization Sector STUDY GROUP Question 6 Video coding Experts Group (VCEG), 20-21 Apr. 2007

NPL 2: "Second Order Prediction (SOP) in P Slice", Sijia Chen, Jinpeng Wang, Shangwen Li and, Lu Yu, VCEG-AD09, ITU-Telecommunications Standardization Sector STUDY GROUP Question 6 Video coding Experts Group (VCEG), 16-18 Jul. 2008

NPL 3: "Video Coding Using Extended Block Sizes", VCEG-AD09, ITU-Telecommunications Standardization Sector STUDY GROUP Question 16—Contribution 123, January 2009

SUMMARY OF INVENTION

Technical Problem

Now, with the H.264/AVC format, low-pass filter processing of pixel values of neighboring pixels is performed before performing intra prediction in increments of blocks of 8×8 pixels describe above. Thus, noise included in the neighboring pixels is removed, and correlation is raised, so higher encoding efficiency can be realized.

However, regardless the fact that the degree of included noise differs according to the input images, quantization parameter values, intra prediction modes, and so forth, the low-pass filter for removing the noise has been fixed with the H.264/AVC format. That is to say, this low-pass filter has not been optimal in accordance with input images, quantization parameter values, intra prediction modes, and so forth.

Also, with the H.264/AVC format, the noise removal of pixel values of neighboring pixels described above is only performed with the intra prediction mode in increments of blocks of 8×8 pixels, and has not been applied for other modes.

The present invention has been made in light of this situation, and realizes noise removal in accordance with images and bit rates, thereby improving prediction efficiency.

Solution to Problem

An image processing device according to a first aspect of the present invention includes: decoding means configured to decode an image of a current block which is to be the object of decoding processing; filter setting means configured to set, in accordance with the current block, a coefficient to be used for filtering processing to which neighboring pixels of the current block are to be subjected to, used for intra prediction of the current block, in accordance with an encoding parameter; and intra prediction means configured to subject the neighboring pixels to the filtering processing using the coefficient set by the filter setting means, and performing intra prediction of the current block.

The encoding parameter may include a mode of intra prediction of the current block, or a quantization parameter of the current block; the decoding means may decode the mode of intra prediction of the current block or the quantization parameter of the current block; and the filter setting means may set the coefficient in accordance with the mode of intra prediction decoded by the decoding means, or the quantization parameter decoded by the decoding means.

The image processing device may further include: filter coefficient storage means configured to store the coefficient; wherein the coefficient is calculated so as to obtain, with a learning image, the smallest residual between a learning block which is the object of encoding processing, and a prediction image obtained by performing intra prediction for the learning block corresponding to a mode of intra prediction of the learning block or a quantization parameter of the learning block, and is stored in the filter coefficient storage means; and wherein the filter setting means set, as the coefficient, that from the coefficients stored in the filter coefficient storage means which corresponds to the mode of intra prediction of the current block, or the quantization parameter of the current block.

The filter coefficient storage means may hold the coefficient as an n-bit (wherein n is an integer) value in accordance with a register length of a processor.

The decoding means may decode the coefficient, which has been calculated at an encoding side using the neighboring pixels prior to being subjected to the filtering processing such that the residual as to a prediction image obtained by intra prediction being performed regarding the current block is smallest, and which has been set corresponding to the current block, and to the mode of intra prediction of the current block or the quantization parameter of the current block; and the filter setting means may set, as the coefficient, that from the coefficients decoded by the decoding means which corresponds to the mode of intra prediction of the current block, or the quantization parameter of the current block.

The coefficient may be configured of a filter coefficient and offset value.

The filter coefficient may be configured of three taps.

The filter coefficient may have symmetry centered on a coefficient corresponding to zero-phase.

The decoding means may decode the mode of intra prediction of the current block; and the filter setting means may take, of modes of intra prediction, a vertical mode or horizontal mode as a first class, and other modes as a second class, and, in the event that the mode of intra prediction of the current block belongs to the first class, set the coefficient corresponding to the first class, and in the event that the mode of intra prediction of the current block which has been decoded belongs to the second class, set the coefficient corresponding to the second class.

The image processing device may further include: receiving means configured to receive flag information indicating whether or not to perform the filtering processing as to the neighboring pixels; wherein the filter setting means set whether or not to perform the filtering processing as to the neighboring pixels, based on flag information received by the receiving means.

The receiving means may receive the flag information in increments of macro blocks; and the filter setting means may set whether or not to perform the filter processing as to the neighboring pixels, in increments of macro blocks, based on flag information received by the receiving means.

The receiving means may receive the flag information in increments of blocks; and the filter setting means may set whether or not to perform the filter processing as to the neighboring pixels, in increments of blocks, based on flag information received by the receiving means.

An image processing method according to the first aspect of the present invention includes the steps of: an image processing device performing decoding of an image of a current block which is to be the object of decoding processing; setting of, in accordance with the current block, a coefficient to be used for filtering processing to which neighboring pixels of the current block are to be subjected to, used for intra prediction of the current block, in accordance with an encoding parameter; and subjecting the neighboring pixels to the filtering processing using the coefficient that has been set, and performing intra prediction of the current block.

An image processing device according to a second aspect of the present invention includes: filter setting means configured to set a coefficient to be used for filtering processing to which neighboring pixels of a current block which is to be the object of decoding processing are to be subjected to, used for intra prediction of the current block, in accordance with an encoding parameter; intra prediction means configured to subject the neighboring pixels to the filtering processing using the coefficient set by the filter setting means, and performing intra prediction of the current block; and encoding means configured to encode an image of the current block.

The encoding parameter may include a mode of intra prediction of the current block, or a quantization parameter of the current block; and the filter setting means may set the coefficient in accordance with the mode of intra prediction of the current block, or the quantization parameter of the current block; and the encoding means may encode the corresponding mode of intra prediction of the current block or quantization parameter of the current block.

The image processing device may further include: filter coefficient storage means configured to store the coefficient; wherein the coefficient is calculated so as to obtain, with a learning image, the smallest residual between a learning block which is the object of encoding processing, and a prediction image obtained by performing intra prediction for the learning block corresponding to a mode of intra prediction of the learning block or a quantization parameter of the learning block, and is stored in the filter coefficient storage means; and wherein the filter setting means set, as the coefficient, that from the coefficients stored in the filter coefficient storage means which corresponds to the mode of intra prediction of the current block, or the quantization parameter of the current block.

The image processing device may further include: filter coefficient calculating means configured to calculate the coefficient such that the residual between the current block, and a prediction image obtained by intra prediction being performed regarding the current block, using the neighboring pixels prior to being subjected to the filtering processing in accordance with the mode of intra prediction of the current block or the quantization parameter of the current block is smallest; wherein the filter setting means set, as the coefficient, that from the coefficients calculated by the filter coefficient calculating means which corresponds to the mode of intra prediction of the current block, or the quantization parameter of the current block; and wherein the encoding means further encode the coefficient.

The coefficient may be configured of a filter coefficient and offset value.

The filter setting means may set whether or not to perform the filtering processing as to the neighboring pixels; and the encoding means may encode flag information indicating whether or not to perform the filtering processing set by the filter setting means.

An image processing method according to the second aspect of the present invention includes the steps of: an image processing device performing setting of a coefficient to be used for filtering processing to which neighboring pixels of a current block which is to be the object of decoding processing are to be subjected to, used for intra prediction of the current block, in accordance with an encoding parameter; subjecting the neighboring pixels to the filtering processing using the coefficient that has been set, and performing intra prediction of the current block; and encoding an image of the current block.

With the first aspect of the present invention, an image of a current block which is to be the object of decoding processing is decoded, a coefficient is set, which is to be used for filtering processing to which neighboring pixels of the current block are to be subjected to which are used for intra prediction of the current block, in accordance with an encoding parameter. The neighboring pixels are then subjected to the filtering processing using the coefficient that has been set, and intra prediction of the current block is performed.

With the second aspect of the present invention, an a coefficient is set, to be used for filtering processing to which neighboring pixels of a current block which is to be the object of decoding processing are to be subjected to which are used for intra prediction of the current block, in accordance with an encoding parameter, the neighboring pixels are subjected to the filtering processing using the coefficient that has been set, intra prediction of the current block is performed, and an image of the current block is encoded.

Note that the above-described image processing devices may be stand-alone devices, or may be internal blocks making up one image encoding device or image decoding device.

Advantageous Effects of Invention

According to the first invention, images can be decoded. Also, according to the second invention, noise removal can be performed in accordance with the image and the bit rate.

According to the second invention, images can be encoded. Also, according to the first invention, noise removal can be performed in accordance with the image and the bit rate.

BRIEF DESCRIPTION OF DRAWINGS

FIG. 2 is a diagram for describing processing sequence in the event of a 16×16 pixel intra prediction mode.

FIG. 3 is a diagram illustrating the kinds of 4×4 pixel intra prediction modes for luminance signals.

FIG. 5 is a diagram for describing the direction of 4×4 pixel intra prediction.

FIG. 6 is a diagram for describing 4×4 pixel intra prediction.

FIG. 7 is a diagram for describing encoding of the 4×4 pixel intra prediction modes for luminance signals.

FIG. 9 is a diagram illustrating the kinds of 8×8 pixel intra prediction modes for luminance signals.

FIG. 10 is a diagram illustrating the kinds of 16×16 pixel intra prediction modes for luminance signals.

FIG. 15 is a diagram for describing calculation of filter coefficients.

DESCRIPTION OF EMBODIMENTS

Hereinafter, embodiments of the present invention will be described with reference to the drawings. Note that description will proceed in the following order.
1. First Embodiment (neighboring pixel interpolation filter switching: example of intra prediction)
2. Second Embodiment (neighboring pixel interpolation filter switching: example of second order prediction)
3. Third Embodiment (neighboring pixel interpolation filter on/off control: example of intra prediction)
4. Fourth Embodiment (neighboring pixel interpolation filter on/off control: example of second order prediction)

1. First Embodiment

Configuration Example of Image Encoding Device

Figure 1:
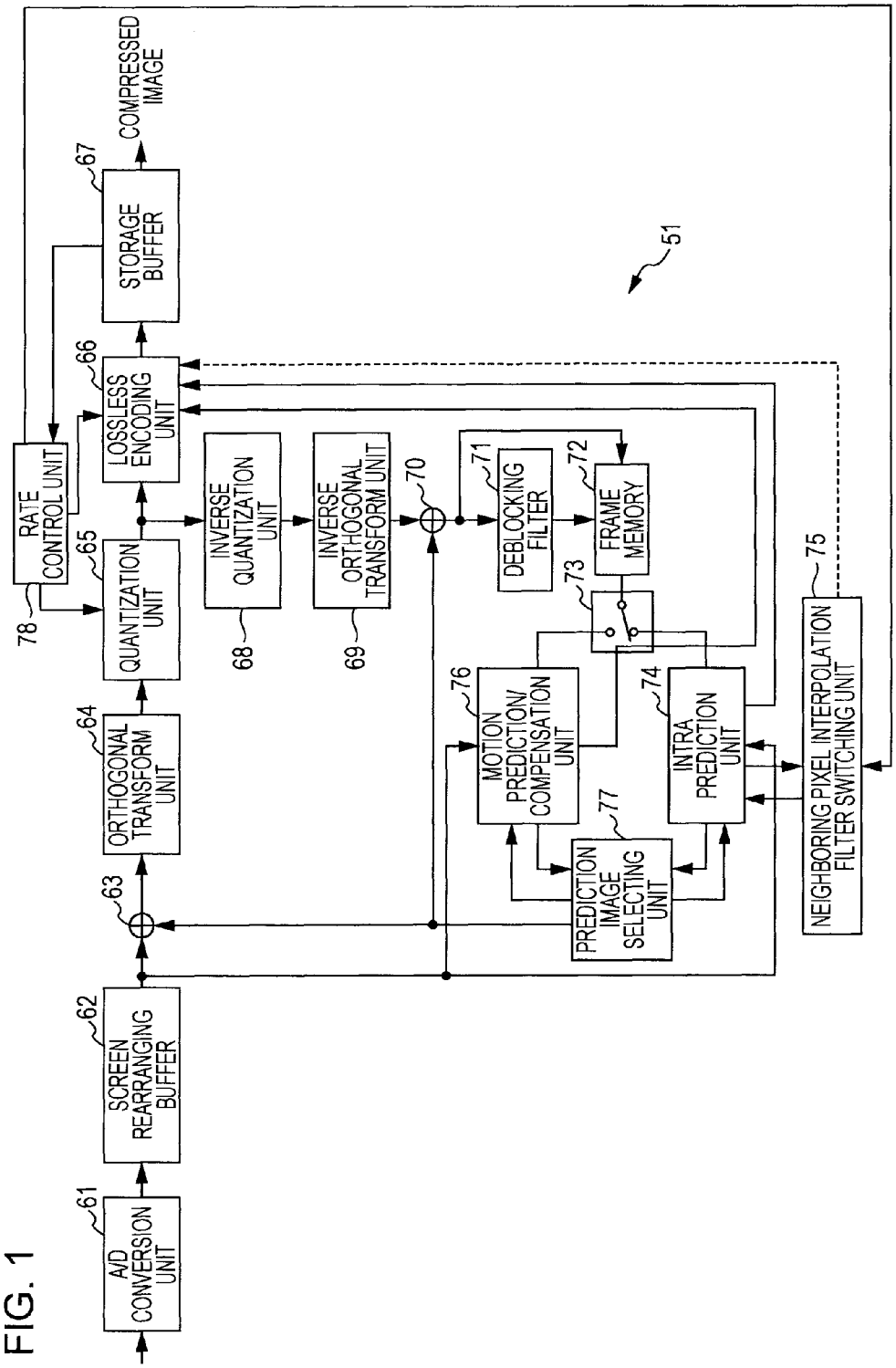
FIG. 1 is a block diagram illustrating the configuration of an embodiment of an image encoding device to which the present invention has been applied.

FIG. 1 represents the configuration of an embodiment of an image encoding device serving as an image processing device to which the present invention has been applied.

This image encoding device 51 subjects an image to compression encoding using, for example, the H.264 and MPEG-4 Part10 (Advanced Video Coding) (hereafter, described as H.264/AVC) format.

With the example in FIG. 1, the image encoding device 51 is configured of an A/D conversion unit 61, a screen rearranging buffer 62, a computing unit 63, an orthogonal transform unit 64, a quantization unit 65, a lossless encoding unit 66, an storing buffer 67, an inverse quantization unit 68, an inverse orthogonal transform unit 69, a computing unit 70, a deblocking filter 71, frame memory 72, a switch 73, an intra prediction unit 74, a neighboring pixel interpolation filter switching unit 75, a motion prediction/compensation unit 76, a prediction image selecting unit 77, and a rate control unit 78.

The A/D conversion unit 61 converts an input image from analog to digital, and outputs to the screen rearranging buffer 62 for storing. The screen rearranging buffer 62 rearranges the images of frames in the stored order for display into the order of frames for encoding according to GOP (Group of Picture).

The computing unit 63 subtracts from the image read out from the screen rearranging buffer 62 the prediction image from the intra prediction unit 74 selected by the prediction image selecting unit 77 or the prediction image from the motion prediction/compensation unit 76, and outputs difference information thereof to the orthogonal transform unit 64. The orthogonal transform unit 64 subjects the difference information from the computing unit 63 to orthogonal transform, such as discrete cosine transform, Karhunen-Loéve transform, or the like, and outputs a transform coefficient thereof. The quantization unit 65 quantizes the transform coefficient that the orthogonal transform unit 64 outputs.

The quantized transform coefficient that is the output of the quantization unit 65 is input to the lossless encoding unit 66, where it is subjected to lossless encoding, such as variable length coding, arithmetic coding, or the like, and compressed.

The lossless encoding unit 66 obtains information indicating intra prediction and so forth from the intra prediction unit 74, and obtains information indicating an inter prediction mode, and so forth from the motion prediction/compensation unit 76. Note that the information indicating intra prediction will also be referred to as intra prediction mode information hereinafter. Also, the information indicating inter prediction will also be referred to as inter prediction mode information hereinafter.

The lossless encoding unit 66 encodes the quantized transform coefficient, and also encodes the information indicating intra prediction, the information indicating an inter prediction mode, quantization parameters, and so forth, and takes these as part of header information in the compressed image. The lossless encoding unit 66 supplies the encoded data to the storing buffer 67 for storage.

For example, with the lossless encoding unit 66, lossless encoding processing, such as variable length coding, arithmetic coding, or the like, is performed. Examples of the variable length coding include CAVLC (Context-Adaptive Variable Length Coding) determined by the H.264/AVC format. Examples of the arithmetic coding include CABAC (Context-Adaptive Binary Arithmetic Coding).

The storing buffer 67 outputs the data supplied from the lossless encoding unit 66 to, for example, a storage device or transmission path or the like downstream not shown in the drawing, as a compressed image encoded by the H.264/AVC format.

Also, the quantized transform coefficient output from the quantization unit 65 is also input to the inverse quantization unit 68, subjected to inverse quantization, and then subjected to further inverse orthogonal transform at the inverse orthogonal transform unit 69. The output subjected to inverse orthogonal transform is added to the prediction image supplied from the prediction image selecting unit 77 by the computing unit 70, and changed into a locally decoded image. The deblocking filter 71 removes block distortion from the decoded image, and then supplies to the frame memory 72 for storage. An image before the deblocking filter processing is performed by the deblocking filter 71 is also supplied to the frame memory 72 for storage.

The switch 73 outputs the reference images stored in the frame memory 72 to the motion prediction/compensation unit 76 or intra prediction unit 74.

With this image encoding device 51, the I picture, B picture, and P picture from the screen rearranging buffer 62 are supplied to the intra prediction unit 74 as an image to be subjected to intra prediction (also referred to as intra processing), for example. Also, the B picture and P picture read out from the screen rearranging buffer 62 are supplied to the motion prediction/compensation unit 76 as an image to be subjected to inter prediction (also referred to as inter processing).

The intra prediction unit 74 performs intra prediction processing of all of the candidate intra prediction modes based on the image to be subjected to intra prediction read out from the screen rearranging buffer 62, and the reference image supplied from the frame memory 72 to generate a prediction image.

Prior to the intra prediction processing, the intra prediction unit 74 performs filtering professing on neighboring pixels which are pixels used for intra prediction of each current block, and neighboring the current block with a predetermined positional relation. This filtering processing uses a filter coefficient set by a neighboring pixel interpolation filter switching unit 75, in accordance with the intra prediction mode supplied from the intra prediction unit 74, and so forth. That is to say, the intra prediction unit 74 uses, for intra prediction processing of all candidate intra prediction modes, neighboring pixels subjected to filtering processing with filter coefficients set by the neighboring pixel interpolation filter switching unit 75.

The intra prediction unit 74 calculates a cost function value as to the intra prediction mode where the prediction image has been generated, and selects the intra prediction mode where the calculated cost function value gives the minimum value, as the optimal intra prediction mode. The intra prediction unit 74 supplies the prediction image generated in the optimal intra prediction mode, and the cost function value calculated regarding the corresponding optimal intra prediction mode, to the prediction image selecting unit 77.

In the event that the prediction image generated in the optimal intra prediction mode has been selected by the prediction image selecting unit 77, the intra prediction unit 74 supplies information indicating the optimal intra prediction mode to the lossless encoding unit 66. In the event that the information has been transmitted from the intra prediction unit 74, the lossless encoding unit 66 encodes this information, and takes this as part of the header information in the compressed image.

The neighboring pixel interpolation filter switching unit 75 stores the filter coefficients corresponding to quantization parameters and intra prediction modes obtained by performing learning at a learning device 251 in FIG. 28 which will be described later, using a training image.

The neighboring pixel interpolation filter switching unit 75 is supplied with quantization parameters from the rate control unit 78 and intra prediction mode information from the intra prediction unit 74. The neighboring pixel interpolation filter switching unit 75 sets filter coefficients corresponding to the quantization parameters from the rate control unit 78 and the intra prediction mode from the intra prediction unit 74. The neighboring pixel interpolation filter switching unit 75 supplies the set filter coefficients to the intra prediction unit 74.

Note that the neighboring pixel interpolation filter switching unit 75 may perform learning and storing of filter coefficients corresponding to just one, rather than both, of quantization parameters and intra prediction modes.

Also, while the neighboring pixel interpolation filter switching unit 75 stores filter coefficients learned offline beforehand, filter coefficients may be calculated online instead. In this case, filter coefficients set by the neighboring pixel interpolation filter switching unit 75 are output to the lossless encoding unit 66 to be sent to the decoding side, as indicated by the dotted arrow.

The motion prediction/compensation unit 76 performs motion prediction and compensation processing regarding all of the candidate inter prediction modes. Specifically, the motion prediction/compensation unit 76 is supplied with the image to be subjected to inter processing read out from the screen rearranging buffer 62, and the reference image from the frame memory 72 via the switch 73. The motion prediction/compensation unit 76 detects the motion vectors of all of the candidate inter prediction modes based on the image to be subjected to inter processing and the reference image, subjects the reference image to compensation processing based on the motion vectors, and generates a prediction image.

Also, the motion prediction/compensation unit 76 calculates a cost function value as to all of the candidate inter prediction modes. The motion prediction/compensation unit 76 determines, of the calculated cost function values, the prediction mode that provides the minimum value to be the optimal inter prediction mode.

The motion prediction/compensation unit 76 supplies the prediction image generated in the optimal inter prediction mode, and the cost function value thereof to the prediction image selecting unit 77. In the event that the prediction image generated in the optimal inter prediction mode by the prediction image selecting unit 77 has been selected, the motion prediction/compensation unit 76 outputs information indicating the optimal inter prediction mode (inter prediction mode information) to the lossless encoding unit 66.

Note that the motion vector information, flag information, reference frame information, and so forth are output to the lossless encoding unit 66 according to need. The lossless encoding unit 66 also subjects the information from the motion prediction/compensation unit 76 to lossless encoding processing such as variable length coding, arithmetic coding, or the like, and inserts into the header portion of the compressed image.

The prediction image selecting unit 77 determines the optimal prediction mode from the optimal intra prediction mode and the optimal inter prediction mode based on the cost function values output from the intra prediction unit 74 or motion prediction/compensation unit 76. The prediction image selecting unit 77 then selects the prediction image in the determined optimal prediction mode, and supplies to the computing units 63 and 70. At this time, the prediction image selecting unit 77 supplies the selection information of the prediction image to the intra prediction unit 74 or motion prediction/compensation unit 76.

The rate control unit 78 controls the rate of the quantization operation of the quantization unit 65 with quantization parameters, based on a compressed image stored in the storing buffer 67, so as not to cause overflow or under flow.

The quantization parameter used for rate control at the quantization unit 65 is supplied to the lossless encoding unit 66, subjected to lossless encoding processing, and inserted to the header portion of the compressed image. This quantization parameter is supplied to the neighboring pixel interpolation filter switching unit 75, and used for setting filter coefficients used for filter processing to be applied to neighboring pixels.

[Description of Intra Prediction Processing According to H.264/AVC Format]

First, the intra prediction modes determined by the H.264/AVC format will be described.

First, the intra prediction modes as to luminance signals will be described. With the intra prediction modes for luminance signals, three systems of an intra 4×4 prediction mode, an intra 8×8 prediction mode, and an intra 16×16 prediction mode are determined. These are modes for determining block units, and are set for each macro block. Also, an intra prediction mode may be set to color difference signals independently from luminance signals for each macro block.

Further, in the event of the intra 4×4 prediction mode, one prediction mode can be set out of the nine kinds of prediction modes for each 4×4 pixel current block. In the event of the intra 8×8 prediction mode, one prediction mode can be set out of the nine kinds of prediction modes for each 8×8 pixel current block. Also, in the event of the intra 16×16 prediction mode, one prediction mode can be set to a 16×16 pixel current macro block out of the four kinds of prediction modes.

Note that, hereafter, the intra 4×4 prediction mode, intra 8×8 prediction mode, and intra 16×16 prediction mode will also be referred to as 4×4 pixel intra prediction mode, 8×8 pixel intra prediction mode, and 16×16 pixel intra prediction mode as appropriate, respectively.

With the example in FIG. 2, numerals −1 through 25 appended to the blocks represent the bit stream sequence (processing sequence on the decoding side) of the blocks thereof. Note that, with regard to luminance signals, a macro block is divided into 4×4 pixels, and DCT of 4×4 pixels is performed. Only in the event of the intra 16×16 prediction mode, as shown in a block of −1, the DC components of the blocks are collected, a 4×4 matrix is generated, and this is further subjected to orthogonal transform.

On the other hand, with regard to color difference signals, after a macro block is divided into 4×4 pixels, and DCT of 4×4 pixels is performed, as shown in the blocks 16 and 17, the DC components of the blocks are collected, a 2×2 matrix is generated, and this is further subjected to orthogonal transform.

Note that, with regard to the intra 8×8 prediction mode, this may be applied to only a case where the current macro block is subjected to 8×8 orthogonal transform with a high profile or a profile beyond this.

Figure 4:
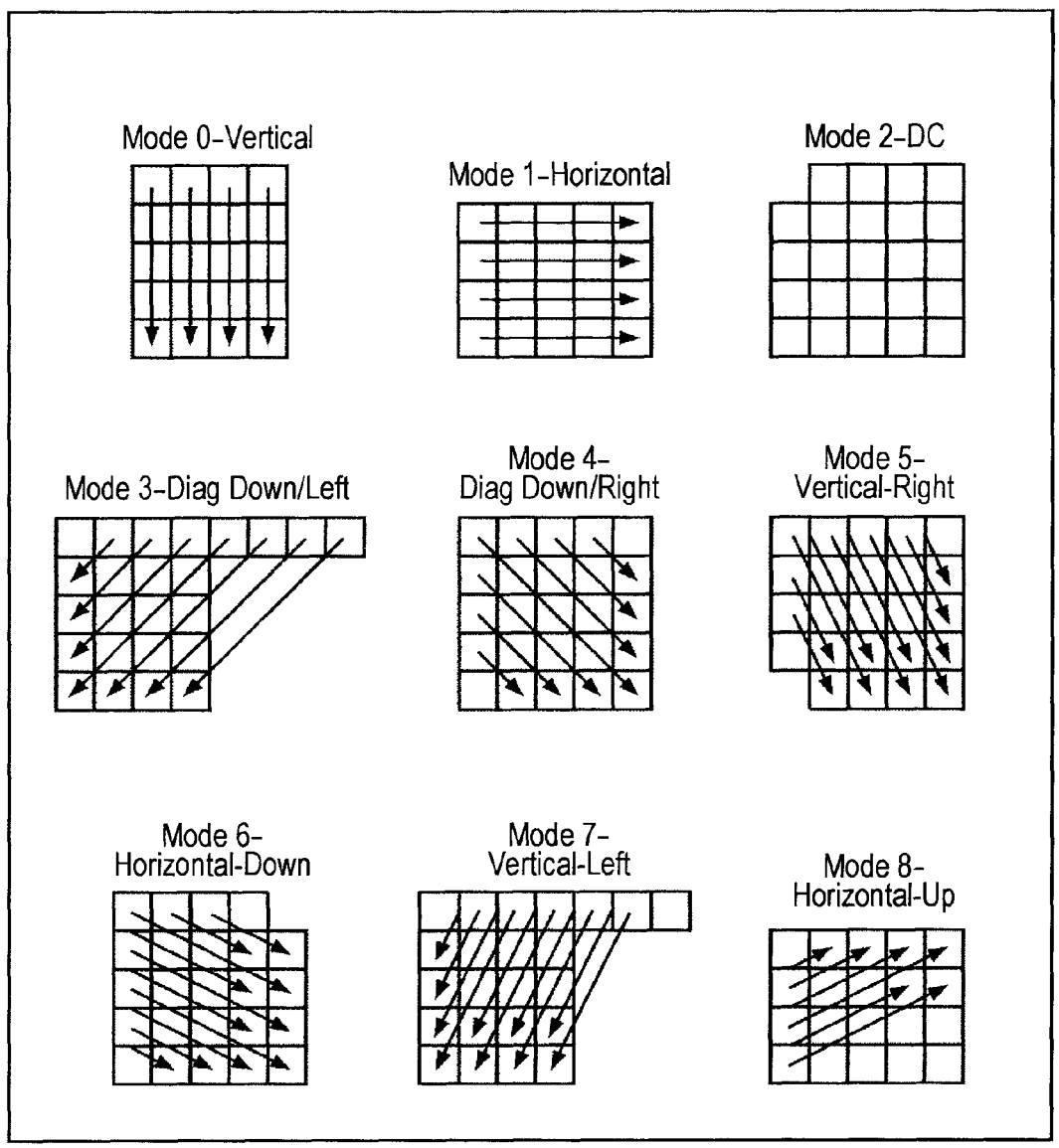
FIG. 4 is a diagram illustrating the kinds of 4×4 pixel intra prediction modes for luminance signals.

FIG. 3 and FIG. 4 are diagrams showing nine kinds of 4×4 pixel intra prediction modes (Intra_4×4_pred_mode) for luminance signals. The eight kinds of modes other than the mode 2 showing average value (DC) prediction correspond to directions indicated with numbers 0, 1, 3 through 8 in FIG. 5, respectively.

The nine kinds of intra_4×4_pred_mode will be described with reference to FIG. 6. With the example in FIG. 6, pixels a through p represent the pixels of the current block to be subjected to intra processing, and pixel values A through M represent the pixel values of pixels belonging to a neighboring block. Specifically, the pixels a through p are an image to be processed read out from the screen rearranging buffer 62, and the pixel values A through M are the pixel values of a decoded image to be read out from the frame memory 72 and referenced.

In the case of the intra prediction modes shown in FIG. 3 and FIG. 4, the prediction pixel values of the pixels a through p are generated as follows using the pixel values A through M of the pixels belonging to a neighboring block. Here, that a pixel value is "available" represents that the pixel value is available without a reason such that the pixel is positioned in the edge of the image frame, or has not been encoded yet. On the other hand, that a pixel value is "unavailable" represents that the pixel value is unavailable due to a reason such that the pixel is positioned in the edge of the image frame, or has not been encoded yet.

The mode 0 is a Vertical Prediction mode, and is applied to only a case where the pixel values A through D are "available". In this case, the prediction pixel values of the pixels a through p are generated as with the following Expression (1).

Prediction pixel values of pixels $a, e, i,$ and $m = A$

Prediction pixel values of pixels $b, f, j,$ and $n = B$

Prediction pixel values of pixels $c, g, k,$ and $o = C$

Prediction pixel values of pixels $d, h, l,$ and $p = D$ (1)

The mode 1 is a Horizontal Prediction mode, and is applied to only a case where the pixel values I through L are "available". In this case, the prediction pixel values of the pixels a through p are generated as with the following Expression (2).

Prediction pixel values of pixels $a$, $b$, $c$, and $d=I$

Prediction pixel values of pixels $e$, $f$, $g$, and $h=J$

Prediction pixel values of pixels $i$, $j$, $k$, and $l=K$

Prediction pixel values of pixels $m$, $n$, $o$, and $p=L$ (2)

The mode 2 is a DC Prediction mode, and the prediction pixel value is generated like Expression (3) when the pixel values A, B, C, D, I, J, K, and L are all "available".

$(A+B+C+D+I+J+K+L+4)>>3$ (3)

Also, when the pixel values A, B, C, and D are all "unavailable", the prediction pixel value is generated like Expression (4).

$(I+J+K+L+2)>>2$ (4)

Also, when the pixel values I, J, K, and L are all "unavailable", the prediction pixel value is generated like Expression (5).

$(A+B+C+D+2)>>2$ (5)

Note that, when the pixel values A, B, C, D, I, J, K, and L are all "unavailable", 128 is employed as the prediction pixel value.

The mode 3 is a Diagonal_Down_Left Prediction mode, and is applied to only a case where the pixel values A, B, C, D, I, J, K, L, and M are "available". In this case, the prediction pixel values of the pixels a through p are generated as with the following Expression (6).

Prediction pixel value of pixel $a=(A+2B+C+2)>>2$

Prediction pixel values of pixels $b$ and $e=(B+2C+D+2)>>2$

Prediction pixel values of pixels $c$, $f$, and $i=(C+2D+E+2)>>2$

Prediction pixel values of pixels $d$, $g$, $j$, and $m=(D+2E+F+2)>>2$

Prediction pixel values of pixels $h$, $k$, and $n=(E+2F+G+2)>>2$

Prediction pixel values of pixels $l$ and $o=(F+2G+H+2)>>2$

Prediction pixel value of pixel $p=(G+3H+2)>>2$ (6)

The mode 4 is a Diagonal_Down_Right Prediction mode, and is applied to only a case where the pixel values A, B, C, D, I, J, K, L, and M are "available". In this case, the prediction pixel values of the pixels a through p are generated as with the following Expression (7).

Prediction pixel value of pixel $m=(J+2K+L+2)>>2$

Prediction pixel values of pixels $i$ and $n=(I+2J+K+2)>>2$

Prediction pixel values of pixels $e$, $j$, and $o=(M+2I+J+2)>>2$

Prediction pixel values of pixels $a$, $f$, $k$, and $p=(A+2M+I+2)>>2$

Prediction pixel values of pixels $b$, $g$, and $l=(M+2A+B+2)>>2$

Prediction pixel values of pixels $c$ and $h=(A+2B+C+2)>>2$

Prediction pixel value of pixel $d=(B+2C+D+2)>>2$ (7)

The mode 5 is a Diagonal_Vertical_Right Prediction mode, and is applied to only a case where the pixel values A, B, C, D, I, J, K, L, and M are "available". In this case, the prediction pixel values of the pixels a through p are generated as with the following Expression (8).

Prediction pixel values of pixels $a$ and $j=(M+A+1)>>1$

Prediction pixel values of pixels $b$ and $k=(A+B+1)>>1$

Prediction pixel values of pixels $c$ and $l=(B+C+1)>>1$

Prediction pixel value of pixel $d=(C+D+1)>>1$

Prediction pixel values of pixels $e$ and $n=(I+2M+A+2)>>2$

Prediction pixel values of pixels $f$ and $o=(M+2A+B+2)>>2$

Prediction pixel values of pixels $g$ and $p=(A+2B+C+2)>>2$

Prediction pixel value of pixel $h=(B+2C+D+2)>>2$

Prediction pixel value of pixel $i=(M+2I+J+2)>>2$

Prediction pixel value of pixel $m=(I+2J+K+2)>>2$ (8)

The mode 6 is a Horizontal_Down Prediction mode, and is applied to only a case where the pixel values A, B, C, D, I, J, K, L, and M are "available". In this case, the prediction pixel values of the pixels a through p are generated as with the following Expression (9).

Prediction pixel values of pixels $a$ and $g=(M+I+1)>>1$

Prediction pixel values of pixels $b$ and $h=(I+2M+A+2)>>2$

Prediction pixel value of pixel $c=(M+2A+B+2)>>2$

Prediction pixel value of pixel $d=(A+2B+C+2)>>2$

Prediction pixel values of pixels $e$ and $k=(I+J+1)>>1$

Prediction pixel values of pixels $f$ and $l=(M+2I+J+2)>>2$

Prediction pixel values of pixels $i$ and $o=(J+K+1)>>1$

Prediction pixel values of pixels $j$ and $p=(I+2J+K+2)>>2$

Prediction pixel value of pixel $m=(K+L+1)>>1$

Prediction pixel value of pixel $n=(J+2K+L+2)>>2$ (9)

The mode 7 is a Vertical_Left Prediction mode, and is applied to only a case where the pixel values A, B, C, D, I, J, K, L, and M are "available". In this case, the prediction pixel values of the pixels a through p are generated as with the following Expression (10).

Prediction pixel value of pixel $a=(A+B+1)>>1$

Prediction pixel values of pixels $b$ and $i=(B+C+1)>>1$

Prediction pixel values of pixels $c$ and $j=(C+D+1)>>1$

Prediction pixel values of pixels $d$ and $k=(D+E+1)>>1$

Prediction pixel value of pixel $l=(E+F+1)>>1$

Prediction pixel value of pixel $e=(A+2B+C+2)>>2$

Prediction pixel values of pixels $f$ and $m=(B+2C+D+2)>>2$

Prediction pixel values of pixels $g$ and $n=(C+2D+E+2)>>2$

Prediction pixel values of pixels $h$ and $o=(D+2E+F+2)>>2$

Prediction pixel value of pixel $p=(E+2F+G+2)>>2$ (10)

The mode 8 is a Horizontal_Up Prediction mode, and is applied to only a case where the pixel values A, B, C, D, I, J, K, L, and M are "available". In this case, the prediction pixel values of the pixels a through p are generated as with the following Expression (11).

Prediction pixel value of pixel $a=(I+J+1)>>1$

Prediction pixel value of pixel $b=(I+2J+K+2)>>2$

Prediction pixel values of pixels $c$ and $e=(J+K+1)>>1$

Prediction pixel values of pixels $d$ and $f=(J+2K+L+2)>>2$

Prediction pixel values of pixels $g$ and $i=(K+L+1)>>1$

Prediction pixel values of pixels $h$ and $j=(K+3L+2)>>2$

Prediction pixel values of pixels $k, l, m, n, o$, and $p=L$ (11)

Next, the encoding format of the 4×4 pixel intra prediction mode (Intra_4×4_pred_mode) for luminance signals will be described with reference to FIG. 7. With the example in FIG. 7, an current block C serving as an encoding object, which is made up of 4×4 pixels, is shown, and a block A and a block B, which neighbor the current block C and are made up of 4×4 pixels, are shown.

In this case, it can be conceived that the Intra_4×4_pred_mode in the current block C, and the Intra_4×4_pred_mode in the block A and block B have high correlation. Encoding processing is performed as follows using this correlation, whereby higher encoding efficiency can be realized.

Specifically, with the example in FIG. 7, the Intra_4×4_pred_mode in the block A and block B are taken as Intra_4×4_pred_modeA and Intra_4×4_pred_modeB respectively, and MostProbableMode is defined as the following Expression (12).

MostProbableMode=Min(Intra_4×4_pred_modeA, Intra_4×4_pred_modeB) (12)

That is to say, of the block A and block B, one to which a smaller mode_number is assigned is taken as MostProbableMode.

Two values called prev_intra4×4_pred_mode_flag [luma4×4Blkldx] and rem_intra4×4_pred_mode[luma4×4Blkldx] are defined within a bit stream as parameters as to the current block C, and decoding processing is performed by processing based on the pseudo-code shown in the following Expression (13), whereby the values of Intra_4×4_pred_mode and Intra4×4PredMode[luma4×4Blkldx] as to the block C can be obtained.

If(prev_intra4×4_pred_mode_flag[luma4×4Blkldx])
   Intra4×4PredMode[luma4×4Blkldx]=MostProbableMode else if(rem_intra4×4_pred_mode[luma4×4Blkldx]<MostProbableMode)

Intra4×4PredMode[luma4×4Blkldx]=rem_intra4×4_pred_mode[luma4×4Blkldx]

else

Intra4×4PredMode[luma4×4Blkldx]=rem_intra4×4_pred_mode[luma4×4Blkldx]+1 (13)

Figure 8:
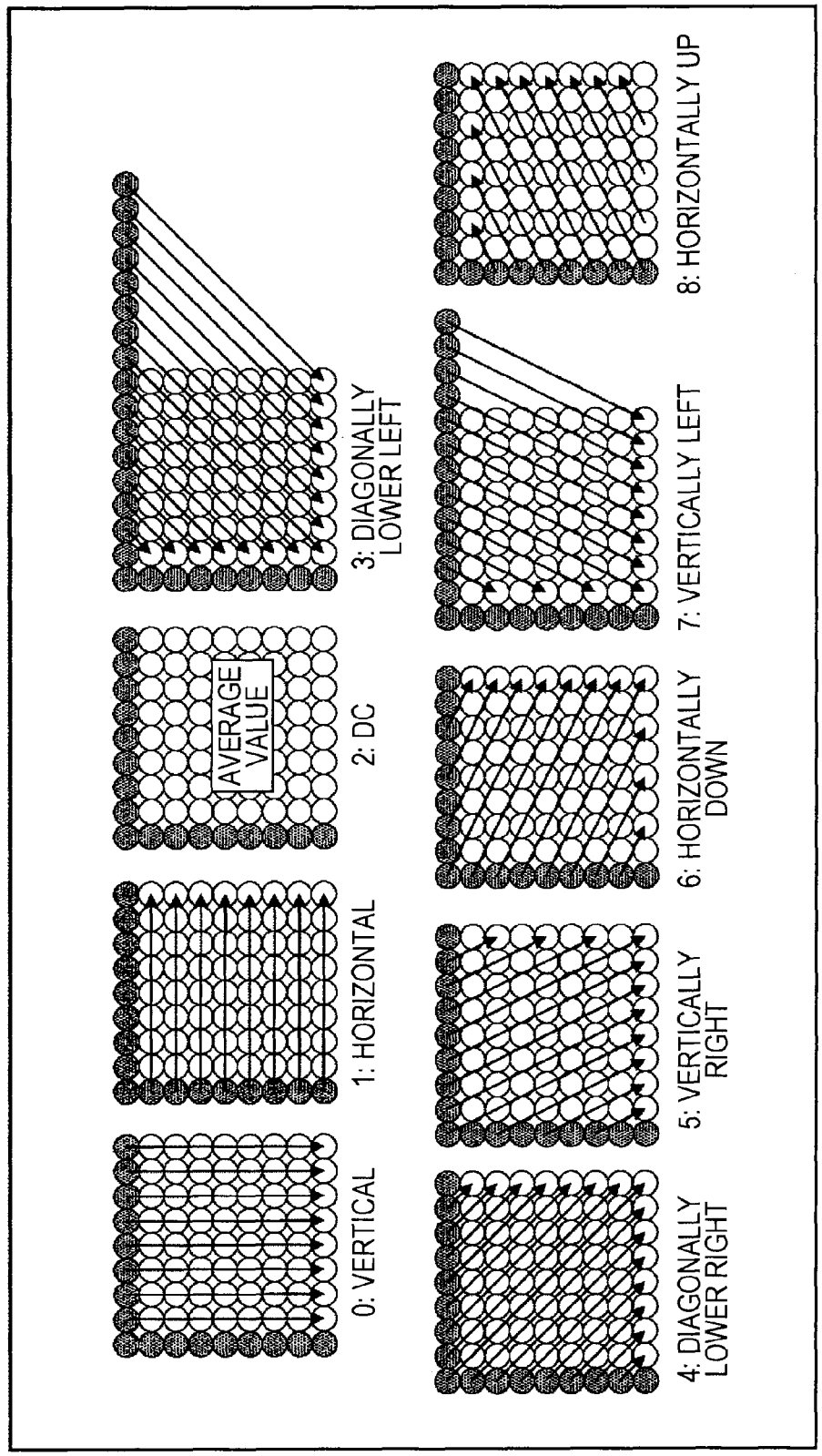
FIG. 8 is a diagram illustrating the kinds of 8×8 pixel intra prediction modes for luminance signals.

Next, the 8×8 pixel intra prediction mode will be described. FIG. 8 and FIG. 9 are diagrams showing the nine kinds of 8×8 pixel intra prediction modes (intra_8×8_predmode) for luminance signals.

Let us say that the pixel values in the current 8×8 block are taken as $p[x, y](0 \leq x \leq 7; 0 \leq y \leq 7)$, and the pixel values of a neighboring block are represented like $p[-1, -1]$, $p[-1, 15]$, $p[-1, 0], \ldots, [p-1, 7]$.

With regard to the 8×8 pixel intra prediction modes, neighboring pixels are subjected to low-pass filtering processing prior to generating a prediction value. Now, let us say that pixel values before low-pass filtering processing are represented with $p[-1, -1], \ldots, p[-1, 15], p[-1, 0], \ldots, p[-1, 7]$, and pixel values after the processing are represented with $p'[-1, -1], \ldots, p'[-1, 15], p'[-1, 0], \ldots, p'[-1, 7]$.

First, $p'[0, -1]$ is calculated as with the following Expression (14) in the event that $p[-1, -1]$ is "available", and calculated as with the following Expression (15) in the event of "not available".

$$p'[0,-1]=(p[-1,-1]+2*p[0,-1]+p[1,-1]+2)>>2 \quad (14)$$

$$p'[0,-1]=(3*p[0,-1]+p[1,-1]+2)>>2 \quad (15)$$

$p'[x, -1]$ $(x=0, \ldots, 7)$ is calculated as with the following Expression (16).

$$p'[x,-1]=(p[x-1,-1]+2*p[x,-1]+p[x+1,-1]+2)>>2 \quad (16)$$

$p'[x, -1]$ $(x=8, \ldots, 15)$ is calculated as with the following Expression (17) in the event that $p[x, -1]$ $(x=8, \ldots, 15)$ is "available".

$$p'[x,-1]=(p[x-1,-1]+2*p[x,-1]+p[x+1,-1]+2)>>2$$

$$p'[15,-1]=(p[14,-1]+3*p[15,-1]+2)>>2 \quad (17)$$

$p'[-1, -1]$ is calculated as follows in the event that $p[-1, -1]$ is "available". Specifically, $p'[-1, -1]$ is calculated like Expression (18) in the event that both of $p[0, -1]$ and $p[-1, 0]$ are "available", and calculated like Expression (19) in the event that $p[-1, 0]$ is "unavailable". Also, $p'[-1, -1]$ is calculated like Expression (20) in the event that $p[0, -1]$ is "unavailable".

$$p'[-1,-1]=(p[0,-1]+2*p[-1,-1]+p[-1,0]+2)>>2 \quad (18)$$

$$p'[-1,-1]=(3*p[-1,-1]+p[0,-1]+2)>>2 \quad (19)$$

$$p'[-1,-1]=(3*p[-1,-1]+p[-1,0]+2)>>2 \quad (20)$$

$p'[-1, y]$ $(y=0, \ldots, 7)$ is calculated as follows when $p[-1, y]$ $(y=0, \ldots, 7)$ is "available". Specifically, first, in the event that $p[-1, -1]$ is "available", $p'[-1, 0]$ is calculated as with the following Expression (21), and in the event of "unavailable", calculated like Expression (22).

$$p'[-1,0]=(p[-1,-1]+2*p[-1,0]+p[-1,1]+2)>>2 \quad (21)$$

$$p'[-1,0]=(3*p[-1,0]+p[-1,1]+2)>>2 \quad (22)$$

Also, p'[−1, y] (y=1, . . . , 6) is calculated as with the following Expression (23), and p'[−1, 7] is calculated like Expression (24).

$$p'[-1,y]=(p[-1,y-1]+2*p[-1,y]+p[-1,y+1]+2)>>2 \quad (23)$$

$$p'[-1,7]=(p[-1,6]+3*p[-1,7]+2)>>2 \quad (24)$$

Prediction values in the intra prediction modes shown in FIG. 8 and FIG. 9 are generated as follows using p' thus calculated.

The mode 0 is a Vertical Prediction mode, and is applied only when p[x, −1] (x=0, . . . , 7) is "available". A prediction value pred8×8$_L$[x, y] is generated as with the following Expression (25).

$$pred8\times8_L[x,y]=p'[x,-1]x,y=0,\ldots,7 \quad (25)$$

The mode 1 is a Horizontal Prediction mode, and is applied only when p[−1, y] (y=0, . . . , 7) is "available". The prediction value pred8×8$_L$[x, y] is generated as with the following Expression (26).

$$pred8\times8_L[x,y]=p'[-1,y]x,y=0,\ldots,7 \quad (26)$$

The mode 2 is a DC Prediction mode, and the prediction value pred8×8$_L$[x, y] is generated as follows. Specifically, in the event that both of p[x, −1] (x=0, . . . , 7) and p[−1, y] (y=0, . . . , 7) are "available", the prediction value pred8×8$_L$[x, y] is generated as with the following Expression (27).

[Mathematical Expression 1]

$$Pred8\times8_L[x,y] = \left(\sum_{x'=0}^{7} P'[x',-1] + \sum_{y'=0}^{7} P'[-1,y] + 8\right) >> 4 \quad (27)$$

In the event that p[x, −1] (x=0, . . . , 7) is "available", but p[−1, y] (y=0, . . . , 7) is "unavailable", the prediction value pred8×8$_L$[x, y] is generated as with the following Expression (28).

[Mathematical Expression 2]

$$Pred8\times8_L[x,y] = \left(\sum_{x'=0}^{7} P'[x',-1] + 4\right) >> 3 \quad (28)$$

In the event that p[x, −1] (x=0, . . . , 7) is "unavailable", but p[−1, y] (y=0, . . . , 7) is "available", the prediction value pred8×8$_L$[x, y] is generated as with the following Expression (29).

[Mathematical Expression 3]

$$Pred8\times8_L[x,y] = \left(\sum_{y'=0}^{7} P'[-1,y] + 4\right) >> 3 \quad (29)$$

In the event that both of p[x, −1] (x=0, . . . , 7) and p[−1, y] (y=0, . . . , 7) are "unavailable", the prediction value pred8×8$_L$[x, y] is generated as with the following Expression (30).

$$pred8\times8_L[x,y]=128 \quad (30)$$

Here, Expression (30) represents a case of 8-bit input.

The mode 3 is a Diagonal_Down_Left_prediction mode, and the prediction value pred8×8$_L$[x, y] is generated as follows. Specifically, the Diagonal_Down_Left_prediction mode is applied only when p[x, −1], x=0, . . . , 15, is "available", and the prediction pixel value with x=7 and y=7 is generated as with the following Expression (31), and other prediction pixel values are generated as with the following Expression (32).

$$pred8\times8_L[x,y]=(p'[14,-1]+3*p[15,-1]+2)>>2 \quad (31)$$

$$pred8\times8_L[x,y]=(p'[x+y,-1]+2*p'[x+y+1,-1]+p'[x+y+2,-1]+2)>>2 \quad (32)$$

The mode 4 is a Diagnonal_Down_Right_prediction mode, and the prediction value pred8×8$_L$[x, y] is generated as follows. Specifically, the Diagnonal_Down_Right_prediction mode is applied only when p[x, −1], x=0, . . . , 7 and p[−1, y], y=0, . . . , 7 are "available", the prediction pixel value with x>y is generated as with the following Expression (33), and the prediction pixel value with x<y is generated as with the following Expression (34). Also, the prediction pixel value with x=y is generated as with the following Expression (35).

$$pred8\times8_L[x,y]=(p'[x-y-2,-1]+2*p'[x-y-1,-1]+p'[x-y,-1]+2)>>2 \quad (33)$$

$$pred8\times8_L[x,y]=(p'[-1,y-x-2]+2*p'[-1,y-x-1]+p'[-1,y-x]+2)>>2 \quad (34)$$

$$pred8\times8_L[x,y]=(p'[0,-1]+2*p'[-1,-1]+p'[-1,0]+2)>>2 \quad (35)$$

The mode 5 is a Vertical_Right_prediction mode, and the prediction value pred8×8$_L$[x, y] is generated as follows. Specifically, the Vertical_Right_prediction mode is applied only when p[x, −1], x=0, . . . , 7 and p[−1, y], y=−1, . . . , 7 are "available". Now, zVR is defined as with the following Expression (36).

$$zVR=2*x-y \quad (36)$$

At this time, in the event that zVR is 0, 2, 4, 6, 8, 10, 12, or 14, the prediction pixel value is generated as with the following Expression (37), and in the event that zVR is 1, 3, 5, 7, 9, 11, or 13, the prediction pixel value is generated as with the following Expression (38).

$$pred8\times8_L[x,y]=(p'[x-(y>>1)-1,-1]+p'[x-(y>>1),-1]+1)>>1 \quad (37)$$

$$pred8\times8_L[x,y]=(p'[x-(y>>1)-2,-1]+2*p'[x-(y>>1)-1,-1]+p'[x-(y>>1),-1]+2)>>2 \quad (38)$$

Also, in the event that zVR is −1, the prediction pixel value is generated as with the following Expression (39), and in the cases other than this, specifically, in the event that zVR is −2, −3, −4, −5, −6, or −7, the prediction pixel value is generated as with the following Expression (40).

$$pred8\times8_L[x,y]=(p'[-1,0]+2*p'[-1,-1]+p'[0,-1]+2)>>2 \quad (39)$$

$$pred8\times8_L[x,y](p'[-1,y-2*x-1]+2*p'[-1,y-2*x-2]+p'[-1,y-2*x-3]+2)>>2 \quad (40)$$

The mode 6 is a Horizontal_Down_prediction mode, and the prediction value pred8×8$_L$[x, y] is generated as follows. Specifically, the Horizontal_Down_prediction mode is applied only when p[x, −1], x=0, . . . , 7 and p[−1, y], y=−1, . . . , 7 are "available". Now, zHD is defined as with the following Expression (41).

$$zHD=2*y-x \quad (41)$$

At this time, in the event that zHD is 0, 2, 4, 6, 8, 10, 12, or 14, the prediction pixel value is generated as with the following Expression (42), and in the event that zHD is 1, 3, 5, 7, 9, 11, or 13, the prediction pixel value is generated as with the following Expression (43).

$$\text{pred8}\times 8_L[x,y]=(p'[-1,y-(x>>1)-1]+p'[-1,y-(x>>1)+1])>>1 \quad (42)$$

$$\text{pred8}\times 8_L[x,y]=(p'[-1,y-(x>>1)-2]+2*p'[-1,y-(x>>1)-1]+p'[-1,y-(x>>1)])+2)>>2 \quad (43)$$

Also, in the event that zHD is −1, the prediction pixel value is generated as with the following Expression (44), and in the event that zHD is other than this, specifically, in the event that zHD is −2, −3, −4, −5, −6, or −7, the prediction pixel value is generated as with the following Expression (45).

$$\text{pred8}\times 8_L[x,y]=(p'[-1,0]+2*p'[-1,-1]+p'[0,-1]+2)>>2 \quad (44)$$

$$\text{pred8}\times 8_L[x,y]=(p'[x-2*Y-1,-1]+2*p'[x-2*y-2,-1]+p'[x-2*y-3,-1]+2)>>2 \quad (45)$$

The mode 7 is a Vertical_Left_prediction mode, and the prediction value pred8×8$_L$[x, y] is generated as follows. Specifically, the Vertical_Left_prediction mode is applied only when p[x, −1], x=0, . . . , 15, is "available", in the case that y=0, 2, 4, or 6, the prediction pixel value is generated as with the following Expression (46), and in the cases other than this, i.e., in the case that y=1, 3, 5, or 7, the prediction pixel value is generated as with the following Expression (47).

$$\text{pred8}\times 8_L[x,y]=(p'[x+(y>>1),-1]+p'[x+(y>>1)+1,-1]+1)>>1 \quad (46)$$

$$\text{pred8}\times 8_L[x,y]=(p'[x+(y>>1),-1]+2*p'[x+(y>>1)+1,-1]+p'[x+(y>>1)+2,-1]+2)>>2 \quad (47)$$

The mode 8 is a Horizontal_Up_prediction mode, and the prediction value pred8×8$_L$[x, y] is generated as follows. Specifically, the Horizontal_Up_prediction mode is applied only when p[−1, y], y=0, . . . , 7, is "available". Hereafter, zHU is defined as with the following Expression (48).

$$z\text{HU}=x+2*y \quad (48)$$

In the event that the value of zHU is 0, 2, 4, 6, 8, 10, or 12, the prediction pixel value is generated as with the following Expression (49), and in the event that the value of zHU is 1, 3, 5, 7, 9, or 11, the prediction pixel value is generated as with the following Expression (50).

$$\text{pred8}\times 8_L[x,y]=(p'[-1,y+(x>>1)]+p'[-1,y+(x>>1)+1]+1)>>1 \quad (49)$$

$$\text{pred8}\times 8_L[x,y]=(p'[-1,y+(x>>1)]) \quad (50)$$

Also, in the event that the value of zHU is 13, the prediction pixel value is generated as with the following Expression (51), and in the cases other than this, i.e., in the event that the value of zHU is greater than 13, the prediction pixel value is generated as with the following Expression (52).

$$\text{pred8}\times 8_L[x,y]=(p'[-1,6]+3*p'[-1,7]+2)>>2 \quad (51)$$

$$\text{pred8}\times 8_L[x,y]=p'[-1,7] \quad (52)$$

Figure 11:
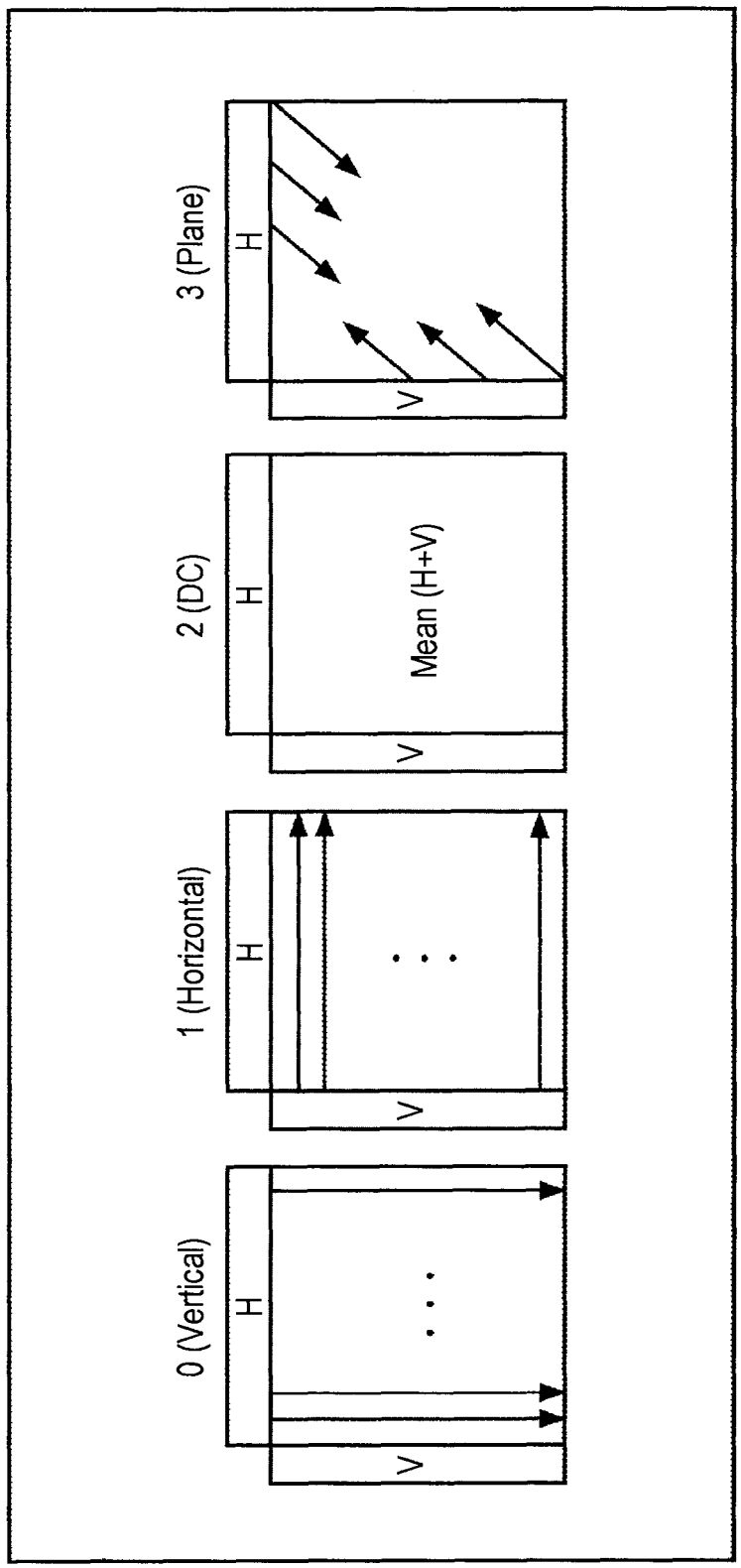
FIG. 11 is a diagram illustrating the kinds of 16×16 pixel intra prediction modes for luminance signals.

Next, the 16×16 pixel intra prediction mode will be described. FIG. 10 and FIG. 11 are diagrams showing the four kinds of the 16×16 pixel intra prediction modes for luminance signals (Intra_16×16_pred_mode).

Figures 12, 13:
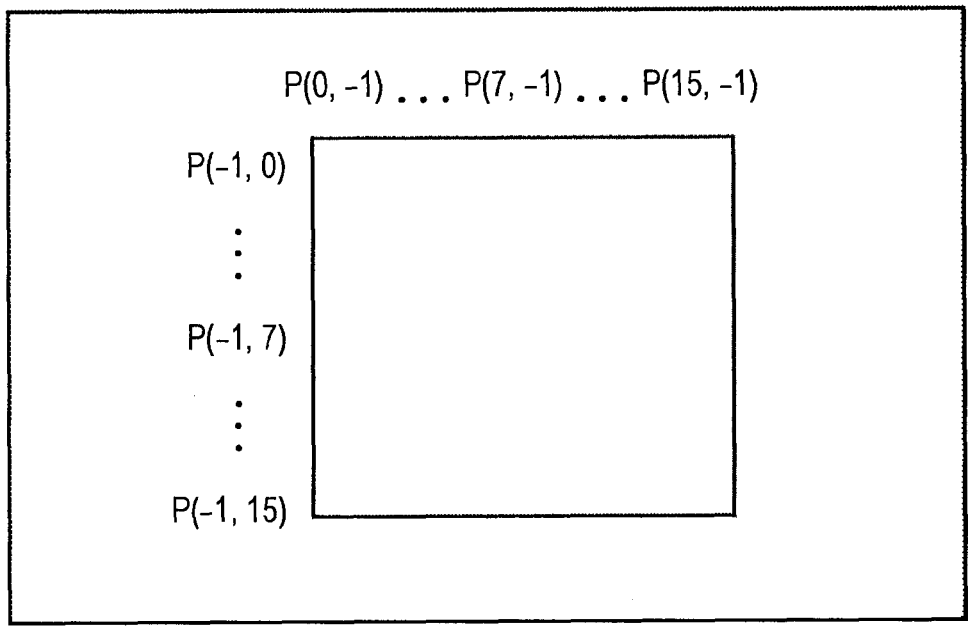
FIG. 12 is a diagram for describing 16×16 pixel intra prediction.
FIG. 13 is a diagram illustrating the kinds of intra prediction modes for color difference signals.

The four types of intra prediction modes will be described with reference to FIG. 12. With the example in FIG. 12, an current macro block A to be subjected to intra processing is shown, and P(x, y); x, y=−1, 0, . . . , 15 represents the pixel value of a pixel neighboring the current macro block A.

The mode 0 is a Vertical Prediction mode, and is applied only when P(x, −1); x, y=−1, 0, . . . , 15 is "available". In this case, the prediction pixel value Pred(x, y) of each pixel of the current macro block A is generated as with the following Expression (53).

$$\text{Pred}(x,y)=P(x,-1);x,y=0,\ldots,15 \quad (53)$$

The mode 1 is a Horizontal Prediction mode, and is applied only when P(−1, y); x, y=−1, 0, . . . , 15 is "available". In this case, the prediction pixel value Pred(x, y) of each pixel of the current macro block A is generated as with the following Expression (54).

$$\text{Pred}(x,y)=P(-1,y);x,y=0,\ldots,15 \quad (54)$$

The mode 2 is a DC Prediction mode, and in the case that all of P(x, −1) and P(−1, y); x, y=−1, 0, . . . , 15 are "available", the prediction pixel value Pred(x, y) of each pixel of the current macro block A is generated as with the following Expression (55).

[Mathematical Expression 4]

$$\text{Pred}(x, y) = \left[\sum_{x'=0}^{15} P(x', -1) + \sum_{y'=0}^{15} P(-1, y') + 16\right] >> 5 \quad (55)$$

with $x, y = 0, \ldots, 15$

Also, in the event that P(x, −1); x, y=−1, 0, . . . , 15 is "unavailable", the prediction pixel value Pred(x, y) of each pixel of the current macro block A is generated as with the following Expression (56).

[Mathematical Expression 5]

$$\text{Pred}(x, y) = \left[\sum_{y'=0}^{15} P(-1.y') + 8\right] >> 4 \quad (56)$$

with $x, y = 0, \ldots, 15$

In the event that P(−1, y); x, y=−1, 0, . . . , 15 is "unavailable", the prediction pixel value Pred(x, y) of each pixel of the current macro block A is generated as with the following Expression (57).

[Mathematical Expression 6]

$$\text{Pred}(x, y) = \left[\sum_{y'=0}^{15} P(x', -1) + 8\right] >> 4 \quad (57)$$

with $x, y = 0, \ldots, 15$

In the event that all of P(x, −1) and P(−1, y); x, y=−1, 0, . . . , 15 are "unavailable", 128 is employed as the prediction pixel value.

The mode 3 is a Plane Prediction mode, and is applied only when all of P(x, −1) and P(−1, y); x, y=−1, 0, . . . , 15 are "available". In this case, the prediction pixel value Pred(x, y) of each pixel of the current macro block A is generated as with the following Expression (58).

[Mathematical Expression 7]

$$Pred(x, y) = \text{Clip1}((a + b \cdot (x - 7) + c \cdot (y - 7) + 16) >> 5) \quad (58)$$
$$a = 16 \cdot (P(-1, 15) + P(15, -1))$$
$$b = (5 \cdot H + 32) >> 6$$
$$c = (5 \cdot V + 32) >> 6$$
$$H = \sum_{x=1}^{8} x \cdot (P(7 + x, -1) - P(7 - x, -1))$$
$$V = \sum_{y=1}^{8} y \cdot (P(-1, 7 + y) - P(-1, 7 - y))$$

Next, the intra prediction modes as to color difference signals will be described. FIG. 13 is a diagram showing the four kinds of intra prediction modes for color difference signals (Intra_chroma_pred_mode). The intra prediction modes for color difference signals may be set independently from the intra prediction modes for luminance signals. The intra prediction modes as to color difference signals conform to the above-mentioned 16×16 pixel intra prediction modes for luminance signals.

However, the 16×16 pixel intra prediction modes for luminance signals take a 16×16 pixel block as the object, but on the other hand, the intra prediction modes as to color difference signals take an 8×8 pixel block as the object. Further, as shown in the above-mentioned FIG. 10 and FIG. 13, mode numbers between both do not correspond.

Now, let us conform to the definitions of the pixel values of the current block A in the 16×16 pixel intra prediction mode for the luminance signal described above with reference to FIG. 12, and a neighboring pixel value. For example, let us say that the pixel value of a pixel neighboring the current macro block A (8×8 pixels in the event of color difference signal) to be subjected to intra processing is taken as P(x, y); x, y=−1, 0, . . . , 7.

The mode 0 is a DC Prediction mode, and in the event that all of P(x, −1) and P(−1, y); x, y=−1, 0, . . . , 7 are "available", the prediction pixel value Pred(x, y) of each pixel of the current macro block A is generated as with the following Expression (59).

[Mathematical Expression 8]

$$Pred(x, y) = \left[\left(\sum_{n=0}^{7}(P(-1, n) + P(n, -1))\right) + 8\right] >> 4 \quad (59)$$
with $x, y = 0, \ldots, 7$ Also, in the event that P(−1, y); x, y=−1, 0, . . . , 7 is "unavailable", the prediction pixel value Pred(x, y) of each pixel of the current macro block A is generated as with the following Expression (60).

[Mathematical Expression 9]

$$Pred(x, y) = \left[\left(\sum_{n=0}^{7} P(n, -1)\right) + 4\right] >> 3 \text{ with } x, y = 0, \ldots, 7 \quad (60)$$

Also, in the event that P(x, −1); x, y=−1, 0, . . . , 7 is "unavailable", the prediction pixel value Pred(x, y) of each pixel of the current macro block A is generated as with the following Expression (61).

[Mathematical Expression 10]

$$Pred(x, y) = \left[\left(\sum_{n=0}^{7} P(-1, n)\right) + 4\right] >> 3 \text{ with } x, y = 0, \ldots, 7 \quad (61)$$

The mode 1 is a Horizontal Prediction mode, and is applied only when P(−1, y); x, y=−1, 0, . . . , 7 is "available". In this case, the prediction pixel value Pred(x, y) of each pixel of the current macro block A is generated as with the following Expression (62).

$$Pred(x,y)=P(-1,y); x,y=0,\ldots,7 \quad (62)$$

The mode 2 is a Vertical Prediction mode, and is applied only when P(x, −1); x, y=−1, 0, . . . , 7 is "available". In this case, the prediction pixel value Pred(x, y) of each pixel of the current macro block A is generated as with the following Expression (63).

$$Pred(x,y)=P(x,-1); x,y=0,\ldots,7 \quad (63)$$

The mode 3 is a Plane Prediction mode, and is applied only when P(x, −1) and P(−1, y); x, y=−1, 0, . . . , 7 are "available". In this case, the prediction pixel value Pred(x, y) of each pixel of the current macro block A is generated as with the following Expression (64).

[Mathematical Expression 11]

$$Pred(x, y) = \text{Clip1}((a + b \cdot (x - 3) + c \cdot (y - 3) + 16) >> 5); \quad (64)$$
$$x, y = 0, \ldots, 7$$
$$a = 16 \cdot (P(-1, 7) + P(7, -1))$$
$$b = (17 \cdot H + 16) >> 5$$
$$c = (17 \cdot V + 16) >> 5$$
$$H = \sum_{x=1}^{4} x \cdot [P(3 + x, -1) - P(3 - x, -1)]$$
$$V = \sum_{y=1}^{4} y \cdot [P(-1, 3 + y) - P(-1, 3 - y)]$$

As described above, the intra prediction modes for luminance signals include the nine kinds of prediction modes of 4×4 pixel and 8×8 pixel block units, and the four kinds of prediction modes of 16×16 pixel macro block units. The modes of these block units are set for each macro block unit. The intra prediction modes for color difference signals include the four kinds of prediction modes of 8×8 pixel block units. The intra prediction modes for color difference signals may be set independently from the intra prediction modes for luminance signals.

Also, with regard to the 4×4 pixel intra prediction modes (intra 4×4 prediction modes), and the 8×8 pixel intra prediction modes (intra 8×8 prediction modes) for luminance signals, one intra prediction mode is set for each 4×4 pixel and 8×8 pixel luminance signal block. With regard to the 16×16 pixel intra prediction mode (intra 16×16 prediction mode) for luminance signals and the intra prediction modes for color difference signals, one prediction mode is set as to one macro block.

Note that the kinds of prediction modes correspond to directions indicated with the above-mentioned numbers 0, 1, 3 through 8 in FIG. 5. The prediction mode 2 is average value prediction.

As described above, with intra prediction according to the H.264/AVC format, filtering processing of pixel values of neighboring pixels is performed with determined filter coefficients only before performing intra prediction in block increments of 8×8 pixels as described above with Expression (14) through Expression (24). In contrast, with the image encoding device 51, filtering processing of pixel values of neighboring pixels is performed with filter coefficients set according to the block to be predicted, prior to performing intra prediction of all intra prediction modes.

[Configuration Example of Intra Prediction Unit and Neighboring pixel Interpolation Filter Switching Unit]

Figure 14:
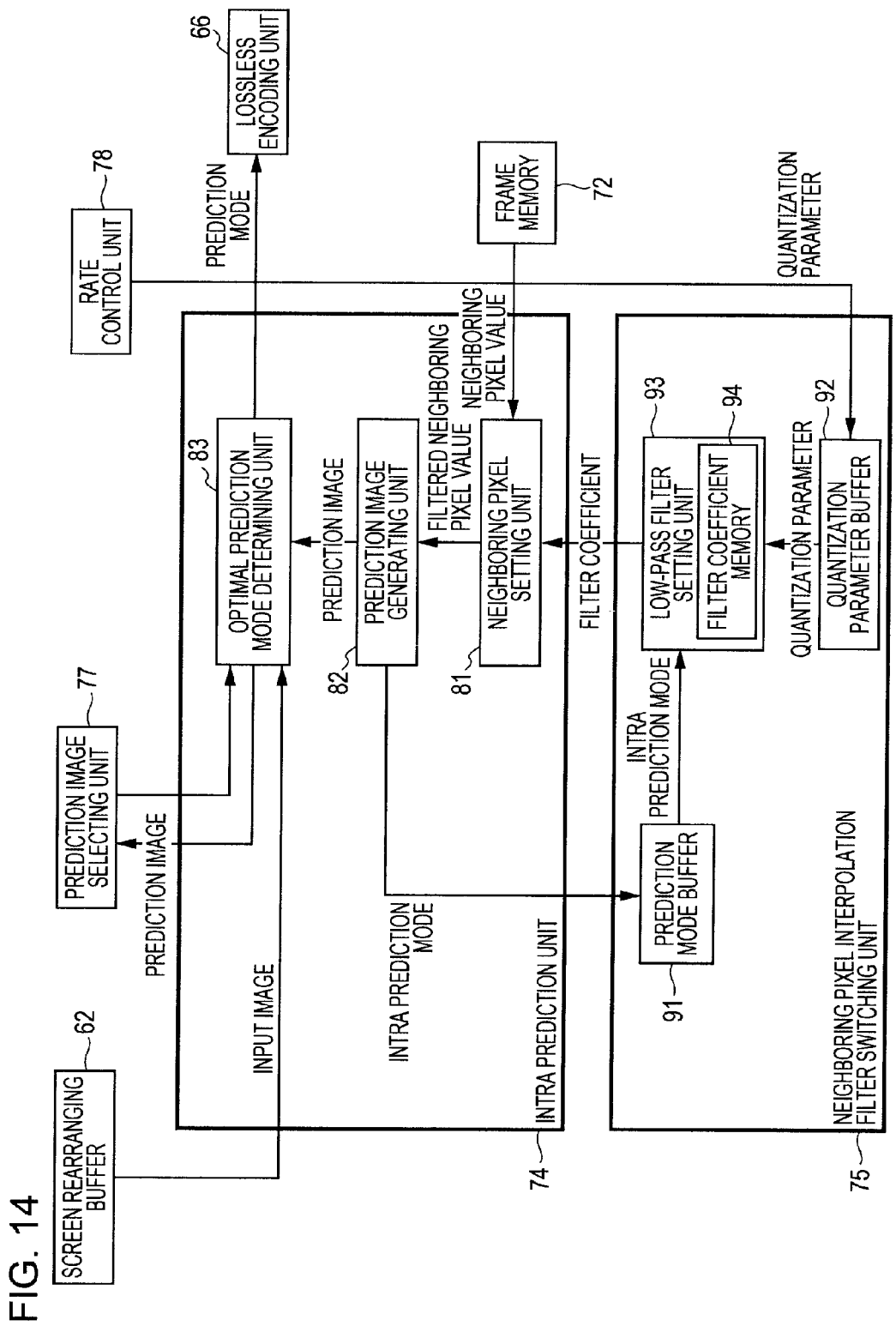
FIG. 14 is a block diagram illustrating a configuration example of an intra prediction unit and neighboring pixel interpolation filter switching unit in FIG. 1.

FIG. 14 is a block diagram illustrating a detailed configuration example of the intra prediction unit 74 and neighboring pixel interpolation filter switching unit 75 shown in FIG. 1.

In the case of the example in FIG. 14, the intra prediction unit 74 is configured of a neighboring image setting unit 81, a prediction image generating unit 82, and an optimal prediction mode determining unit 83.

The neighboring pixel interpolation filter switching unit 75 is configured of a prediction mode buffer 91, a quantization parameter buffer 92, and a low-pass filter setting unit 93. Note that the low-pass filter setting unit 93 has built-in filter coefficient memory 94.

The neighboring image setting unit 81 is supplied with neighboring pixel values of a current block for intra prediction from the frame memory 72. While illustrating of the switch 73 is omitted in the case of FIG. 14, in reality, supply is performed from the frame memory 72 to the neighboring image setting unit 81 via the switch 73. Note that in the case of intra prediction, pixel values not subjected to deblocking filtering by the deblocking filter 71 are used as neighboring pixel values.

The neighboring image setting unit 81 uses the filter coefficient set by the low-pass filter setting unit 93 to perform filter processing of the neighboring pixel values of the current block from the frame memory 72, and supplies the neighboring pixel values subjected to filter processing to the prediction image generating unit 82.

The prediction image generating unit 82 supplies information of which mode the intra prediction mode currently being processed is, to the prediction mode buffer 91. The prediction image generating unit 82 uses the neighboring pixel values subjected to filter processing from the neighboring image setting unit 81 to perform intra prediction of the current block in the intra prediction mode supplied to the prediction mode buffer 91, and generates a prediction image. The generated prediction image is supplied to the optimal prediction mode determining unit 83 along with the intra prediction mode information.

The optimal prediction mode determining unit 83 is supplied with the image to be subjected to intra prediction that is read out from the screen rearranging buffer 62, the prediction image generated by the prediction image generating unit 82, and the intra prediction mode information thereof.

The optimal prediction mode determining unit 83 uses the supplied information to calculate a cost function value for the intra prediction mode regarding which the prediction image has been generated, using the supplied information, and decides the intra prediction mode yielding the smallest value of the calculated cost function value to be the optimal intra prediction mode. The optimal prediction mode determining unit 83 outputs the prediction image of the optimal intra prediction mode and the corresponding cost function value to the prediction image selecting unit 77.

Also, in the event a prediction image generated in the optimal intra prediction mode is selected by the prediction image selecting unit 77, the optimal prediction mode determining unit 83 supplies information indicating the optimal intra prediction mode to the lossless encoding unit 66.

The prediction mode buffer 91 stores intra prediction mode information from the prediction image generating unit 82. The quantization parameter buffer 92 stores the quantization parameter from the rate control unit 78.

The low-pass filter setting unit 93 reads out the intra prediction mode information of the current block from the prediction mode buffer 91, and reads out the quantization parameter corresponding to the current block from the quantization parameter buffer 92. The low-pass filter setting unit 93 sets, from the filter coefficients stored in the built-in filter coefficient memory 94, filter coefficients corresponding to this information, and supplies the set filter coefficients to the neighboring image setting unit 81.

The filter coefficient memory 94 stores filter coefficients corresponding to quantization parameters and intra prediction modes obtained by learning using a training image at a learning device 251 in FIG. 28 which will be described later. The filter coefficients are calculated and stored as described next, for each slice, for example.

[Description of Calculation of Optimal Filter Coefficients]

Next, a calculation method of optimal filter coefficients, used for this filter processing of neighboring pixels will be described with reference to FIG. 15. Note that in the example in FIG. 15, an example of performing vertical prediction (vertical Prediction) for a current block of 4×4 pixels is shown, but the following description is of a case applicable to any intra prediction mode.

With the intra prediction in block increments of 8×8 pixels as described above with Expression (14) through Expression (24), a 3-tap filter coefficient of $\{1, 2, 1\}$ is defined as a low-pass filter for neighboring pixels, but we will consider $\{c_0, c_1, c_2\}$ is a common form of a 3-tap. Further, with the present invention, a fourth parameter $c_3$ is also introduced as an offset value.

Note that while this 3-tap filter is described as being settable for each slice in the following description, this is not restricted to this, and may be settable for the entire sequence, or for each GOP, for example.

In the example in FIG. 15, $a_{km}(0 \le k, m \le 3)$ is the pixel value of a pixel included in the current block, and $b_m(-1 \le m \le 4)$ is a pixel value of a neighboring pixel used for vertical prediction.

First, the $b'_m(0 \le m \le 3)$ shown in the following Expression (65) is generated by 3-tap filtering processing being performed on the neighboring pixel value $b_m$.

[Mathematical Expression 12]

$$b'_m = c_0 * b_{m-1} + c_1 * b_m + c_2 * b_{m+1} + c_3 (0 \le m \le 3) \quad (65)$$

That is to say, in the event that filtering processing is performed, and a filter coefficient is used, we will say that a corresponding offset value is also used as shown in Expression (65), even without particularly mentioning the following. On other words, filter coefficients and offset values are coefficients used for filtering processing. In the same way, in the event that a filter coefficient is sent to the decoding side encoded, we will say that the corresponding offset value is also sent encoded.

Now, if we say that the prediction pixel value when the intra prediction mode is n is $p_{ij}(b'_m, n)$; $0 \le i, j \le 3$, the following Expression (66) holds regarding the intra prediction pixel value, since the prediction pixel is generated by a linear expression, as described above with reference to FIG. 2 through FIG. 14.

[Mathematical Expression 13]

$$\begin{aligned} p_{ij}(b'_m, n) &= p_{ij}(c_0 * b_{m-1} + c_1 * b_m + c_2 * b_{m+1} + c_3, n) \\ &= c_0 * p_{ij}(b_{m-1}, n) + c_1 * p_{ij}(b_m, n) + \\ &\quad c_2 * p_{ij}(b_{m+1}, n) + c_3 \end{aligned} \quad (66)$$

At this time, the prediction squared error as to the current block $\Omega$ with $a_{ij}$ as the original image pixel value is as shown in the following Expression (67).

[Mathematical Expression 14]

$$Err(\Omega) = \sum_{i=0}^{3} \sum_{j=0}^{3} (a_{ij} - p_{ij}(b'_m, n))^2 \qquad (67)$$

$$= \sum_{i=0}^{3} \sum_{j=0}^{3} \left( a_{km} - \left\{ \begin{array}{l} c_0 \cdot p_{ij}(b_{m-1}, n) + c_1 \cdot p_{ij}(b_m, n) + \\ c_2 \cdot p_{ij}(b_{m+1}, n) + c_3 \end{array} \right\} \right)^2$$

Now, if we represent with $\Phi$ a set of intra blocks encoded with the intra prediction mode n in the current slice, the summation of the prediction squared error relating to the blocks belonging to $\Phi$ is represented with the following Expression (68).

[Mathematical Expression 15]

$$Err(\Omega \in \Phi) = \sum_{\Omega \in \Phi} \sum_{i=0}^{3} \sum_{j=0}^{3} \qquad (68)$$

$$(a_{km} - \{c_0 \cdot p_{ij}(b_{m-1}, n) + c_1 \cdot p_{ij}(b_m, n) + c_2 \cdot p_{ij}(b_{m+1}, n) + c_3\})^2$$

In the above Expression (68), we will consider $Err(\Omega \in \Phi)$ to be a function of $c_0, c_1, c_2, c_3$, i.e., $Err(\Omega \in \Phi; c_0, c_1, c_2, c_3)$, so a $c_0, c_1, c_2, c_3$ which minimizes $Err(\Omega \in \Phi; c_0, c_1, c_2, c_3)$ will be an optimal filer coefficient value in the current slice. That is to say, it is sufficient to obtain a $c_0, c_1, c_2, c_3$ where the following Expression (69) holds.

[Mathematical Expression 16]

$$\frac{\partial Err(\Omega \in \Phi)}{\partial c_0} = 0; \quad \frac{\partial Err(\Omega \in \Phi)}{\partial c_1} = 0; \qquad (69)$$

$$\frac{\partial Err(\Omega \in \Phi)}{\partial c_2} = 0; \quad \frac{\partial Err(\Omega \in \Phi)}{\partial c_3} = 0$$

That is to say, the simultaneous equation shown in the following Expression (70) is obtained from Expression (69).

[Mathematical Expression 17]

$$0 = \frac{\partial ssd}{\partial c_0} = \sum \sum \sum ((-2 \times a_{ij} \times p_{ij}(b'_{k-1}) \times \qquad (70)$$
$$(a_{ij} - (c_0 p_{ij}(b'_{k-1}) + c_1 p_{ij}(b'_k) + c_2 p_{ij}(b'_{k+1}) + c_3))$$

$$0 = \frac{\partial ssd}{\partial c_1} = \sum \sum \sum ((-2 \times a_{ij} \times p_{ij}(b'_k) \times (a_{ij} - (c_0 p_{ij}(b'_{k-1}) + c_1 p_{ij}(b'_k) + c_2 p_{ij}(b'_{k+1}) + c_3))$$

$$0 = \frac{\partial ssd}{\partial c_2} = \sum \sum \sum ((-2 \times a_{ij} \times p_{ij}(b'_{k+1}) \times (a_{ij} - (c_0 p_{ij}(b'_{k-1}) + c_1 p_{ij}(b'_k) + c_2 p_{ij}(b'_{k+1}) + c_3))$$

$$0 = \frac{\partial ssd}{\partial c_3} = \sum \sum \sum ((-2 \times a_{ij} \times (a_{ij} - (c_0 p_{ij}(b'_{k-1}) + c_1 p_{ij}(b'_k) + c_2 p_{ij}(b'_{k+1}) + c_3))$$

Reformulating this Expression (70) using a matrix yields Expression (71).

[Mathematical Expression 18]

$$\begin{bmatrix} \sum\sum\sum p_{ij}(b_{k-1})p_{ij}(b_{k-1}) & \sum\sum\sum p_{ij}(b_{k-1})p_{ij}(b_k) & \sum\sum\sum p_{ij}(b_{k+1})p_{ij}(b_{k-1}) & \sum\sum\sum p_{ij}(b_{k-1}) \\ \sum\sum\sum p_{ij}(b_k)p_{ij}(b_{k-1}) & \sum\sum\sum p_{ij}(b_k)p_{ij}(b_k) & \sum\sum\sum p_{ij}(b_{k+1})p_{ij}(b_k) & \sum\sum\sum p_{ij}(b_k) \\ \sum\sum\sum p_{ij}(b_{k+1})p_{ij}(b_{k-1}) & \sum\sum\sum p_{ij}(b_{k+1})p_{ij}(b_k) & \sum\sum\sum p_{ij}(b_{k+1})p_{ij}(b_{k+1}) & \sum\sum\sum p_{ij}(b_{k+1}) \\ \sum\sum\sum p_{ij}(b_{k-1}) & \sum\sum\sum p_{ij}(b_k) & \sum\sum\sum p_{ij}(b_{k+1}) & \sum\sum\sum 1 \end{bmatrix} \qquad (71)$$

$$\begin{bmatrix} c_0 \\ c_1 \\ c_2 \\ c_3 \end{bmatrix} = \begin{bmatrix} \sum\sum\sum a_{ij}p_{ij}(b_{k-1}) \\ \sum\sum\sum a_{ij}p_{ij}(b_k) \\ \sum\sum\sum a_{ij}p_{ij}(b_{k+1}) \\ \sum\sum\sum a_{ij} \end{bmatrix}$$

Solving this Expression (71) enables the optimal filter coefficient and offset value $\{c_0, c_1, c_2, c_3\}$ to be obtained as to the current slice.

Figure 22:
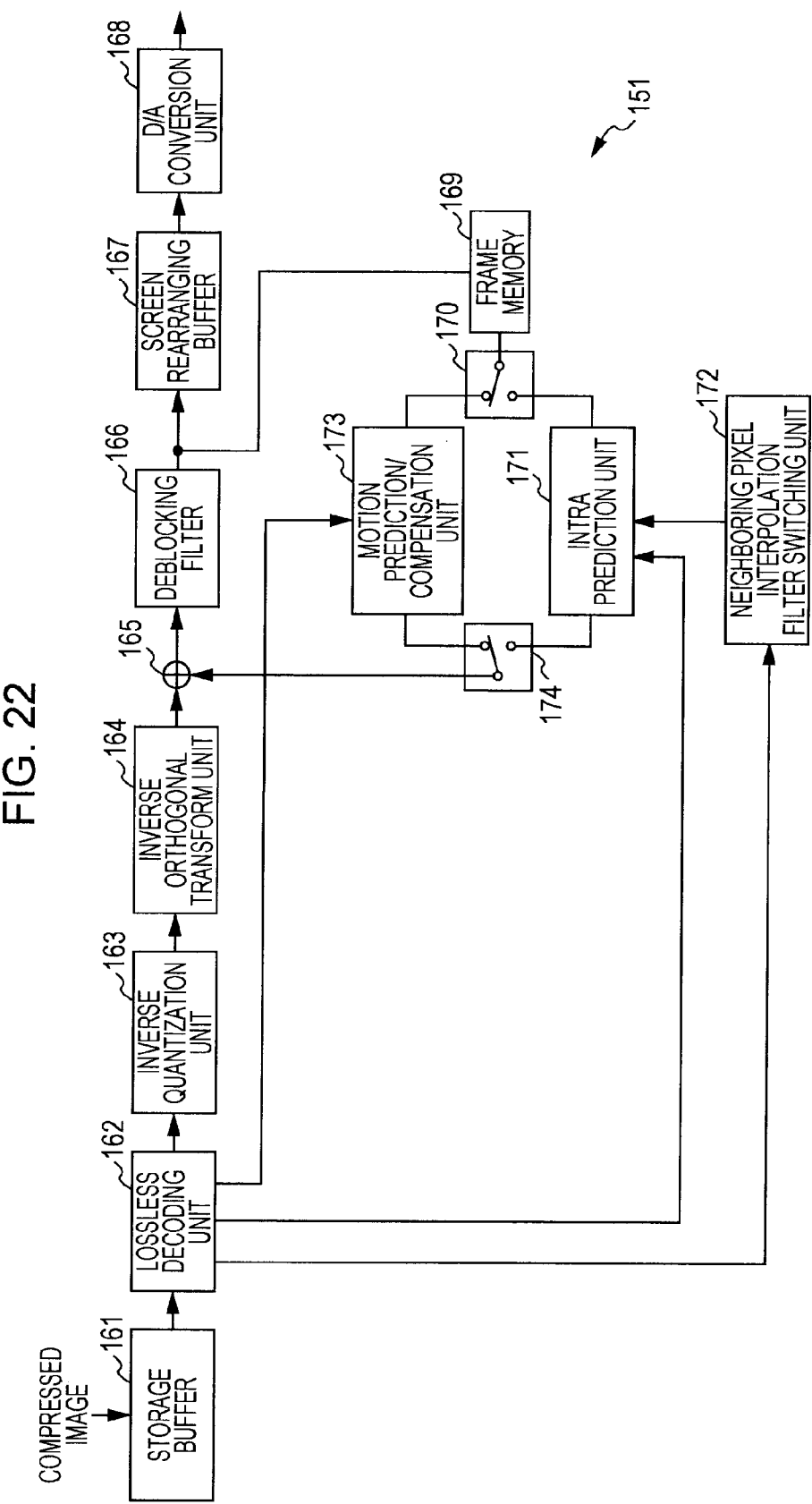
FIG. 22 is a block diagram illustrating the configuration of an embodiment of an image decoding device to which the present invention has been applied.

Note that optimal filter coefficients and offset values $\{c_0, c_1, c_2, c_3\}$ are obtained as floating-point values by solving the simultaneous equation in Expression (70), but in the case of the image encoding device 51 in FIG. 1, and the corresponding image decoding device 151 in FIG. 22, these are rounded off to 8-bit coefficients, for example.

That is to say, even if the filter coefficients are floating-point, the filter coefficient memory 94 holds these as n-bit (where n is an integer) values in accordance with the register length of the processor, for example.

By applying the same method as that described above to other intra prediction methods as well, optimal filter coefficients can also be obtained for the other intra prediction methods. Also, optimal filter coefficients can also be obtained for not only the intra 4×4 prediction mode, but also for the intra 8×8 prediction mode, intra 16×16 prediction mode, and intra prediction mode for color difference signals, by the same method.

While one filter coefficient is obtained for each intra prediction mode in the above description, this is not restricted to this, and an arrangement may be made where just one filter coefficient is obtained for all intra prediction modes. Particularly, with the intra prediction mode described above with reference to FIG. 2 through FIG. 14, prediction pixel values are used as they are for Vertical (vertical) and Horizontal (horizontal) modes, while some sort of averaging processing or weighted-averaging processing is performed to generate prediction pixels for other modes, so the properties thereof differ. Accordingly, performing two types of class classification, of Vertical and Horizontal modes, and other modes, and calculating filter coefficients for each class, can realize further improvement of encoding efficiency. Also, for luminance signals, there may be one for the intra 4×4 prediction mode, one for the intra 8×8 prediction mode, and one for the intra 16×16 prediction mode, for example. For color difference signals, filter coefficients may be obtained separately for Cb/Cr, for example.

Also, in the above description, the three taps of $\{c_0, c_1, c_2\}$ have been used for the filer coefficients for low-pass filter processing, but this is not restricted to 3-tap, and filters of any number of taps may be used. That is to say, filter coefficients+offset values of the number of taps are obtained. However, as the number of taps increases, the order of simultaneous equations to be solved increases.

Further, an arrangement may be made wherein filter coefficients which differ according to the image frame, such as CIF (Common Intermediate Format)/QCIF (Quarter CIF), SD (Standard Definition), HD (High Definition), or the like are prepared, and applied.

Also, with the above-described method, filter coefficients are calculated by minimizing the intra prediction residual (prediction squared error). However, the filter coefficient calculation method is not restricted to this, and in the event that there is the need to send filter coefficients to the decoding side, optimization including bits for sending the filer coefficients may be performed as well.

Further, with the above-described filter coefficients, we assume symmetry of coefficients, as shown in the following Expression (72).

$$C0 = C2 \tag{72}$$

That is to say, filter coefficients are calculating so as to have symmetry as to a center coefficient corresponding to zero-phase, as with $\{c_0, c_1, c_0\}$. Accordingly, the three simultaneous equations shown in the above Expression (70) can be reduced to two. As a result the amount of computation can be reduced.

By setting filter coefficients suitable for the input image, and performing low-pass filer processing as to neighboring pixels in an adaptive manner, using the above method, enables encoding to performed using prediction images suitable for the image, quantization parameters, and prediction mode, whereby encoding efficiency can be improved.

Two methods can be conceived regarding the above-described optimal filter coefficient calculation. One method is offline processing where, prior to performing encoding processing, image signals for training are used to calculate filer coefficients beforehand optimizing the entire image signals. Learning processing which is this offline processing will be described later with reference to FIG. 28, and filter coefficients and offset values calculated by the learning processing are stored in the filter coefficient memory 94 in FIG. 14.

The second method is online processing where optimal filter coefficients are successively calculated for each slice. In this case, the calculated filter coefficients and offset values are sent to the decoding side. An example of a case of performing online processing which is the second method will be described later with reference to FIG. 20.

[Description of Encoding Processing of Image Encoding Device]

Next, the encoding processing of the image encoding device 51 in FIG. 1 will be described with reference to the flowchart in FIG. 16.

In step S11, the A/D conversion unit 61 converts an input image from analog to digital. In step S12, the screen rearranging buffer 62 stores the image supplied from the A/D conversion unit 61, and performs rearranging from the sequence for displaying the pictures to the sequence for encoding.

In step S13, the computing unit 63 computes difference between an image rearranged in step S12 and the prediction image. The prediction image is supplied to the computing unit 63 from the motion prediction/compensation unit 76 in the event of performing inter prediction, and from the intra prediction unit 74 in the event of performing intra prediction, via the prediction image selecting unit 77.

The difference data is smaller in the data amount as compared to the original image data. Accordingly, the data amount can be compressed as compared to the case of encoding the original image without change.

In step S14, the orthogonal transform unit 64 subjects the difference information supplied from the computing unit 63 to orthogonal transform. Specifically, orthogonal transform, such as discrete cosine transform, Karhunen-Loéve transform, or the like, is performed, and a transform coefficient is output. In step S15, the quantization unit 65 quantizes the transform coefficient. At the time of this quantization, a rate is controlled such that later-described processing in step S25 will be described.

The difference information thus quantized is locally decoded as follows. Specifically, in step S16, the inverse quantization unit 68 subjects the transform coefficient quantized by the quantization unit 65 to inverse quantization using a property corresponding to the property of the quantization unit 65. In step S17, the inverse orthogonal transform unit 69 subjects the transform coefficient subjected to inverse quantization by the inverse quantization unit 68 to inverse orthogonal transform using a property corresponding to the property of the orthogonal transform unit 64.

In step S18, the computing unit 70 adds the prediction image input via the prediction image selecting unit 77 to the locally decoded difference information, and generates a locally decoded image (the image corresponding to the input to the computing unit 63). In step S19, the deblocking filter 71 subjects the image output from the computing unit 70 to filtering. Thus, block distortion is removed. In step S20, the frame memory 72 stores the image subjected to filtering. Note that an image not subjected to filtering processing by the deblocking filter 71 is also supplied from the computing unit 70 to the frame memory 72 for storing.

In step S21, the intra prediction unit 74 and motion prediction/compensation unit 76 each perform image prediction processing. Specifically, in step S21, the intra prediction unit 74 performs intra prediction processing in the intra prediction mode. The motion prediction/compensation unit 76 performs motion prediction and compensation processing in the inter prediction mode.

Figure 17:
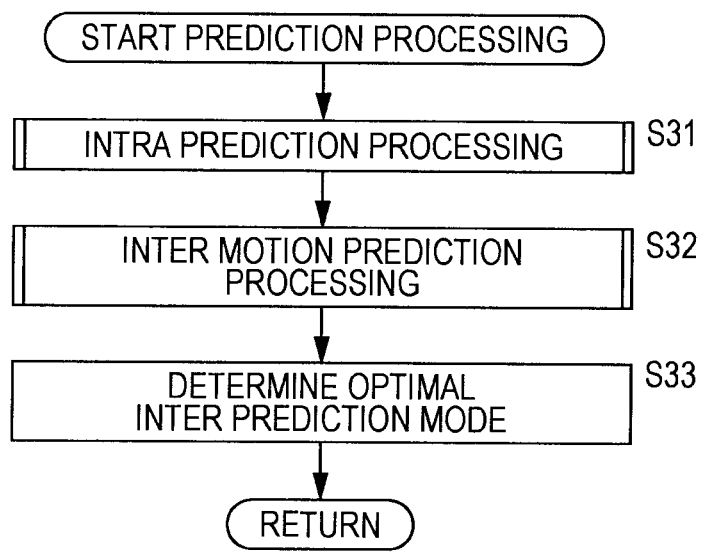
FIG. 17 is a flowchart for describing the prediction processing in step S21 in FIG. 16.

The details of the prediction processing in step S21 will be described later with reference to FIG. 17, but according to this processing, the prediction processes in all of the candidate prediction modes are performed, and the cost function values in all of the candidate prediction modes are calculated. The optimal intra prediction mode is then selected based on the calculated cost function values, and the prediction image generated by the intra prediction in the optimal intra prediction mode, and the cost function value thereof are supplied to the prediction image selecting unit 77.

Note that at this time, before intra prediction processing, the intra prediction unit 74 performs filtering processing as to the neighboring pixels used for inter prediction of the current blocks, using the filter coefficients set by the neighboring pixel interpolation filter switching unit 75. Intra prediction is then performed at the intra prediction unit 74 using the neighboring pixels subjected to filter processing, and the prediction image is generated.

In step S22, the prediction image selecting unit 77 determines one of the optimal intra prediction mode and the optimal inter prediction mode to be the optimal prediction mode based on the cost function values output from the intra prediction unit 74 and the motion prediction/compensation unit 76. The prediction image selecting unit 77 then selects the prediction image in the determined optimal prediction mode, and supplies to the computing units 63 and 70. This prediction image is, as described above, used for calculations in steps S13 and S18.

Note that the selection information of this prediction image is supplied to the intra prediction unit 74 or motion prediction/compensation unit 76. In the event that the prediction image in the optimal intra prediction mode has been selected, the intra prediction unit 74 supplies information indicating the optimal intra prediction mode (i.e., intra prediction mode information) to the lossless encoding unit 66.

In the event that the prediction image in the optimal inter prediction mode has been selected, the motion prediction/compensation unit 76 outputs information indicating the optimal inter prediction mode, and according to need, information according to the optimal inter prediction mode to the lossless encoding unit 66. Examples of the information according to the optimal inter prediction mode include motion vector information, flag information, and reference frame information. That is to say, when a prediction image according to the inter prediction mode as the optimal inter prediction mode is selected, the motion prediction/compensation unit 76 outputs inter prediction mode information, motion vector information, and reference frame information, to the lossless encoding unit 66.

In step S23, the lossless encoding unit 66 encodes the quantized transform coefficient output from the quantization unit 65. Specifically, the difference image is subjected to lossless encoding such as variable length coding, arithmetic coding, or the like, and compressed. At this time, the optimal intra prediction mode information from the intra prediction unit 74, or the information according to the optimal inter prediction mode from the motion prediction/compensation unit 76, and quantization parameters from the rate control unit 78 and so forth, input to the lossless encoding unit 66 in step S22, are also encoded, and added to the header information.

In step S24, the storing buffer 67 stores the difference image as the compressed image. The compressed image stored in the storing buffer 67 is read out as appropriate, and transmitted to the decoding side via the transmission path.

In step S25, the rate control unit 78 controls the rate of the quantization operation of the quantization unit 65 by quantization parameters, based on the compressed image stored in the storing buffer 67, so as not to cause overflow or underflow.

The quantization parameter used for rate control at the quantization unit 65 is supplied to the lossless encoding unit 66, subjected to lossless encoding processing in the above-described step S23, and inserted into the header portion of the compressed image. Also, this quantization parameter is supplied to the neighboring pixel interpolation filter switching unit 75, and used for setting of filter coefficients used in the filtering processing to be performed on neighboring pixels, which is performed prior to the intra prediction.

[Description of Prediction Processing]

Next, the prediction processing in step S21 in FIG. 16 will be described with reference to the flowchart in FIG. 17.

In the event that the image to be processed, supplied from the screen rearranging buffer 62, is an image in a block to be subjected to intra processing, the decoded image to be referenced is read out from the frame memory 72, and supplied to the intra prediction unit 74 via the switch 73.

In step S31, the intra prediction unit 74 performs intra prediction of the pixels of the block to be processed, in all candidate intra prediction modes, using the supplied image. Note that pixels not subjected to deblocking filtering by the deblocking filer 71 are used as decoded pixels to be referenced.

Figure 18:
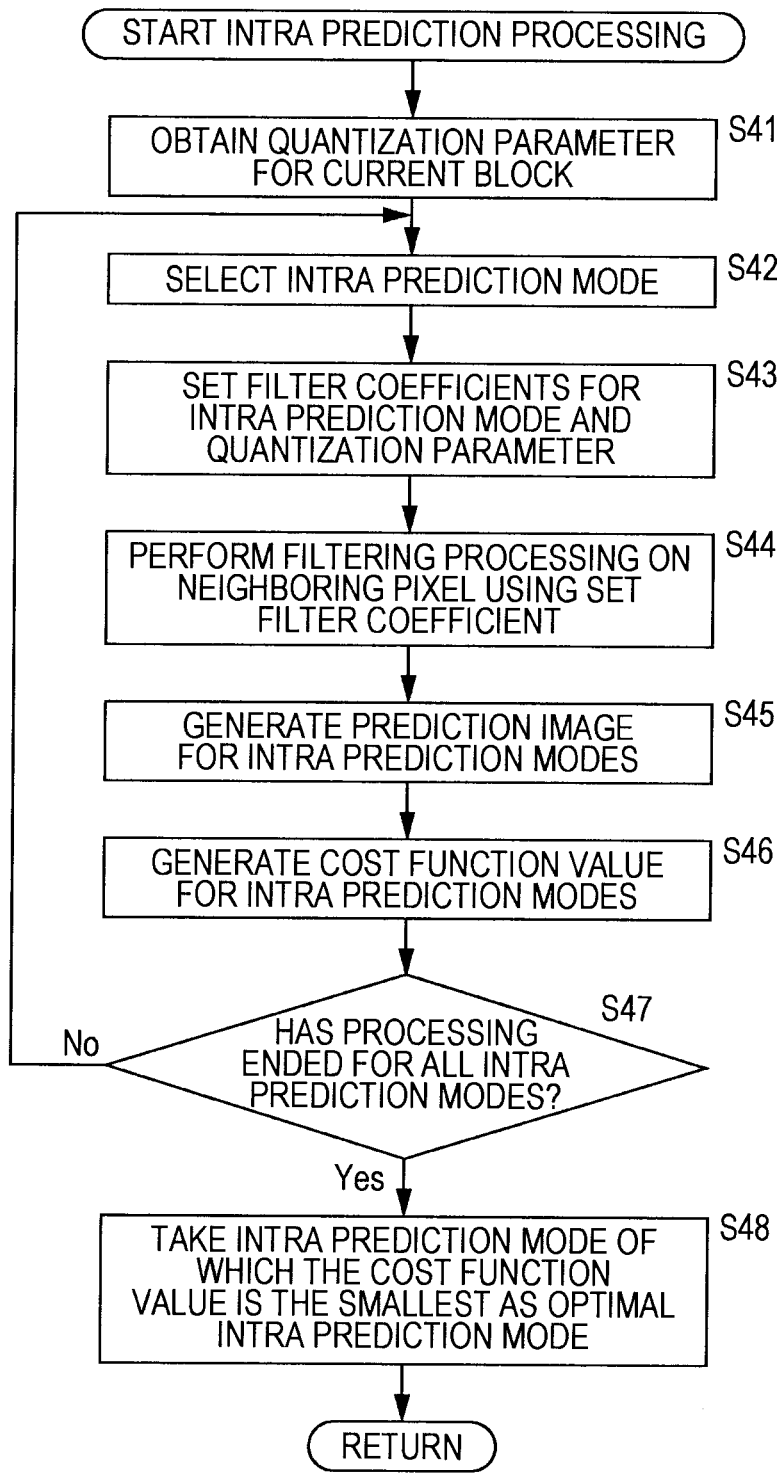
FIG. 18 is a flowchart for describing the intra prediction processing in step S31 in FIG. 17.

The details of the intra prediction processing in step S31 will be described with reference to FIG. 18, but according to this processing, an optimal filter coefficient is set, and filtering processing is performed as to neighboring pixels using the set filter coefficient. The neighboring pixels on which filer processing has been performed has been performed are then used to perform intra prediction, thereby generating a prediction image.

The above-described processing is performed on all candidate intra prediction modes, a cost function value is calculated as to all of the candidate intra prediction modes, and the optimal intra prediction mode is decided based on the calculated cost function values. The prediction image generated thereby and the cost function value of the optimal intra prediction mode are supplied to the prediction image selecting unit 77.

In the event that the image to be processed supplied from the screen rearranging buffer 62 is an image to be subjected to inter processing, the image to be referenced is read out from the frame memory 72, and supplied to the motion prediction/compensation unit 76 via the switch 73. In step S32, based on these images, the motion prediction/compensation unit 76 performs inter motion prediction processing. That is to say, the motion prediction/compensation unit 76 references the image supplied from the frame memory 72 to perform the motion prediction processing in all of the candidate inter prediction modes.

Figure 19:
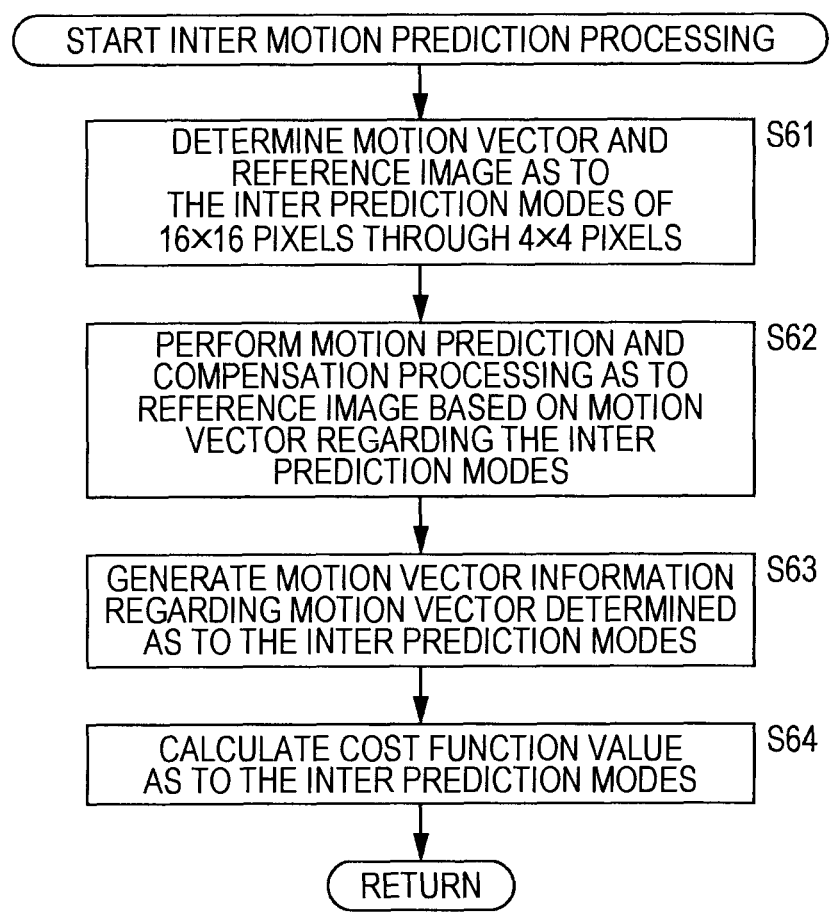
FIG. 19 is a flowchart for describing the inter motion prediction processing in step S32 in FIG. 17.

The details of the inter motion prediction processing in step S32 will be described later with reference to FIG. 19, and according to this processing, the motion prediction processing in all of the candidate inter prediction modes is performed, and a cost function value is calculated as to all of the candidate inter prediction modes.

In step S33, the motion prediction/compensation unit 76 compares the cost function values as to the inter prediction modes calculated in step S32, and determines the prediction mode that provides the minimum value, to be the optimal inter prediction mode. The motion prediction/compensation unit 76 then supplies the prediction image generated in the optimal inter prediction mode, and the cost function value thereof to the prediction image selecting unit 77.

[Description of Intra Prediction Processing]

Next, the intra prediction processing in step S31 in FIG. 17 will be described with reference to the flowchart in FIG. 18. Note that with the example in FIG. 18, description will be made regarding a case of a luminance signal as an example.

Figure 16:
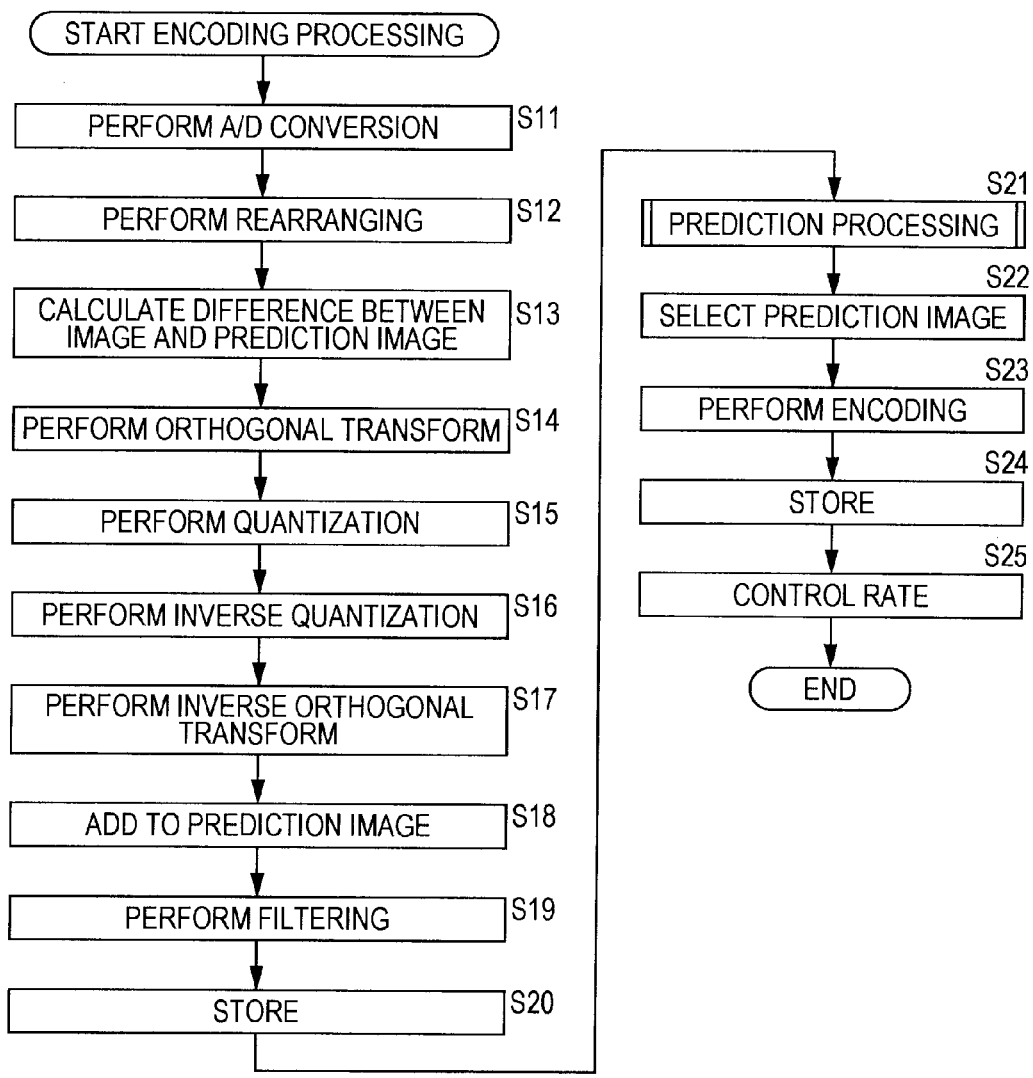
FIG. 16 is a flowchart for describing the encoding processing of the image encoding device in FIG. 1.

In step S25 in the above FIG. 16, the rate control unit 78 supplies a quantization parameter for the current block. In step S41, the quantization parameter buffer 92 obtains the quantization parameter for the current block from the rate control unit 78, and stores this.

In step S42, the prediction image generating unit 82 selects one intra prediction mode from the intra prediction modes of 4×4 pixels, 8×8 pixels, and 16×16 pixels. The selected intra prediction mode information is stored in the prediction mode buffer 91.

The low-pass filter setting unit 93 reads out the intra prediction mode information from the prediction mode buffer 91, and reads out the quantization parameter value from the quantization parameter buffer 92. In step S43, the low-pass filter setting unit 93 then sets, from the filter coefficients calculated for each slice that are stored in the filter coefficient memory 94, a filter coefficient corresponding to the intra prediction mode and quantization parameter. The set filter coefficient is supplied to the neighboring image setting unit 81.

In step S44, the neighboring image setting unit 81 uses the set filter coefficient to perform filtering processing on the neighboring pixel values of the current block, and supplies the neighboring pixel values subjected to filtering processing to the prediction image generating unit 82.

In step S43, the prediction image generating unit 82 uses the neighboring pixel values subjected to filtering processing to perform intra prediction of the current block with the intra prediction mode selected in step S42, and generates a prediction image.

The optimal prediction mode determining unit 83 is supplied with the image to be subjected to intra prediction that has been read out from the screen rearranging buffer 62, the prediction image generated by the prediction image generating unit 82, and the intra prediction mode information thereof.

In step S46, the optimal prediction mode determining unit 83 uses the supplied information to calculate a cost function value for the intra prediction mode with which the prediction image has been generated. Here, calculation of a cost function value is performed based on one of the techniques of a High Complexity mode or Low Complexity mode. These modes are determined in JM (Joint Model) that is reference software in the H.264/AVC format.

Specifically, in the High Complexity mode, tentatively, up to encoding processing is performed as to all of the candidate prediction modes as the processing in step S45. A cost function value represented with the following Expression (73) is calculated as to the prediction modes, and a prediction mode that provides the minimum value thereof is selected as the optimal prediction mode.

$$\text{Cost(Mode)} = D + \lambda \cdot R \tag{73}$$

D represents the difference (distortion) between the original image and a decoded image, R represents a generated code amount including an orthogonal transform coefficient, and $\lambda$ represents a LaGrange multiplier to be provided as a function of a quantization parameter QP.

On the other hand, in the Low Complexity mode, a prediction image is generated, and up to header bits of motion vector information, prediction mode information, flag information, and so forth are calculated as to all of the candidate prediction modes as the processing in step S45. A cost function value represented with the following Expression (74) is calculated as to the prediction modes, and a prediction mode that provides the minimum value thereof is selected as the optimal prediction mode.

$$\text{Cost(Mode)} = D + \text{QPtoQuant}(QP) + \text{Header\_Bit} \tag{74}$$

D represents difference (distortion) between the original image and a decoded image, Header_Bit represents header bits as to a prediction mode, and QPtoQuant is a function provided as a function of the quantization parameter QP.

In the Low Complexity mode, a prediction image is only generated as to all of the prediction modes, and there is no need to perform encoding processing and decoding processing, and accordingly, calculation amount can be reduced.

In step S47, the optimal prediction mode determining unit 83 determines whether or not processing has ended for all intra prediction modes. That is to say, in step S47, determination is made regarding whether or not the processing of steps S42 through S46 has been performed all of the intra prediction modes of 4×4 pixels, 8×8 pixels, and 16×16 pixels.

In the event that determination is made in step S47 that processing has not ended for all intra prediction modes, the processing returns to step S42, and subsequent processing is repeated.

In the event that determination is made in step S47 that processing has ended for all intra prediction modes, the processing advances to step S48. In step S48, the optimal prediction mode determining unit 83 determines the intra prediction mode of which the calculated cost function value is the minimal value, to be the optimal intra prediction mode.

The prediction image of the optimal intra prediction mode, and the corresponding cost function value, are supplied to the prediction image selecting unit 77.

In the event that the prediction image generated in the optimal intra prediction mode is selected by the prediction image selecting unit 77, the optimal prediction mode determining unit 83 supplies information indicating the optimal intra prediction mode to the lossless encoding unit 66. This is then encoded at the lossless encoding unit 66 and added to the header information of the compressed image (step S23 in the above FIG. 16).

Note that the filter coefficients calculated by the learning processing that are stored in the filter coefficient memory 94 are also similarly stored in the image decoding device 151 in FIG. 22 which will be described later, whereby the set filter coefficients do not have to be added to the header information of the compressed image and sent.

Accordingly, in the case of H.264/AVC, there are 51 quantization parameters, there are nine intra prediction modes for 4×4 pixels and 8×8 pixels, and when these combinations are considered, an immense number of filter coefficients, which is 51×9=459, becomes necessary. Information relating to such an immense number of filter coefficients does not have to be sent to the decoding side, so processing can be realized without increasing the overhead for coefficient information.

[Description of Inter Motion Prediction Processing]

Next, the inter motion prediction processing in step S32 in FIG. 17 will be described with reference to the flowchart in FIG. 19.

In step S61, the motion prediction/compensation unit 76 determines a motion vector and a reference image as to each of the eight kinds of the inter prediction modes made up of 16×16 pixels through 4×4 pixels. That is to say, a motion vector and a reference image are each determined as to the block to be processed in each of the inter prediction modes.

In step S62, the motion prediction/compensation unit 76 subjects the reference image to motion prediction and compensation processing based on the motion vector determined in step S61 regarding each of the eight kinds of the inter prediction modes made up of 16×16 pixels through 4×4 pixels. According to this motion prediction and compensation processing, a prediction image in each of the inter prediction modes is generated.

In step S63, the motion prediction/compensation unit 76 generates motion vector information to be added to the compressed image regarding the motion vector determined as to each of the eight kinds of inter prediction modes made up of 16×16 pixels through 4×4 pixels.

The generated motion vector information is also used at the time of calculation of a cost function value in the next step S64, and output, in the event that the corresponding prediction image has ultimately been selected by the prediction image selecting unit 77, to the lossless encoding unit 66 along with the prediction mode information and reference frame information.

In step S64, the motion prediction/compensation unit 76 calculates the cost function value shown in the above-mentioned Expression (73) or Expression (74) as to each of the eight kinds of the inter prediction modes made up of 16×16 pixels through 4×4 pixels. The cost function values calculated here are used at the time of determining the optimal inter prediction mode in step S34 in FIG. 17 described above.

Next, as the second method for calculating an optimal filter coefficient, an example of a case where online processing is performed in which optimal filter coefficients are successively calculated for each slice, will be described with reference to FIG. 20.

Now, in this case, there is the need to send, to the decoding side, the filter coefficients calculated at the encoding side for each slice, and sending filter coefficients having been broken down into a great number of cases leads to deterioration in encoding efficiency. Accordingly, just one filter coefficient is sent for a slice, or just one is sent for each prediction mode for each block size, or just one is sent for prediction mode type, such as horizontal prediction, vertical prediction, and so on.

Also, in the case of the above offline processing, description has been made regarding an example of using intra prediction mode and quantization parameters, as parameters for calculating filter coefficients. On the other hand, in the case of online processing, a great number of parameters for calculating filter coefficients increases the processing amount, so an example will be described with FIG. 20 with regard to an example of using only the intra prediction mode for parameters. While description will be omitted, just quantization parameters may be used, or both parameters may be used, as a matter of course.

[Other Configuration Example of Intra Prediction Unit and Neighboring Pixel Interpolation Filter Switching Unit]

Figure 20:
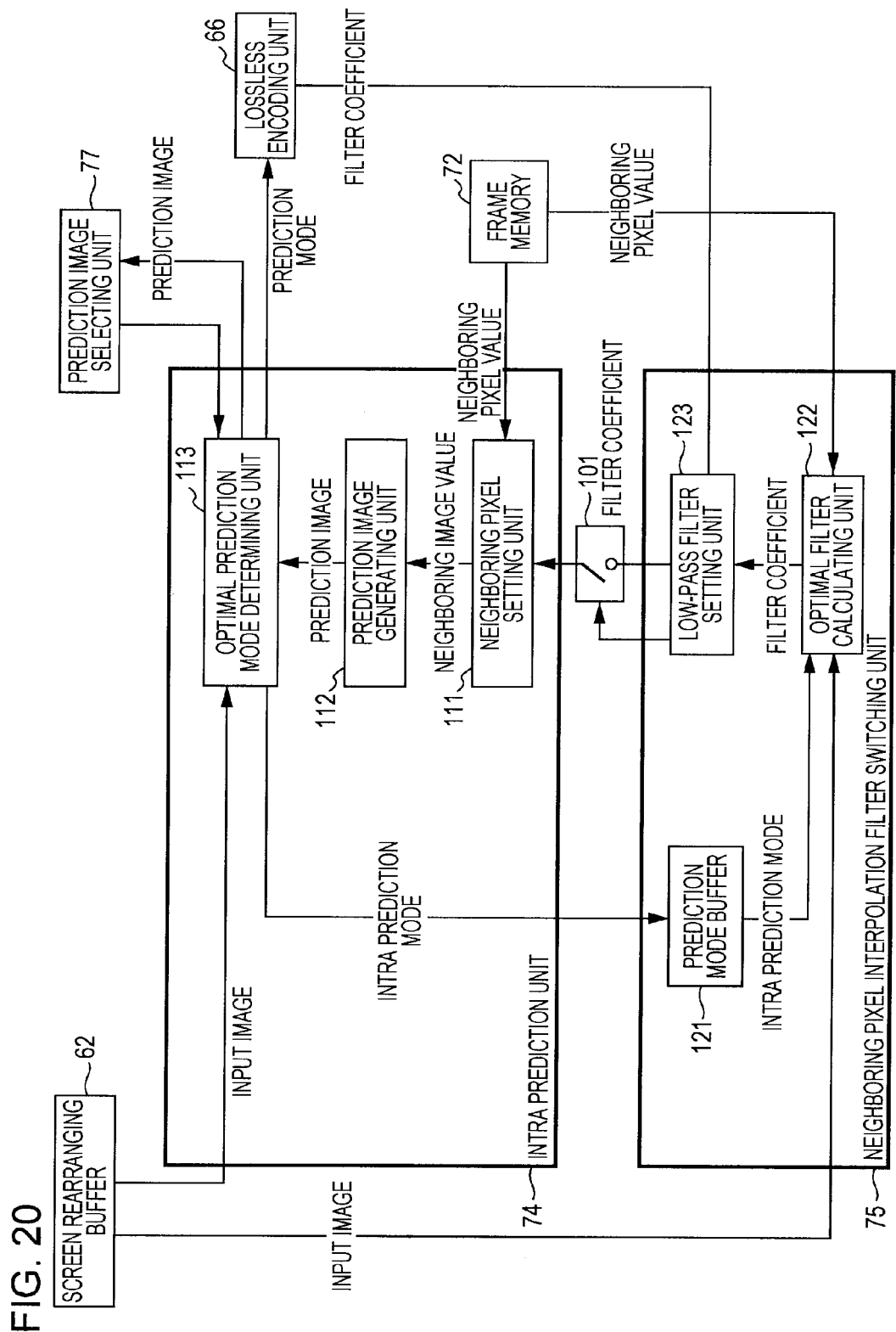
FIG. 20 is a block diagram illustrating another configuration example of an intra prediction unit and neighboring pixel interpolation filter switching unit in FIG. 1.

FIG. 20 is a block diagram illustrating another configuration example of the intra prediction unit 74 and neighboring pixel interpolation filter switching unit 75 and in the case of performing online processing on each slice to successively calculate optimal filter coefficients.

In the case of the example in FIG. 20, a switch 101 is introduced between the intra prediction unit 74 and the neighboring pixel interpolation filter switching unit 75, and unlike the case shown in FIG. 14, by switching the switch 101 on and off, the intra prediction unit 74 performs intra prediction twice. That is to say, with the intra prediction unit 74, intra prediction defined in H.264/AVC is performed in the state that the switch 101 is off, and filter coefficients suitable for the intra prediction are calculated. In the state that the switch 101 is on, intra prediction is performed with the filter coefficient set by the neighboring pixel interpolation filter switching unit 75 out of the calculated filter coefficients.

The intra prediction unit 74 in FIG. 20 is configured of a neighboring pixel setting unit 111, a prediction image generating unit 112, and an optimal prediction mode determining unit 113.

The neighboring pixel interpolation filter switching unit 75 is configured of a prediction mode buffer 121, an optimal filter calculating unit 122, and a low-pass filter setting unit 123.

The neighboring pixel setting unit 111 is supplied with the neighboring pixel values of all current blocks of the current slice for intra prediction from the frame memory 72. In the case in FIG. 20 as well, illustrating of the switch 73 is omitted. Note that in the case of intra prediction, pixel values not subjected to deblocking filtering by the deblocking filter 71 are used as neighboring pixel values.

In the event that the switch 101 is in an off state, the neighboring pixel setting unit 111 subjects the neighboring pixel values of the current block from the frame memory 72 to filtering processing using filter coefficients only for intra prediction modes defined in H.264/AVC, and supplies this to the prediction image generating unit 112. That is to say, only in the case of the 8×8 prediction mode described above with Expression (14) through Expression (24) are the neighboring pixel values subjected to filtering processing subjected to the prediction image generating unit 112. In all other cases, the neighboring pixel values of the current block from the frame memory 72 are supplied to the prediction image generating unit 112 as they are.

In the event that the switch 101 is in the on state, the neighboring pixel setting unit 111 is supplied with filter coefficients from the low-pass filter setting unit 123. Accordingly, the neighboring pixel setting unit 111 subjects the neighboring pixel values of the current block from the frame memory 72 to filtering processing using the filter coefficients set by the low-pass filter setting unit 123, and supplies the neighboring pixel values subjected to filtering processing to the prediction image generating unit 112.

The prediction image generating unit 112 uses the neighboring pixel values from the neighboring pixel setting unit 111 to perform intra prediction of the current block in all intra prediction modes, and generates prediction images. The generated prediction images are supplied to the optimal prediction mode determining unit 113 along with the intra prediction mode information.

The optimal prediction mode determining unit 113 is supplied with the image for intra prediction that has been read out from the screen rearranging buffer 62, the prediction images generated by the prediction image generating unit 112, and the intra prediction mode information thereof.

The optimal prediction mode determining unit 113 uses the supplied information to calculate cost function values for the intra prediction modes by which the prediction images have been generated, and determines the intra prediction mode yielding the smallest value for the calculated cost function values to be the optimal intra prediction mode.

In the event that the switch 101 is in the off state, the optimal prediction mode determining unit 113 supplies the information of the optimal intra prediction mode to the prediction mode buffer 121. In the event that the switch 101 is in the on state, the optimal prediction mode determining unit 113 supplies the prediction image of the optimal intra prediction mode, and the corresponding cost function value, to the prediction image selecting unit 77.

Also, in the event the prediction image generated in the optimal intra prediction mode is selected by the prediction image selecting unit 77, the optimal prediction mode determining unit 113 supplies information indicating the optimal intra prediction mode to the lossless encoding unit 66.

The prediction mode buffer 121 stores the intra prediction mode information from the optimal prediction mode determining unit 113.

The optimal filter calculating unit 122 is supplied with the image for intra prediction that has been read out from the screen rearranging buffer 62, and the neighboring pixel values of the current block from the frame memory 72. The optimal filter calculating unit 122 reads out the intra prediction mode for each block included in the current slice from the prediction mode buffer 121. The optimal filter calculating unit 122 then uses this information to calculate optimal filter coefficients for the intra prediction modes of the current slice as described above with reference to FIG. 15, and supplies the calculated filter coefficients to the low-pass filter setting unit 123.

The low-pass filter setting unit 123 sets, from the filter coefficients of the current slice that have been calculated, a filter coefficient for the current block, turns the terminal of the switch 101 on, and supplies the set filter coefficient to the neighboring pixel setting unit 111. Also, the low-pass filter setting unit 123 supplies the filter coefficient for the current slice to the lossless encoding unit 66.

[Other Description of Intra Prediction Processing]

Next, the intra prediction processing which the intra prediction unit 74 and neighboring pixel interpolation filter switching unit 75 in FIG. 20 perform will be described with reference to the flowchart in FIG. 21. Note that this intra prediction processing is another example of the intra prediction processing of step S31 in FIG. 17.

First, the switch 101 is in an off state. The neighboring pixel setting unit 111 is supplied with neighboring pixel values of all current blocks of the current slice to be subjected to intra prediction, from the frame memory 72. The neighboring pixel setting unit 111 performs filtering processing on the neighboring pixel values of the current block from the frame memory 72 using the filter coefficients only for the 8×8 pixel intra prediction mode defined in H.264/AVC, and supplies to the prediction image generating unit 112. That is to say, in the case of other intra prediction modes, the neighboring pixel values of the current block from the frame memory 72 are supplied to the prediction image generating unit 112 as they are.

In step S101, the prediction image generating unit 112 performs intra prediction processing on all blocks included in the current slice. That is to say, the prediction image generating unit 112 uses the neighboring pixel values of the current block from the neighboring pixel setting unit 111 to perform intra prediction in each intra prediction mode, and generates prediction images.

The optimal prediction mode determining unit 113 is supplied with the image to be subjected to intra prediction that has been read out from the screen rearranging buffer 62, the prediction images generated by the prediction image generating unit 112, and the intra prediction mode information thereof.

In step S102, the optimal prediction mode determining unit 113 uses the supplied information to calculate the cost function values in Expression (73) or Expression (74) described above for all intra prediction modes regarding which a prediction image has been generated.

In step S103, the optimal prediction mode determining unit 113 determines the intra prediction mode where the cost function in Expression (73) or Expression (74) is the smallest to be the optimal intra prediction mode, and supplies the information of the determined intra prediction mode to the prediction mode buffer 121.

The optimal filter calculating unit 122 is supplied with the image to be subjected to intra prediction that has been read out from the screen rearranging buffer 62, and the neighboring pixel values of the current block from the frame memory 72.

The optimal filter calculating unit 122 reads out the intra prediction mode for each block included in the current slice from the prediction mode buffer 121.

In step S104, the optimal filter calculating unit 122 uses this information to calculate a filter coefficient which minimizes the residual of the overall current slice as the optimal filter coefficient for each of the intra prediction modes of the current slice. The filter coefficients calculated as described above with reference to FIG. 15 are supplied to the low-pass filter setting unit 123.

The low-pass filter setting unit 123 sets, from the calculated filter coefficients for the current slice, a filter coefficient corresponding to the current block, turns the terminal of the switch 101 on, and supplies the set filter coefficient to the neighboring pixel setting unit 111.

In step S105, the neighboring pixel setting unit 111 uses the filter coefficient set by the low-pass filter setting unit 123 to perform filtering processing on the neighboring pixel values of the current block from the frame memory 72.

The neighboring pixel values subjected to filter processing are supplied to the prediction image generating unit 112. In step S106, the prediction image generating unit 112 performs intra prediction again on all blocks included in the current slice using the neighboring pixel values subjected to filtering processing, generating a prediction image. The generated prediction image is supplied to the optimal prediction mode determining unit 113 along with the intra prediction mode information.

In the event that the switch 101 is on, the optimal prediction mode determining unit 113 supplies the prediction image of the optimal intra prediction mode, and the corresponding cost function value, to the prediction image selecting unit 77.

In step S22 in FIG. 16 described above, the prediction image selecting unit 77 determines one of the optimal intra prediction mode and optimal inter prediction mode to be the optimal prediction mode, and supplies selection information of the prediction image.

In step S107, the optimal prediction mode determining unit 113 determines whether or not the prediction image of the optimal intra prediction mode has been selected, in accordance with the selection information of the prediction image. In the event that determination is made in step S107 that the prediction image of the optimal intra prediction mode has been selected, the processing advances to step S108.

In step S108, the optimal prediction mode determining unit 113 supplies the intra prediction mode information to the lossless encoding unit 66. Note that, in the event that filter coefficients have not yet been supplied regarding the current slice, the filter coefficient from the optimal filter calculating unit 122 is also supplied to the lossless encoding unit 66.

In the event that determination is made in step S107 that the prediction image of the optimal intra prediction mode has not been selected, the intra prediction processing ends.

Note that a further optimized filter coefficient can be obtained by repeating the processing of the above-described steps S104 through S106.

The encoded compressed image is transmitted via a predetermined transmission path, and decoded by the image decoding device.

[Configuration Example of Image Decoding Device]

FIG. 22 represents the configuration of an embodiment of an image decoding device serving as the image processing device to which the present invention has been applied.

An image decoding device 151 is configured of an storing buffer 161, a lossless decoding unit 162, an inverse quantization unit 163, an inverse orthogonal transform unit 164, a computing unit 165, a deblocking filter 166, a screen rearranging buffer 167, a D/A conversion unit 168, frame memory 169, a switch 170, an intra prediction unit 171, a neighboring pixel interpolation filter switching unit 172, a motion prediction/compensation unit 173, and a switch 174.

The storing buffer 161 stores a transmitted compressed image. The lossless decoding unit 162 decodes information supplied from the storing buffer 161 and encoded by the lossless encoding unit 66 in FIG. 1 using a format corresponding to the encoding format of the lossless encoding unit 66. The inverse quantization unit 163 subjects the image decoded by the lossless decoding unit 162 to inverse quantization using a format corresponding to the quantization format of the quantization unit 65 in FIG. 1. The inverse orthogonal transform unit 164 subjects the output of the inverse quantization unit 163 to inverse orthogonal transform using a format corresponding to the orthogonal transform format of the orthogonal transform unit 64 in FIG. 1.

The output subjected to inverse orthogonal transform is decoded by being added with the prediction image supplied from the switch 174 by the computing unit 165. The deblocking filter 166 removes the block distortion of the decoded image, then supplies to the frame memory 169 for storage, and also outputs to the screen rearranging buffer 167.

The screen rearranging buffer 167 performs rearranging of images. Specifically, the sequence of frames rearranged for encoding sequence by the screen rearranging buffer 62 in FIG. 1 is rearranged to the original display sequence. The D/A conversion unit 168 converts the image supplied from the screen rearranging buffer 167 from digital to analog, and outputs to an unshown display for display.

The switch 170 reads out an image to be subjected to inter processing and an image to be referenced from the frame memory 169, outputs to the motion prediction/compensation unit 173, and also reads out an image to be used for intra prediction from the frame memory 169, and supplies to the intra prediction unit 171.

Information indicating the intra prediction mode obtained by decoding the header information is supplied from the lossless decoding unit 162 to the intra prediction unit 171. The intra prediction unit 171 generates a prediction image by performing filtering processing and intra prediction on the neighboring pixel values using the filter coefficient set by the neighboring pixel interpolation filter switching unit 172, based on this information, and outputs the generated prediction image to the switch 174.

The neighboring pixel interpolation filter switching unit 172 is supplied with at least one of information indicating the intra prediction mode obtained by decoding the header information and information of quantization parameter, in accordance with the encoding at the image encoding device 51, from the lossless decoding unit 162. In the same way as with the neighboring pixel interpolation filter switching unit 75 in FIG. 1, the neighboring pixel interpolation filter switching unit 172 stores filter coefficients corresponding to at least one of the quantization parameter and intra prediction mode, obtained by learning at the learning device 251 in FIG. 28 which will be described later.

The neighboring pixel interpolation filter switching unit 172 sets a filter coefficient corresponding to at least one of the quantization parameter and intra prediction mode from the lossless decoding unit 162. The neighboring pixel interpolation filter switching unit 172 supplies the set filter coefficient to the intra prediction unit 74.

Note that with the neighboring pixel interpolation filter switching unit 172, filer coefficients learned offline beforehand are stored. Note however, in the event that filter coefficients are calculated online with the neighboring pixel interpolation filter switching unit 75 in FIG. 1, these filter coefficients are transmitted hereto for each slice, for example. In this case, the neighboring pixel interpolation filter switching unit 172 uses the filter coefficients decoded by the lossless decoding unit 162.

Information obtained by decoding the header information (prediction mode information, motion vector information, and reference frame information) is supplied from the lossless decoding unit 162 to the motion prediction/compensation unit 173. In the event that information indicating the inter prediction mode has been supplied, the motion prediction/compensation unit 173 subjects the image to motion prediction and compensation processing based on the motion vector information and reference frame information to generate a prediction image. The motion prediction/compensation unit 173 outputs the prediction image generated in the inter prediction mode to the switch 174.

The switch 174 selects the prediction image generated by the motion prediction/compensation unit 173 or intra prediction unit 171, and supplies to the computing unit 165.

Note that with the image encoding device 51 in FIG. 1, intra prediction processing is performed as to all intra prediction modes, for prediction mode determination based on cost function. On the other hand, with the image decoding device 151, intra prediction processing is performed based on only the information of the intra prediction mode sent thereto encoded.

[Configuration Example of Intra Prediction Unit and Neighboring Pixel Interpolation Filter Switching Unit]

Figure 23:
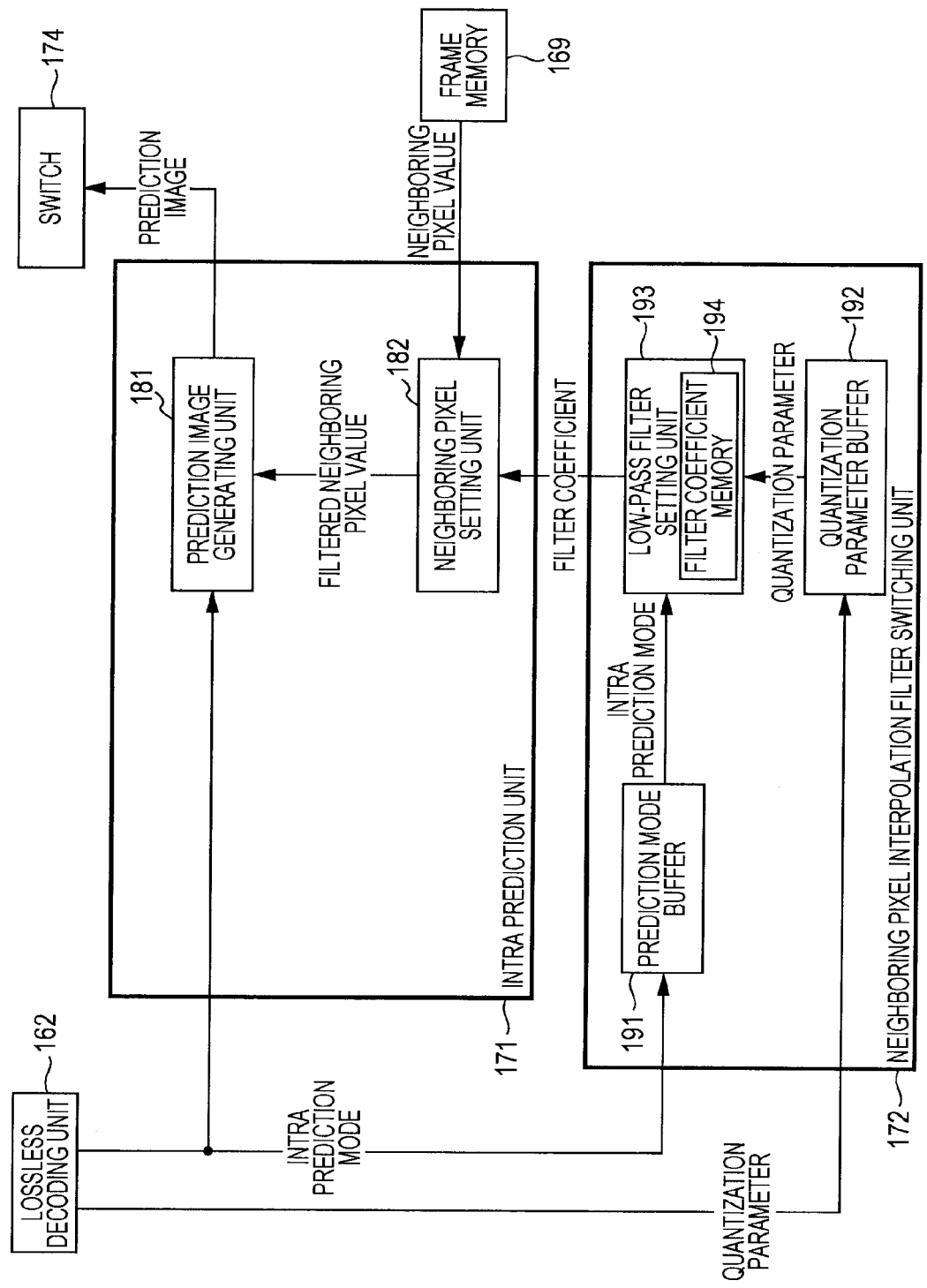
FIG. 23 is a block diagram illustrating a configuration example of an intra prediction unit and neighboring pixel interpolation filter switching unit in FIG. 22.

FIG. 23 is a block diagram illustrating a detailed configuration example of the intra prediction unit and neighboring pixel interpolation filter switching unit. Note that the functional blocks in FIG. 23 correspond to the functional blocks in the case of offline processing with the image encoding device 51 shown in FIG. 14.

In the case of the example in FIG. 23, the intra prediction unit 171 is configured of a prediction image generating unit 181 and a neighboring pixel setting unit 182. The neighboring pixel interpolation filter switching unit 172 is configured of a prediction mode buffer 191, a quantization parameter buffer 192, and a low-pass filter setting unit 193. The low-pass filter setting unit 193 has filter coefficient memory 194 built in.

The prediction image generating unit 181 is supplied with intra prediction mode information from the lossless decoding unit 162 and neighboring pixel values subject to filtering processing from the neighboring pixel setting unit 182. The prediction image generating unit 181 uses the neighboring pixel values supplied thereto to perform intra prediction with the intra prediction mode from the lossless decoding unit 162, generates a prediction image, and supplies the generated prediction image to the switch 174.

The neighboring pixel setting unit 182 is supplied with the neighboring pixel values of the current block to be subjected to intra prediction, from the frame memory 169. In the case of FIG. 23, illustration of the switch 170 is omitted, but actually, the neighboring pixel values are supplied to the neighboring pixel setting unit 182 from the frame memory 169 via the switch 170.

The neighboring pixel setting unit 182 uses filter coefficients set by the low-pass filter setting unit 193, to subject the neighboring pixel values of the current block from the frame memory 169 to filtering processing, and supplies the neighboring pixel values subjected to filtering processing to the prediction image generating unit 181.

The prediction mode buffer 191 stores the intra prediction mode information from the lossless decoding unit 162. The quantization parameter buffer 192 stores the quantization parameter from the lossless decoding unit 162.

The low-pass filter setting unit 193 reads out the intra prediction mode information of the current block from the prediction mode buffer 191, and reads out the quantization parameter corresponding to the current block from the quantization parameter buffer 192. The low-pass filter setting unit 193 sets, from the filter coefficients stored in the built-in filter coefficient memory 194, a filter coefficient corresponding to this information, and supplies the set filter coefficient to the neighboring pixel setting unit 182.

The filter coefficient memory 194 stores filter coefficients corresponding to the quantization parameter and intra prediction mode obtained by learning at the learning device 251 in FIG. 28 to be described later, in the same way as with the filter coefficient memory 94 in FIG. 14.

The filter coefficients are calculated and stored as described above with reference to FIG. 15, for example, for each slice. Note that with the filter coefficient memory 194 as well, the filter coefficients are held as n-bit (where n is an integer) values in accordance with the register length of the processor.

[Description of Decoding Processing of Image Decoding Device]

Next, the decoding processing that the image decoding device 151 executes will be described with reference to the flowchart in FIG. 24.

In step S131, the storing buffer 161 stores the transmitted image. In step S132, the lossless decoding unit 162 decodes the compressed image supplied from the storing buffer 161. Specifically, the I picture, P picture, and B picture encoded by the lossless encoding unit 66 in FIG. 1 are decoded.

At this time, the motion vector information, reference frame information, prediction mode information (information indicating the intra prediction mode or inter prediction mode), quantization parameter information, flag information, and so forth are also decoded.

Specifically, in the event that the prediction mode information is intra prediction mode information, the prediction mode information is supplied to the intra prediction unit 171 and neighboring pixel interpolation filter switching unit 172. Also, in the event that quantization parameter information has been decoded, this also is supplied to the neighboring pixel interpolation filter switching unit 172. In the event that the prediction mode information is inter prediction mode information, motion vector information and reference frame information corresponding to the prediction mode information are supplied to the motion prediction/compensation unit 173.

In step S133, the inverse quantization unit 163 inversely quantizes the transform coefficient decoded by the lossless decoding unit 162 using a property corresponding to the property of the quantization unit 65 in FIG. 1. In step S134, the inverse orthogonal transform unit 164 subjects the transform coefficient inversely quantized by the inverse quantization unit 163 to inverse orthogonal transform using a property corresponding to the property of the orthogonal transform unit 64 in FIG. 1. This means that difference information corresponding to the input of the orthogonal transform unit 64 in FIG. 1 (the output of the computing unit 63) has been decoded.

In step S135, the computing unit 165 adds the prediction image selected in the processing in later-described step S141 and input via the switch 174, to the difference information. Thus, the original image is decoded. In step S136, the deblocking filter 166 subjects the image output from the computing unit 165 to filtering. Thus, block distortion is removed. In step S137, the frame memory 169 stores the image subjected to filtering.

In step S138, the intra prediction unit 171 and motion prediction/compensation unit 173 perform the corresponding image prediction processing in response to the prediction mode information supplied from the lossless decoding unit 162.

Specifically, in the event that the intra prediction mode information has been supplied from the lossless decoding unit 162, the intra prediction unit 171 performs the intra prediction processing in the intra prediction mode. At this time, the intra prediction unit 171 performs filtering processing and intra prediction processing of neighboring pixels using the filter coefficients set by the neighboring pixel interpolation filter switching unit 172.

Figure 25:
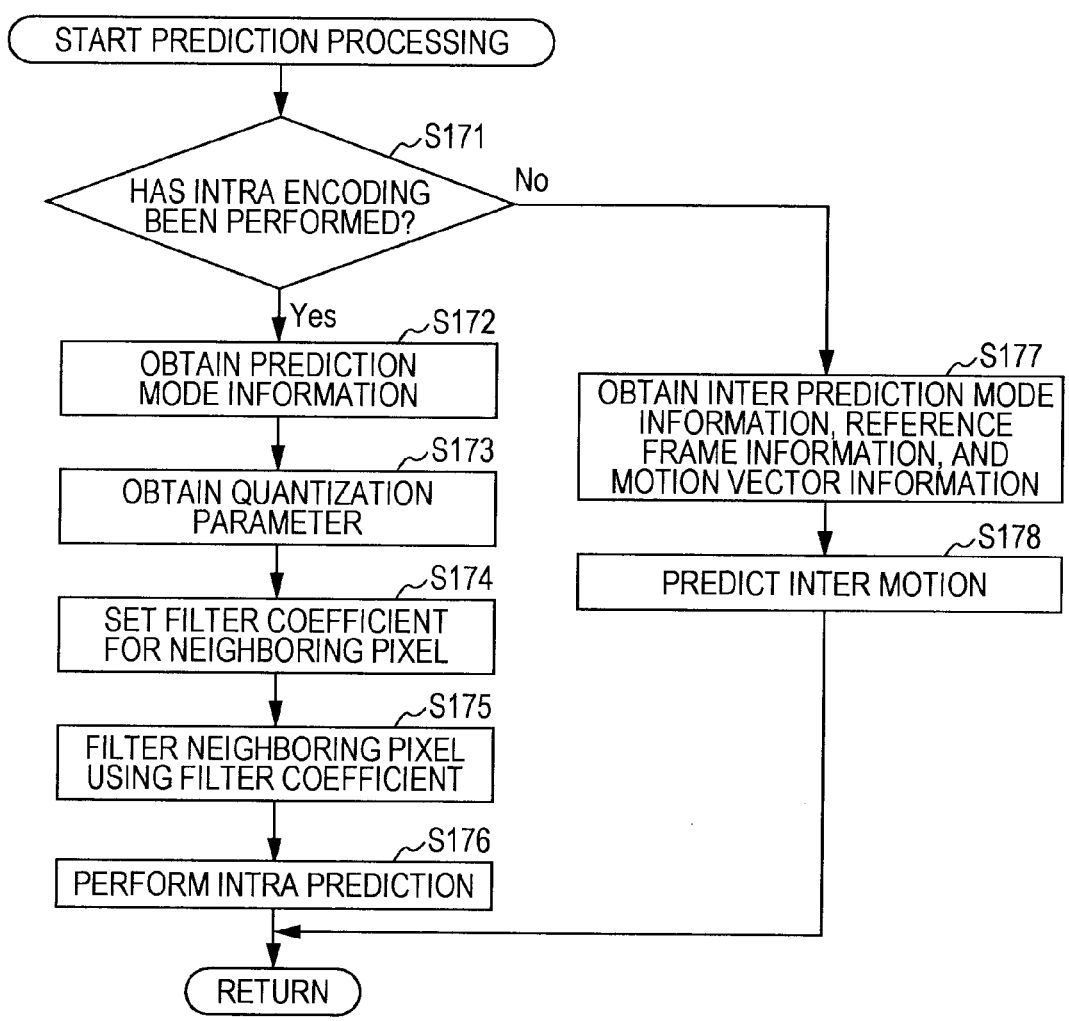
FIG. 25 is a flowchart for describing the prediction processing in step S138 in FIG. 24.

The details of the prediction processing in step S138 will be described later with reference to FIG. 25, but according to this processing, the prediction image generated by the intra prediction unit 171 or the prediction image generated by the motion prediction/compensation unit 173 is supplied to the switch 174.

In step S139, the switch 174 selects the prediction image. Specifically, the prediction image generated by the intra prediction unit 171 or the prediction image generated by the motion prediction/compensation unit 173 is supplied. Accordingly, the supplied prediction image is selected, supplied to the computing unit 165, and in step S134, as described above, added to the output of the inverse orthogonal transform unit 164.

In step S140, the screen rearranging buffer 167 performs rearranging. Specifically, the sequence of frames rearranged for encoding by the screen rearranging buffer 62 of the image encoding device 51 is rearranged in the original display sequence.

In step S141, the D/A conversion unit 168 converts the image from the screen rearranging buffer 167 from digital to analog. This image is output to an unshown display, and the image is displayed.

[Description of Prediction Processing]

Next, the prediction processing in step S138 in FIG. 24 will be described with reference to the flowchart in FIG. 25.

In step S171, the prediction image generating unit 181 determines whether or not the current block has been subjected to intra encoding. Upon the intra prediction mode information being supplied from the lossless decoding unit 162 to the prediction image generating unit 181, in step S171 the prediction image generating unit 181 determines that the current block has been subjected to intra encoding, and the processing proceeds to step S172.

In step S172, the prediction image generating unit 181 receives and obtains the intra prediction mode information from the lossless decoding unit 162. At this time, intra prediction mode information is also supplied to the prediction mode buffer 191 and stored.

Also, upon the quantization parameter information from the lossless decoding unit 162 being supplied to the quantization parameter buffer 192, in step S173 the quantization parameter buffer 192 obtains and stores the quantization parameter.

The low-pass filter setting unit 193 reads out the intra prediction mode information of the current block from the prediction mode buffer 191, and reads out the quantization parameter as to the current block from the quantization parameter buffer 192. In step S174, the low-pass filter setting unit 193 sets, from the filter coefficients for each slice stored in the built-in filter coefficient memory 194, a filter coefficient for the neighboring pixels corresponding to this information. The set filter coefficient is supplied to the neighboring pixel setting unit 182.

In step S175 the neighboring pixel setting unit 182 uses the filter coefficient set by the low-pass filter setting unit 193 to subject the neighboring pixel values of the current block from the frame memory 169 to filtering processing, and supplies the neighboring pixel values subjected to filtering processing to the prediction image generating unit 181.

The prediction image generating unit 181 uses the neighboring pixel values supplied from the neighboring pixel setting unit 182 to perform intra prediction in the intra prediction mode obtained in step S172, and generates a prediction image. The generated prediction image is supplied to the switch 174.

On the other hand, in the event that determination is made in step S171 that intra encoding has not been performed, the processing proceeds to step S177.

In the event that the image to be processed is an image to be subjected to inter processing, the inter prediction mode information, reference frame information, and motion vector information are supplied from the lossless decoding unit 162 to the motion prediction/compensation unit 173. In step S177, the motion prediction/compensation unit 173 obtains the inter prediction mode information, reference frame information, motion vector information, and so forth from the lossless decoding unit 162.

In step S178, the motion prediction/compensation unit 173 then performs inter motion prediction. Specifically, in the event that the image to be processed is an image to be subjected to inter prediction processing, a necessary image is read out from the frame memory 169, and supplied to the motion prediction/compensation unit 173 via the switch 170. In step S177, the motion prediction/compensation unit 173 performs motion prediction in the inter prediction mode to generate a prediction image based on the motion vector obtained in step S176. The generated prediction image is output to the switch 174.

[Other Configuration Example of Intra Prediction Unit and Neighboring Pixel Interpolation Filter Switching Unit]

Figure 26:
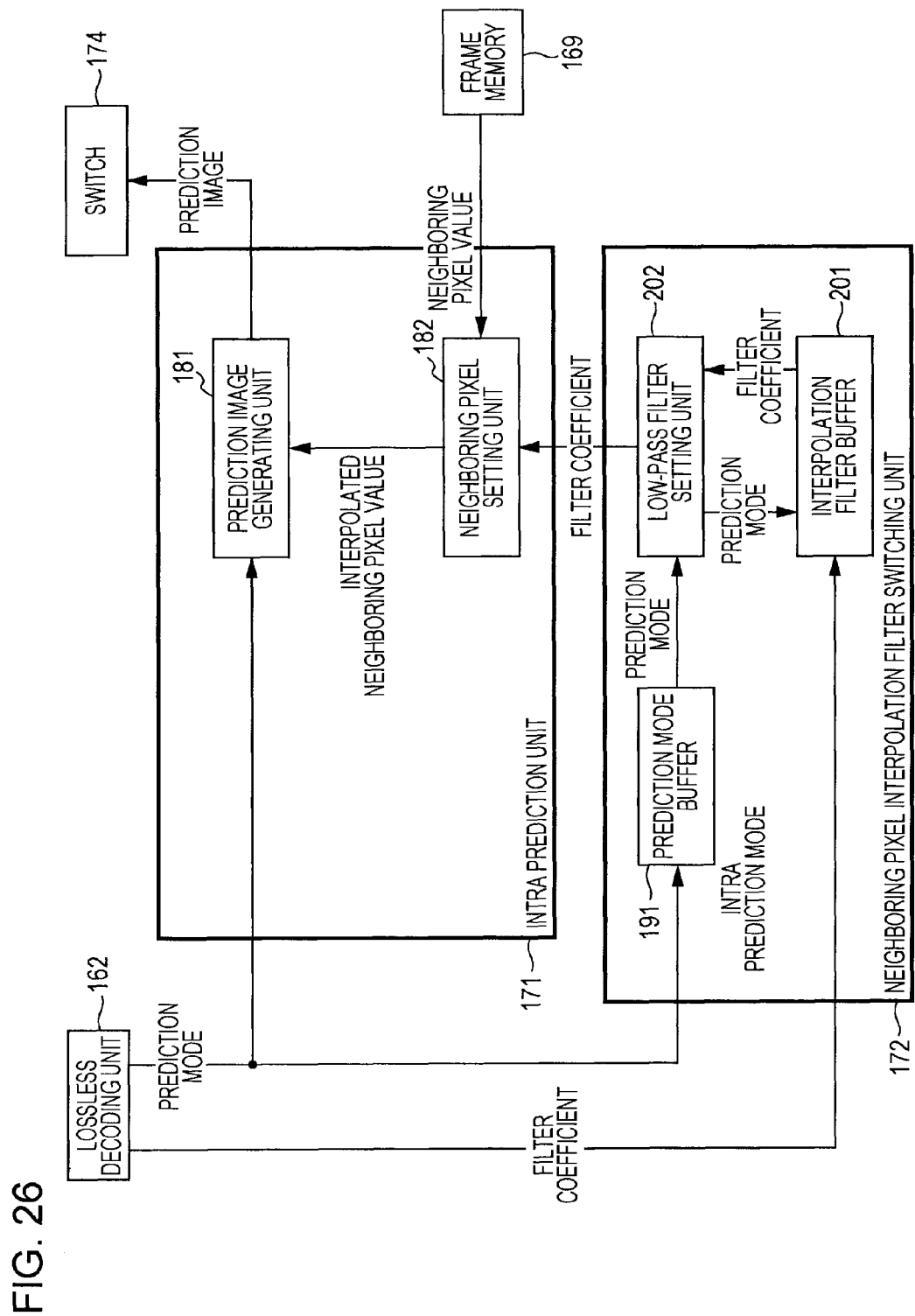
FIG. 26 is a block diagram illustrating another configuration example of an intra prediction unit and neighboring pixel interpolation filter switching unit in FIG. 22.

FIG. 26 is a block diagram illustrating a detailed configuration example of the intra prediction unit and neighboring pixel interpolation filter switching unit. Note that the functional blocks in FIG. 26 correspond to the functional blocks in the case of online processing with the image encoding device 51 shown in FIG. 20.

In the case of the example in FIG. 26, the intra prediction unit 171 is configured of the prediction image generating unit 181 and neighboring pixel setting unit 182 in FIG. 23. The neighboring pixel interpolation filter switching unit 172 is configured of the prediction mode buffer 191 in FIG. 23, and an interpolation filter buffer 201 and a low-pass filter setting unit 202. Note that in the example in FIG. 26, portions corresponding to the case in FIG. 23 are denoted with corresponding reference numerals, and basically perform the same processing, so description thereof will be omitted.

In the case in FIG. 26, filter coefficients calculated regarding the current slice are encoded and sent from the image encoding device 51. Accordingly, the lossless decoding unit 162 decodes this along with other information, and supplies to the interpolation filter buffer 201 of the neighboring pixel interpolation filter switching unit 172.

The interpolation filter buffer 201 obtains the filter coefficient for the current slice from the lossless decoding unit 162 and stores it.

The low-pass filter setting unit 202 reads out the intra prediction mode information of the current block from the prediction mode buffer 191. The low-pass filter setting unit 202 reads out the filter coefficient corresponding to the intra prediction mode that has been read out, from the filter coefficients of the current slice stored in the interpolation filter buffer 201, and sets this as the filter coefficient for the current block. The set filter coefficient is supplied to the neighboring pixel setting unit 182.

[Other Description of Prediction Processing]

Figure 27:
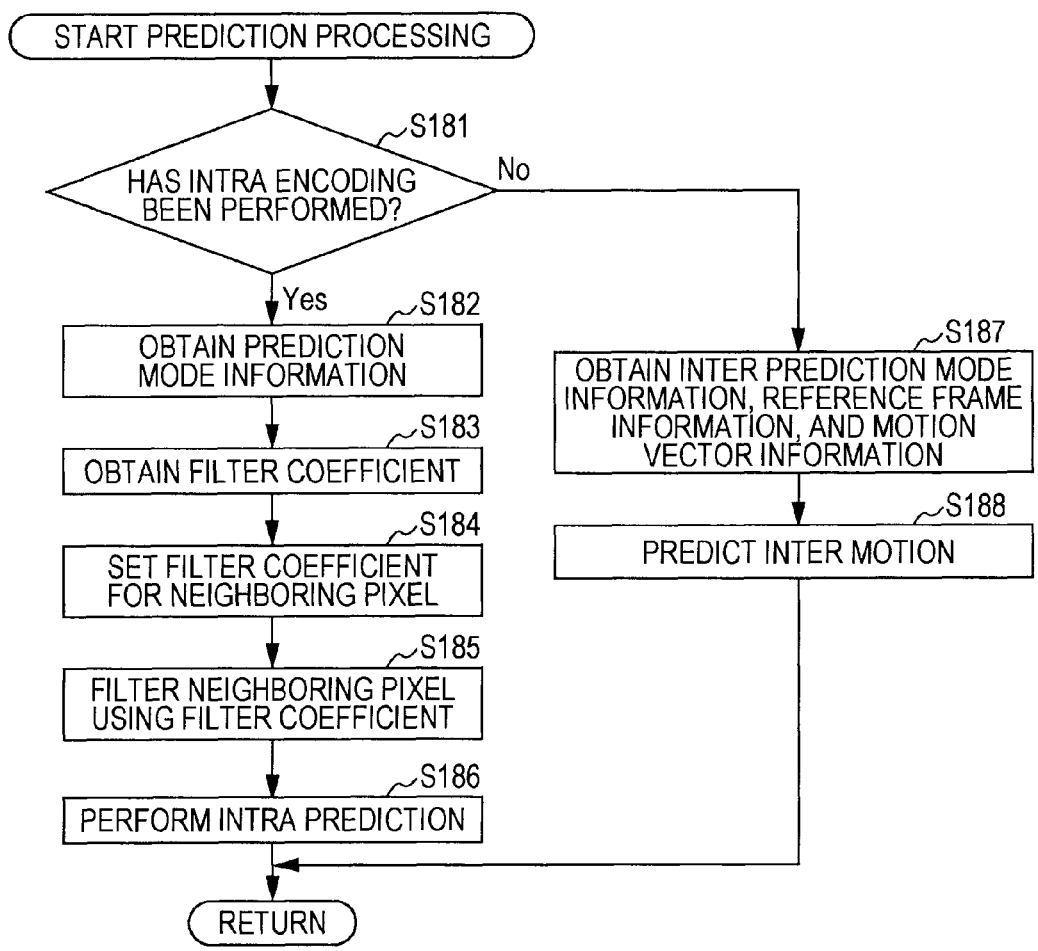
FIG. 27 is a flowchart for describing another example of the prediction processing in step S138 in FIG. 24.

Next, prediction processing in the case of the intra prediction unit 171 and the neighboring pixel interpolation filter switching unit 172 will be described with reference to the flowchart in FIG. 27. Note that this intra prediction processing is another example of the prediction processing in step S138 in FIG. 24. Also, the processing of steps S181, S182, and S185 through S188 in FIG. 27 basically perform the same processing as steps S171, S172, and S175 through S178 in FIG. 25, so detailed description thereof will be omitted.

In step S181, the prediction image generating unit 181 determines whether or not the current block is intra encoded. Upon intra prediction mode information being supplied from the lossless decoding unit 162 to the prediction image generating unit 181, in step S181 the prediction image generating unit 181 determines that the current block is intra encoded, and the processing advances to step S182.

In step S182, the prediction image generating unit 181 receives and obtains the intra prediction mode information from the lossless decoding unit 162. At this time, this intra prediction mode information is also supplied to the prediction mode buffer 191 and stored.

Also, upon the information of filter coefficients for the current slice being supplied from the lossless decoding unit 162 to the interpolation filter buffer 201, the interpolation filter buffer 201 obtains the filter coefficients for the current slice in step S183, and stores. Note that the filter coefficients are supplied for each slice.

The low-pass filter setting unit 202 reads out the intra prediction mode information for the current block from the prediction mode buffer 191. In step S184, the low-pass filter setting unit 202 sets, out of the filter coefficients of the current slice stored in the interpolation filter buffer 201, a filter coefficient for the neighboring pixels, corresponding to the intra prediction mode of the current block. The set filter coefficient is supplied to the neighboring pixel setting unit 182.

In step S185, the neighboring pixel setting unit 182 uses the filter coefficient set by the low-pass filter setting unit 202 to subject the neighboring pixel values of the current block from the frame memory 169 to filtering processing, and supplies the neighboring pixel values subjected to filtering processing to the prediction image generating unit 181.

In step S186, the prediction image generating unit 181 uses the neighboring pixel values supplied from the neighboring pixel setting unit 182 to perform intra prediction with the intra prediction mode obtained in step S172, and generates a prediction image. The generated prediction image is supplied to the switch 174.

On the other hand, in the event that determination is made in step S181 that this is not intra encoded, the processing advances to step S187.

In step S187, the motion prediction/compensation unit 173 obtains inter prediction mode information, reference frame information, motion vector information, and so forth, from the lossless decoding unit 162.

In step S188, the motion prediction/compensation unit 173 performs inter motion prediction. Due to this processing, a generated prediction image is output to the switch 174.

Thus, with the image encoding device 51 in FIG. 1 and the image decoding device 151 in FIG. 22, filtering processing is performed on neighboring pixels used for intra prediction using filter coefficients adaptively set for the image, prior to intra processing. For example, filter coefficients are set in accordance to intra prediction mode or quantization parameter.

Accordingly, noise removal corresponding to images and bit rates can be performed. As a result, prediction efficiency can be improved.

Figure 28:
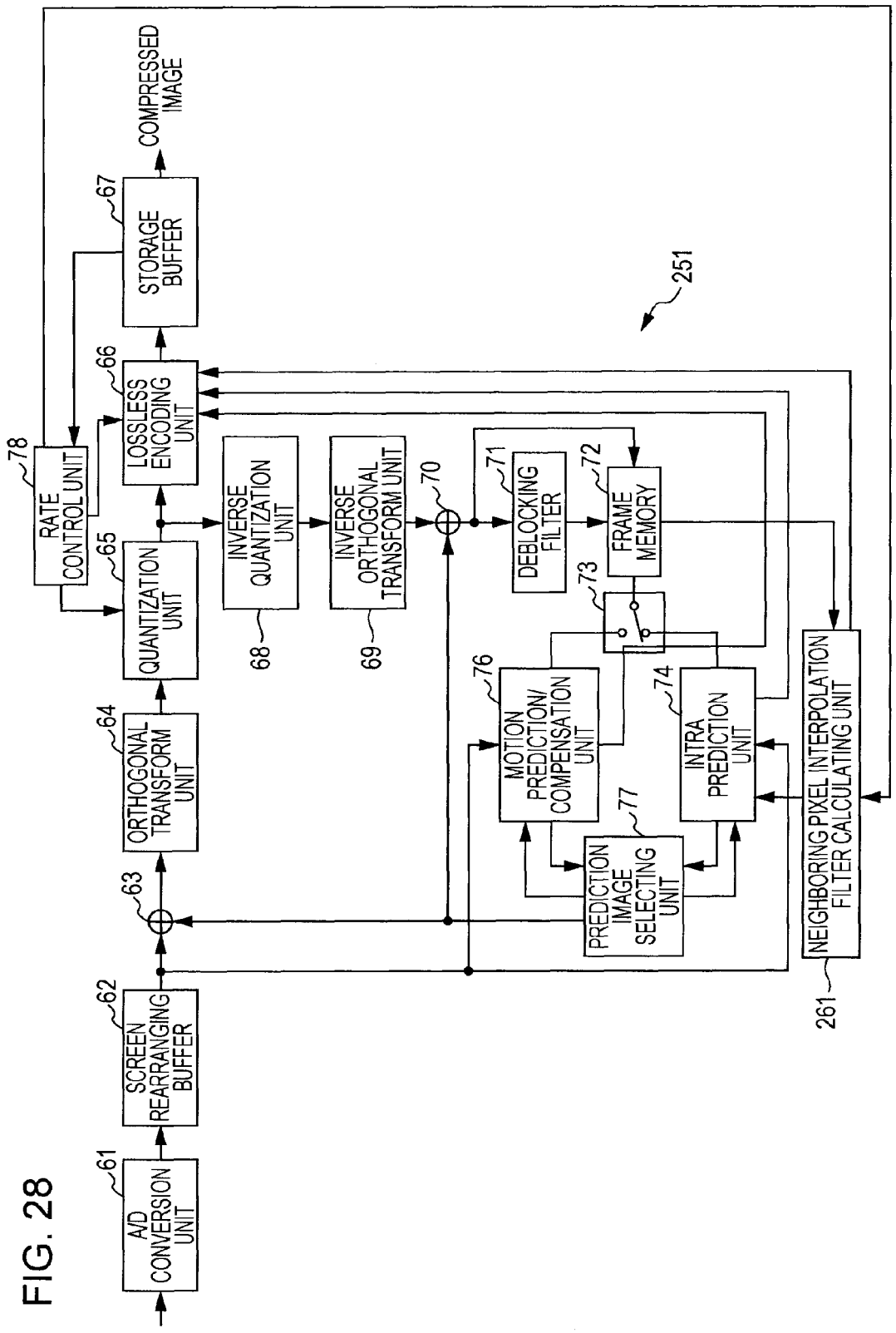
FIG. 28 is a block diagram illustrating the configuration of an embodiment of a learning device to which the present invention has been applied.

FIG. 28 represents the configuration of one embodiment of a learning device to which the present invention has been applied. In the example in FIG. 28, a learning device 251 performs learning processing of filter coefficients using training image signals.

Note that training image signals are test images for obtaining filter coefficients, and a standard sequence used for standardization of image compression encoding, obtainable at www.vqeg.org, for example, may be used. Alternatively, the input image corresponding to each application may also be used. For example, in the event that the input is camera signals, learning may be performed using baseband signals imaged using a CCD or CMOS sensor.

The learning device 251 in FIG. 28 has in common with the image encoding device 51 in FIG. 1 the point of having the A/D conversion unit 61, screen rearranging buffer 62, computing unit 63, orthogonal transform unit 64, quantization unit 65, lossless encoding unit 66, storing buffer 67, inverse quantization unit 68, inverse orthogonal transform unit 69, computing unit 70, deblocking filter 71, frame memory 72, switch 73, intra prediction unit 74, motion prediction/compensation unit 76, prediction image selecting unit 77, and rate control unit 78.

Also, the learning device 251 differs from the image encoding device 51 in FIG. 1 with regard to the points of using training image signals for signals which are used, and including a neighboring pixel interpolation filter calculating unit 261 instead of the neighboring pixel interpolation filter switching unit 75.

Specifically, with the learning device 251, only blocks included in I pictures are used to perform learning. Alternatively, with the learning device 251, only blocks within intra macro blocks included in B pictures and P pictures are used to perform learning. The former needs less computing amount for learning than the latter. Also, in the case of the former, coefficients obtained for blocks obtained included in I pictures may be applied just to blocks included in I pictures, or may be applied to intra macro blocks included in B pictures and P pictures.

That is to say, with the learning device 251, learning by just intra prediction with the intra prediction unit 74 is performed. Accordingly, we will say that the motion prediction/compensation unit 76 does not actually function.

Figure 29:
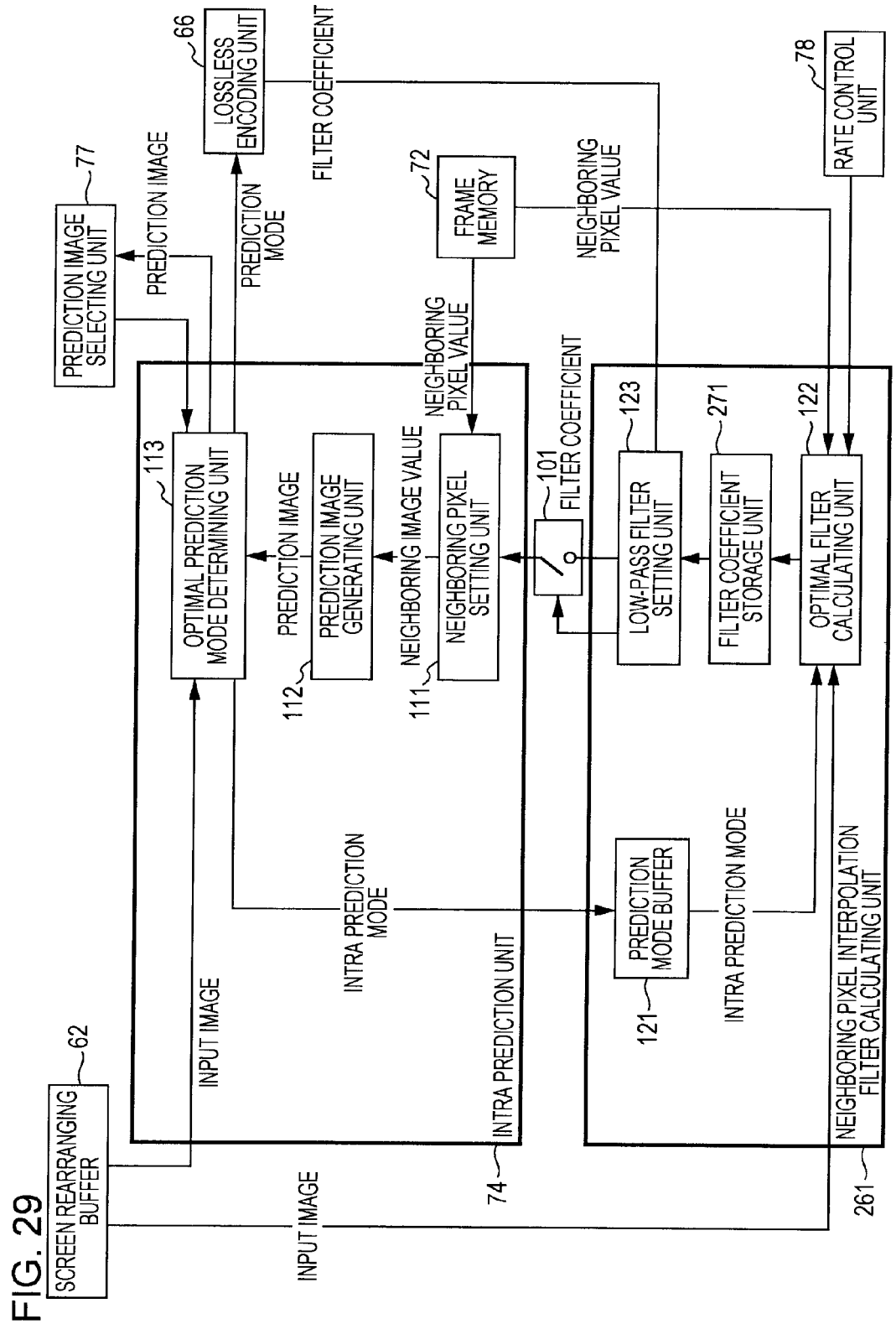
FIG. 29 is a block diagram illustrating a configuration example of an intra prediction unit and neighboring pixel interpolation filter calculating unit in FIG. 28.

Further, the neighboring pixel interpolation filter calculating unit 261 in FIG. 29 has in common with the neighboring pixel interpolation filter switching unit 75 in FIG. 20 the point of having the prediction mode buffer 121, optimal filter calculating unit 122, and low-pass filter setting unit 123.

On the other hand, the neighboring pixel interpolation filter calculating unit 261 in FIG. 29 differs from the neighboring pixel interpolation filter switching unit 75 in FIG. 20 with regard to the points that a filter coefficient storage unit 271 has been added, and quantization parameters from the rate control unit 78 being supplied to the optimal filter calculating unit 122.

Specifically, in the example in FIG. 29, in the same way as with the case of the example in FIG. 20, a switch 101 is provided between the intra prediction unit 74 and the neighboring pixel interpolation filter switching unit 75, and the intra prediction unit 74 performs intra prediction twice in accordance with on/off of the switch 101.

That is to say, with the intra prediction unit 74, in the off state of the switch 101, intra prediction defined in H.264/AVC is performed, and filter coefficients optimal for the intra prediction mode and quantization parameter are calculated for each slice. The calculated filter coefficients for each slice are stored in the filter coefficient storage unit 271. In the on state of the switch 101, then, intra prediction is performed with a filter condition set by the neighboring pixel interpolation filter switching unit 75 out of the filter coefficients for each slice that have been calculated.

The filter coefficients stored in this filter coefficient storage unit 271 are stored in the filter coefficient memory 94 (FIG. 14) of the image encoding device 51 in FIG. 1 and the filter coefficient memory 194 (FIG. 23) of the image decoding device 151 in FIG. 22, via storage medium or network or the like.

[Description of Intra Prediction Processing in Learning Processing]

Next, intra prediction processing which the learning device 251 in FIG. 28 performs as one process of learning processing will be described with reference to the flowchart in FIG. 30. Note that the learning device 251 performs basically the same processing for learning processing as the encoding processing in FIG. 17, except that the prediction processing in step S21 has been replaced with intra prediction processing in step S30.

Figure 30:
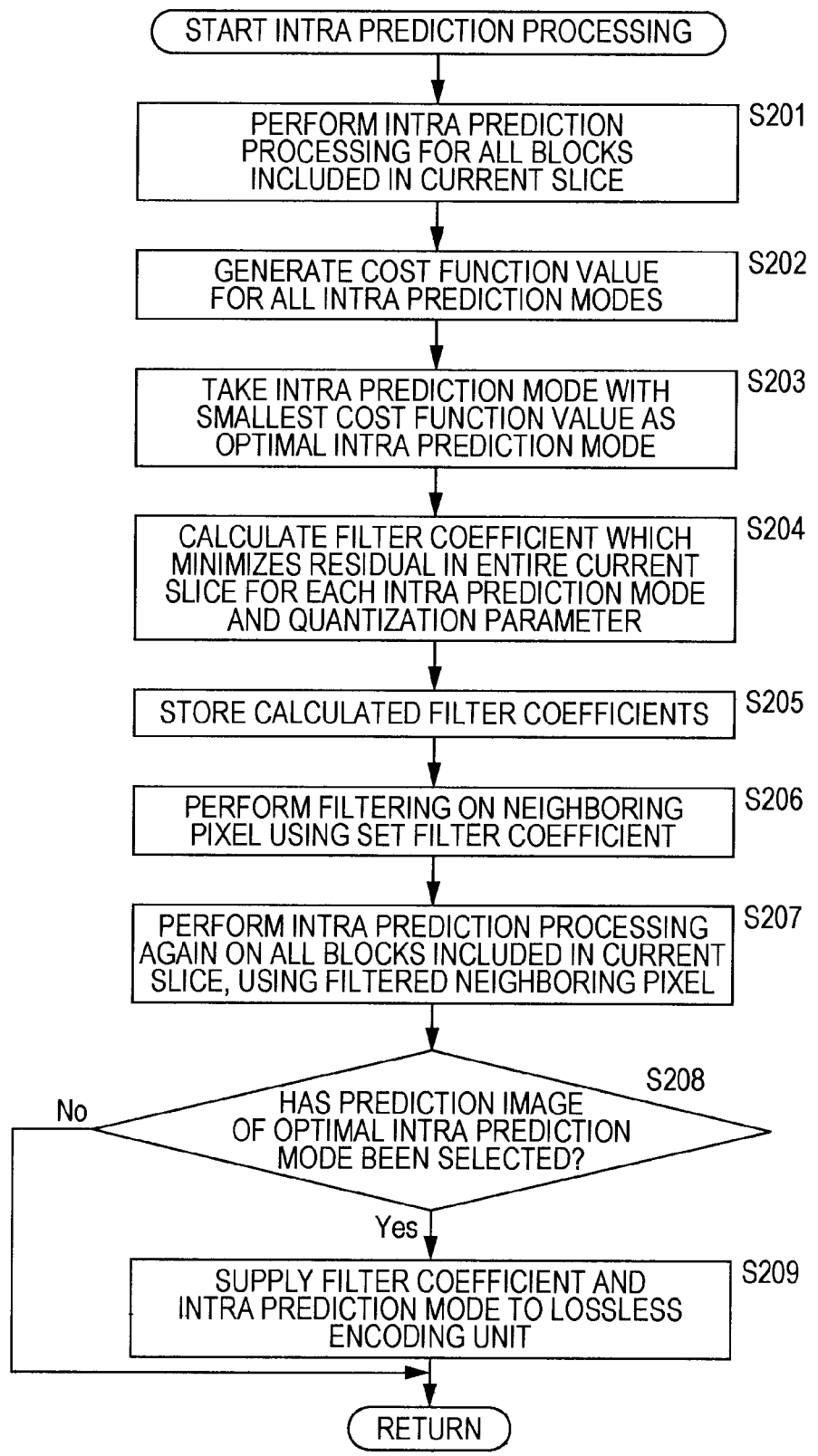
FIG. 30 is a flowchart for describing intra prediction processing with the learning device in FIG. 28.

Also, steps S201 through S203 and S206 through S209 in FIG. 30 basically perform the same processing as steps S101 through S103 and S105 through S108, so redundant description thereof will be omitted. That is to say, in step S204 in FIG. 30, the optimal filter calculating unit 122 calculates a filter coefficient for each inter prediction mode and corresponding quantization parameter of the current slice which minimizes the residual of the entire slice, as optimal filter coefficients. The calculated filter coefficients are supplied to the filter coefficient storage unit 271.

In step S205, the filter coefficient storage unit 271 stores the filter coefficients supplied from the optimal filter calculating unit 122.

The low-pass filter setting unit 123 sets, from the filter coefficients of the current slice stored in the filter coefficient storage unit 271, a filter coefficient corresponding to the current block, turns the terminal of the switch 101 on, and supplies the set filter coefficient to the neighboring pixel setting unit 111.

Accordingly, in step S206, the set filter coefficient is used to perform filtering processing on the neighboring pixel values of the current block, from the frame memory 72.

Figure 21:
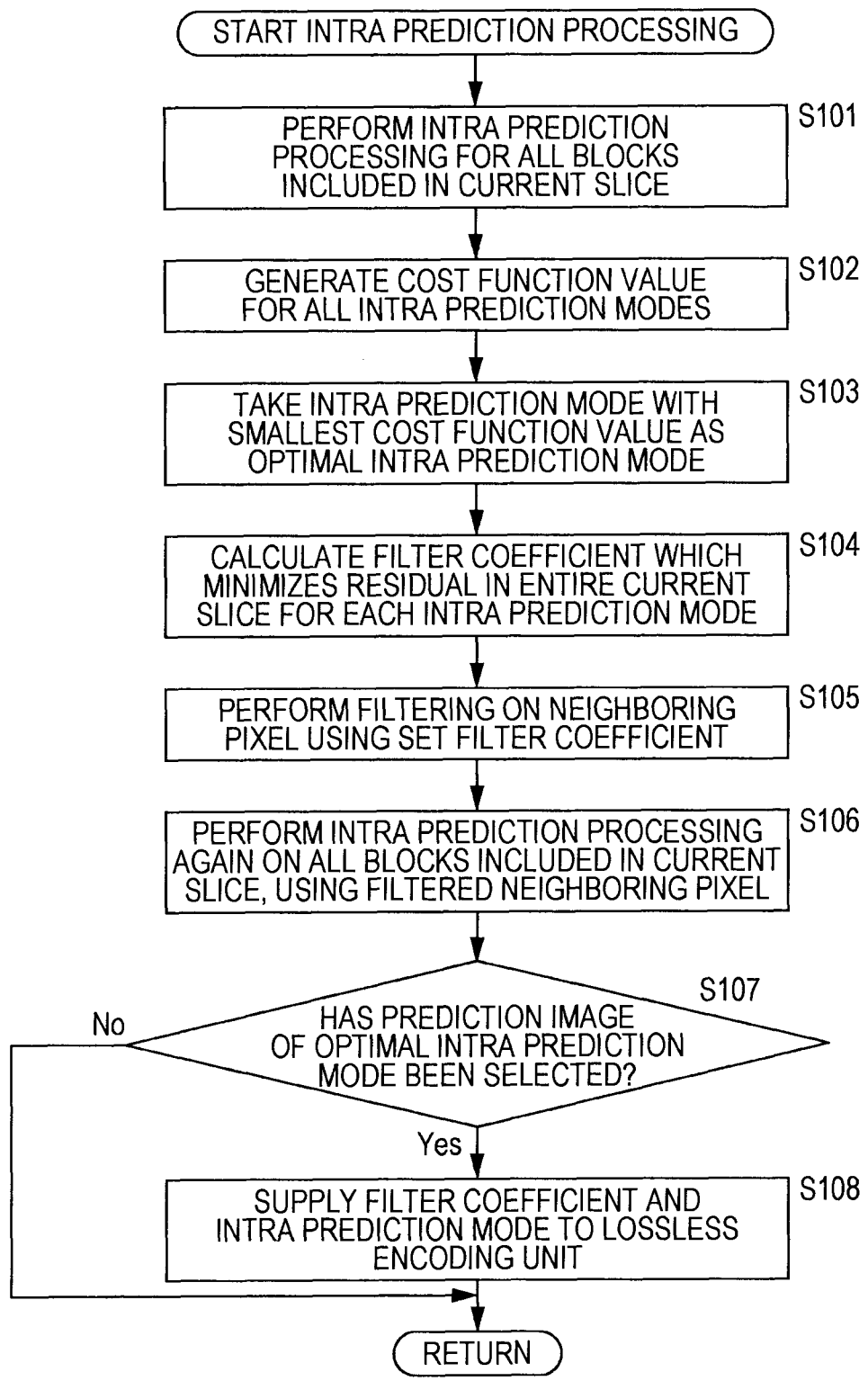
FIG. 21 is a flowchart for describing another example of the intra prediction processing in step S31 in FIG. 17.

Of course, in the same way as with the example in FIG. 21, repeating the processing of steps S204 through S207 described above enables further optimized filter coefficients to be obtained.

As described above, with the learning device 251, processing the same as with actually-used encoding processing is performed using training image signals, and filter coefficients calculated thereby are stored to the filter coefficient storage unit 271. Accordingly, optimal filter coefficients can be obtained.

The filter coefficients stored in this filter coefficient storage unit 271 are stored in the filter coefficient memory 94 (FIG. 14) of the image encoding device 51 in FIG. 1 and the filter coefficient memory 194 (FIG. 23) of the image decoding device 151 in FIG. 22, via storage medium or network or the like.

Also, with the image encoding device 51, as described above, coefficients obtained for blocks obtained included in I pictures (or intra macro blocks included in B pictures and P pictures) may be applied just to blocks included in I pictures. Alternatively, may be applied to intra macro blocks included in B pictures and P pictures, not only blocks included in I pictures.

Accordingly, high encoding efficient can be realized with the image encoding device 51 in FIG. 1 and the image decoding device 151 in FIG. 22.

Note that with the above-described orthogonal transform unit 64 and inverse orthogonal transform unit 69 of the image encoding device 51 in FIG. 1 and the inverse orthogonal transform unit 164 of the image decoding device 151 in FIG. 22, orthogonal transform/inverse orthogonal transform defined in H.264/AVC is performed. Alternatively, an arrangement may be made wherein the orthogonal transform unit 64 and inverse orthogonal transform unit 69 of the image encoding device 51 in FIG. 1 and the inverse orthogonal transform unit 164 of the image decoding device 151 in FIG. 22 perform the orthogonal transform/inverse orthogonal transform proposed in NPL 1.

Accordingly, the encoding efficiency of the format proposed in NPL 1 can be further improved.

Note that while an example of performing intra prediction has been described in the above description, the present invention can also be applied to intra prediction in second order prediction proposed in NPL 2 as well.

2. Second Embodiment

[Other Configuration Example of Image Encoding Device]

Figure 31:
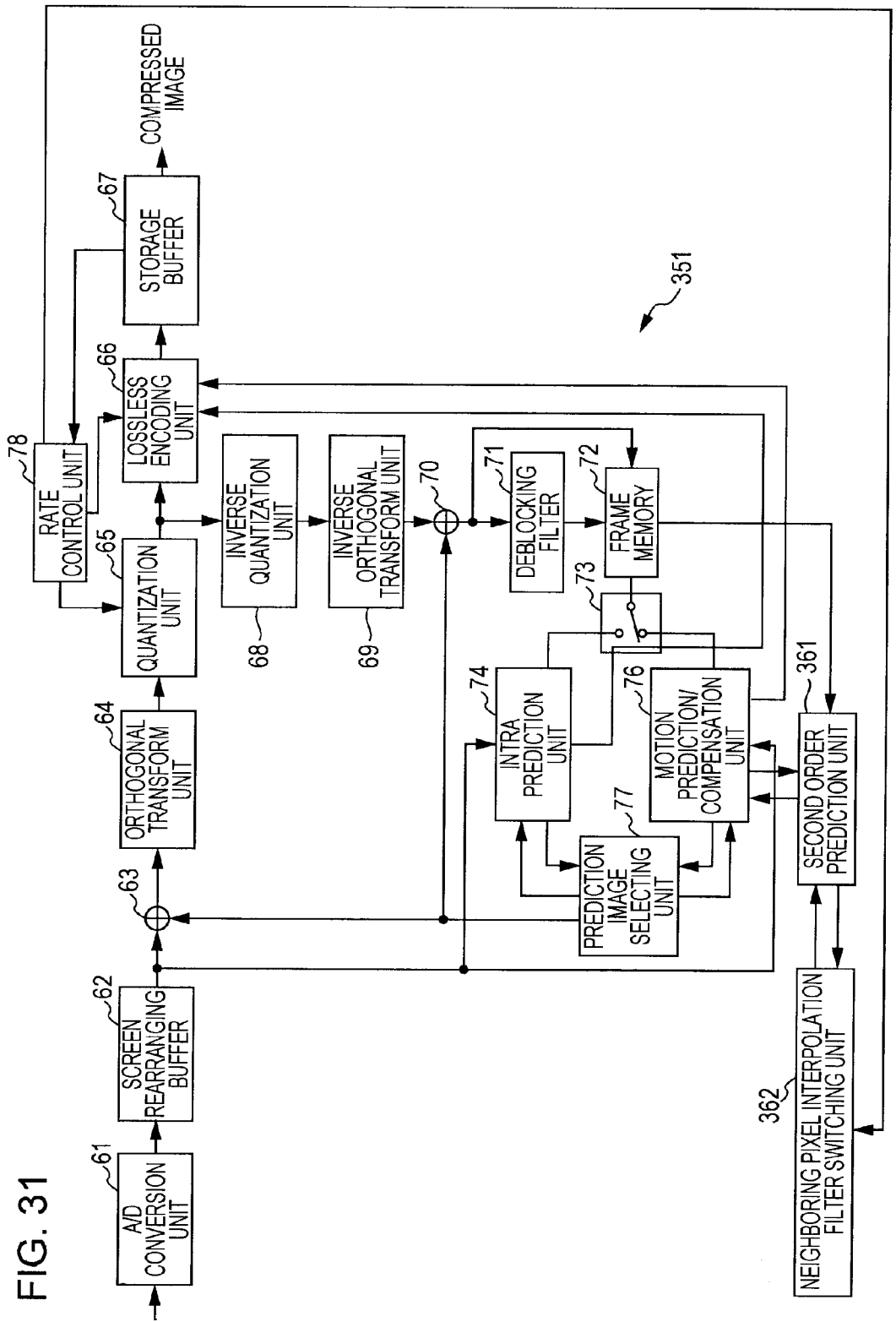
FIG. 31 is a block diagram illustrating the configuration of another embodiment of an image encoding device to which the present invention has been applied.

FIG. 31 shows the configuration of another embodiment of an image encoding device serving as an image processing device to which the present invention has been applied.

An image encoding device 351 has in common with the image encoding device 51 in FIG. 1 the point of having the A/D conversion unit 61, screen rearranging buffer 62, computing unit 63, orthogonal transform unit 64, quantization unit 65, lossless encoding unit 66, storing buffer 67, inverse quantization unit 68, inverse orthogonal transform unit 69, computing unit 70, deblocking filter 71, frame memory 72, switch 73, intra prediction unit 74, motion prediction/compensation unit 76, prediction image selecting unit 77, and rate control unit 78.

Also, the image encoding device 351 differs from the image encoding device 51 in FIG. 1 with regard to the points that the neighboring pixel interpolation filter switching unit 75 is omitted, and a second order prediction unit 361 and a neighboring pixel interpolation filter switching unit 362 have been added.

That is to say, with the example in FIG. 31, the intra prediction unit 74 performs H.264/AVC intra prediction.

On the other hand, the motion prediction/compensation unit 76 detects motion vectors for all candidate inter prediction modes, based on the image for inter processing and a reference image, subjects the reference image to compensation processing based on the motion vectors, and generates a prediction image.

The motion prediction/compensation unit 76 supplies the second order prediction unit 361 with detected motion vector information, information of an image for inter processing (address, etc.), and first order residual which is the difference between the image for inter prediction and the generated prediction image.

The motion prediction/compensation unit 76 determines an optimal intra production mode in the second order prediction by comparing the second order residuals from the second order prediction unit 361. Also, the motion prediction/compensation unit 76 determines whether to encode the second order residual or to encode the first order residual, by comparing the second order residual with the first order residual. Note that this processing is performed on all candidate inter prediction modes.

The motion prediction/compensation unit 76 calculates cost function values for all candidate inter prediction modes. At this time, of the first order residual and second order residual, the residual determined for each inter prediction mode is used to calculate the cost function value. The motion prediction/compensation unit 76 determines the prediction mode of which yields the smallest value of the calculated cost function values to be the optimal inter prediction mode.

The motion prediction/compensation unit 76 supplies the prediction image generated in the optimal inter prediction mode (or difference between image for inter and second order residual), and the cost function value thereof to the prediction image selecting unit 77. In the event the prediction image generated by the prediction image selecting unit 77 in the optimal inter prediction mode has been selected, the motion prediction/compensation unit 76 outputs information indicating the optimal inter prediction mode to the lossless encoding unit 66.

At this time, motion vector information, reference frame information, a second order prediction flag indicating that second order prediction is to be performed, information of the intra prediction mode in second order prediction, and so forth, are also output to the lossless encoding unit 66. The lossless encoding unit 66 also subjects the information from the motion prediction/compensation unit 76 to lossless encoding processing such as variable length coding, arithmetic coding, or the like, and inserts into the header portion of the compressed image.

Based on the motion vector information from the motion prediction/compensation unit 76 and information of the image to be subjected to inter processing, the second order prediction unit 361 reads out current neighboring pixels neighboring the current block which is to be subjected to inter processing, from the frame memory 72. Also, the second order prediction unit 361 reads out reference neighboring pixels neighboring the reference block correlated with the current block by motion vector information, from the frame memory 72.

The second order prediction unit 361 performs second order prediction processing. Second order prediction processing is processing wherein intra prediction is performed between the first order residual and the difference between the current neighboring pixels and reference neighboring pixels, thereby generating information of second order difference (second order residual).

Now, second order prediction processing will be described with reference to FIG. 32.

Figure 32:
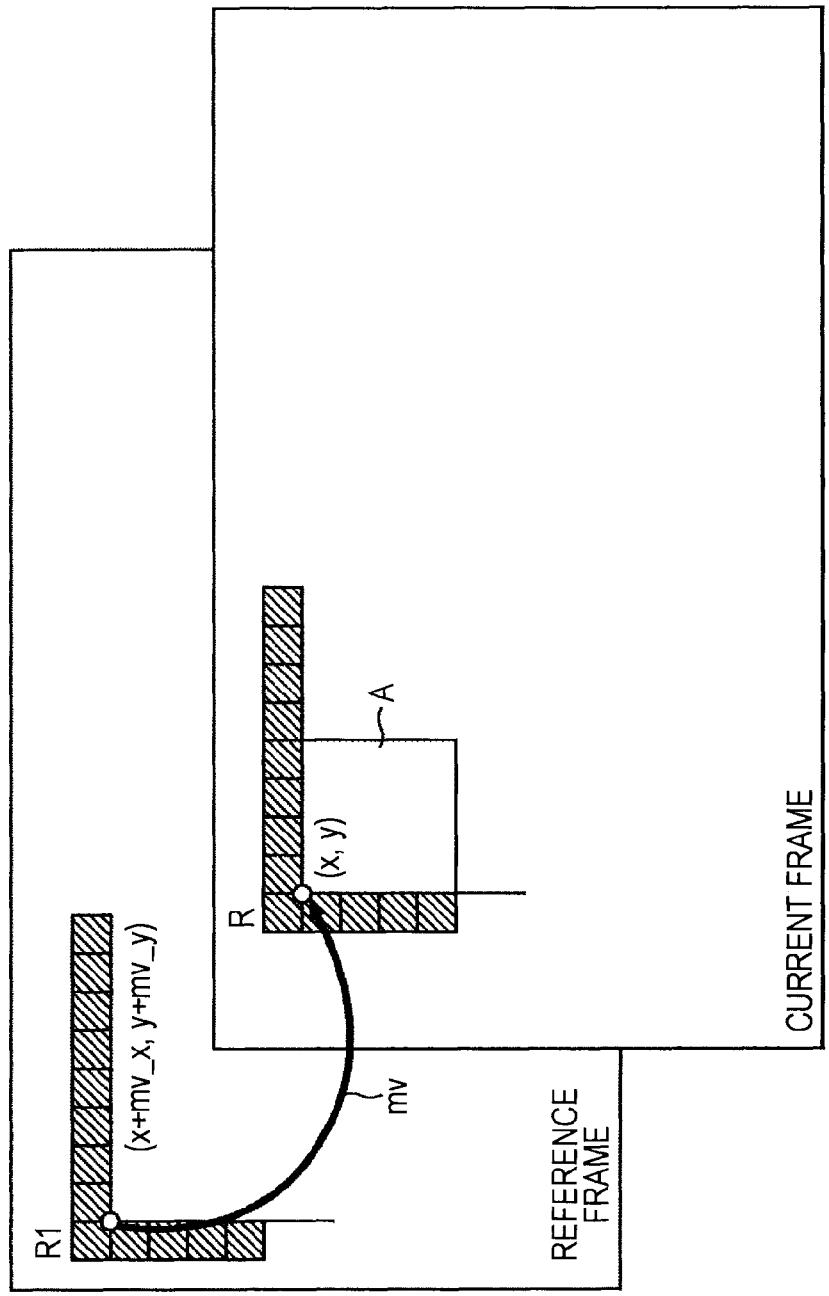
FIG. 32 is a diagram for describing second order prediction processing.

With the example in FIG. 32, a current frame and reference frame as shown, with a current block A shown in the current frame.

In the event that a motion vector mv(mv_x, mv_y) is obtained in the reference frame and current frame regarding the current block A, difference information (residual) between the current block A and the block correlated with the current bloc A by the motion vector my is calculated.

With the second order prediction system, not only difference information relating to the current block A, but also difference information between a neighboring pixel group R neighboring the current block A and a neighboring pixel group R1 correlated with the neighboring pixel group R by a motion vector mv, is calculated.

That is to say, the coordinates of the neighboring pixel group R are obtained from the upper left coordinates (x, y) of the current block A. Also, the coordinates of the neighboring pixel group R1 are obtained from the upper left coordinates (x+mv_x, y+mv_y) of the block correlated with the current block A by the motion vector mv. Difference information of the neighboring pixel groups is calculated from these coordinate values.

With the second order prediction system, intra prediction according to the H.264/AVC format is performed between the difference information relating to eh current block thus calculated, and difference information relating to the reference pixels, thereby generating second order different information. The generated second order difference information is subjected to orthogonal transform and quantization, encoded along with the compressed image, and sent to the decoding side.

Prior to this second order prediction, the second order prediction unit 361 uses the filter coefficients set by the neighboring pixel interpolation filter switching unit 362 to performing filtering processing on the difference between the current neighboring pixels used of r intra prediction and the reference neighboring pixels. The second order prediction unit 361 then uses the filtered difference between the current neighboring pixels and reference neighboring pixels subjected to filtering processing to perform second order prediction processing, and outputs the second order difference information (second order residual) to the motion prediction/compensation unit 76.

That is to say, the second order prediction unit 361 is configured including the intra prediction unit 74 shown in FIG. 14, and so forth.

The neighboring pixel interpolation filter switching unit 362 is configured basically in the same way as the neighboring pixel interpolation filter switching unit 75 in FIG. 1, and perform the same processing. That is to say, the neighboring pixel interpolation filter switching unit 362 sets filter coefficients according to intra prediction mode information from the second order prediction unit 361 and quantization parameters from the rate control unit 78, and supplies the set filter coefficients to the second order prediction unit 361.

Note that the encoding processing of the image encoding device 351 in FIG. 31 differs from the encoding processing in FIG. 16 performed by the image encoding device 51 in FIG. 1 only regarding the following intra processing and motion prediction processing, and other processing is basically the same, so description thereof will be omitted.

That is to say, with the image encoding device 351 in FIG. 31, intra prediction according to the H.264/AVC format is performed as intra processing. Also, as motion prediction processing, the filter coefficients set by the neighboring pixel interpolation filter switching unit 362 are used at the time of motion prediction processing, thereby generating second order difference information. That with the better second order difference information is selected from the first order difference information and second order difference information, and the optimal inter prediction mode is determined by the cost function values being compared.

An image decoding device which receives a compressed image encoded by this image encoding device 351 and decodes this will be described with reference to FIG. 33.

[Other Example of Image Decoding Device]

Figure 33:
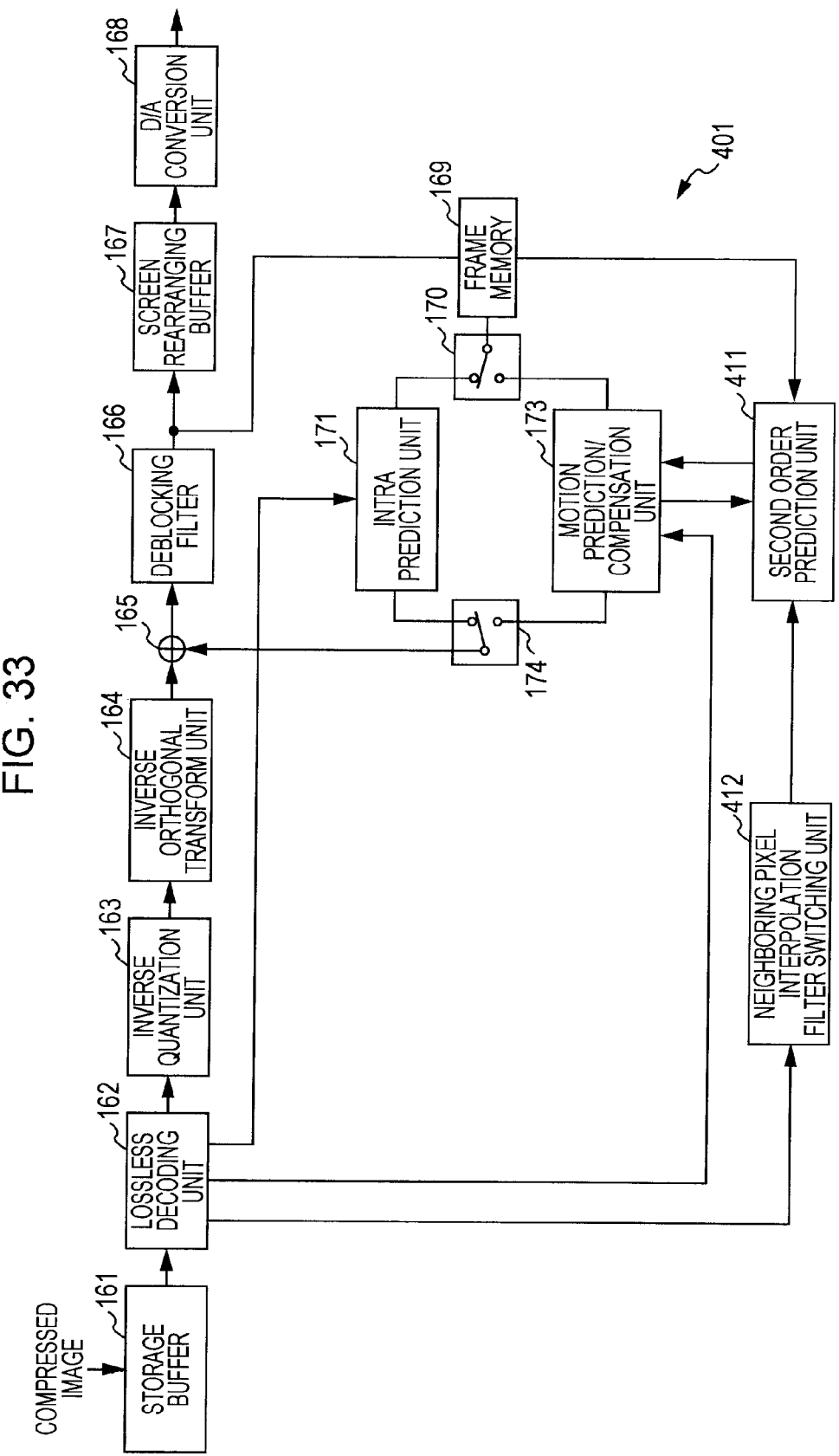
FIG. 33 is a block diagram illustrating the configuration of another embodiment of an image decoding device to which the present invention has been applied.

FIG. 33 represents the configuration of another embodiment of an image decoding device serving as the image processing device to which the present invention has been applied.

An image decoding device 401 has in common with the image decoding device 151 in FIG. 22 the point of including the storing buffer 161, lossless decoding unit 162, inverse quantization unit 163, inverse orthogonal transform unit 164, computing unit 165, deblocking filter 166, screen rearranging buffer 167, D/A conversion unit 168, frame memory 169, switch 170, intra prediction unit 171, motion prediction/compensation unit 173, and switch 174.

Also, the image decoding device 401 differs from the image decoding device 151 in FIG. 22 regarding the points of the neighboring pixel interpolation filter switching unit 172 having been omitted, and a second order prediction unit 411 and a neighboring pixel interpolation filter switching unit 412 having been added.

That is to say, information indicating the intra prediction mode obtained by decoding header information is supplied from the lossless decoding unit 162 to the intra prediction unit 171. Based on this information, the intra prediction unit 171 generates a prediction image, and outputs the generated prediction image to the switch 174.

Of the information obtained by decoding header information, the prediction mode information, motion vector information, reference frame information, and so forth, are supplied from the lossless decoding unit 162 to the motion prediction/compensation unit 173. Also, in the event that second order prediction processing has been applied to the current block, a second order prediction flag indicating that second order prediction is to be performed, and intra mode information for second order prediction, are also supplied from the lossless decoding unit 162 to the motion prediction/compensation unit 173.

In the event of having determined that second order prediction processing is applied, the motion prediction/compensation unit 173 controls the second order prediction unit 411 so that second order prediction is performed in the intra prediction mode which the intra prediction mode information for second order prediction indicates.

The motion prediction/compensation unit 173 subjects the image to motion prediction and compensation processing based on the motion vector information and reference frame information, and generates a prediction image. That is to say, a prediction image of the current block is generated using the pixel values of the reference block correlated to the current block, within the reference block. The motion prediction/compensation unit 173 then adds the generated prediction image and the prediction difference values from the second order prediction unit 411, and outputs to these to the switch 174.

The second order prediction unit 411 performs second order prediction using the difference between the current neighboring pixels and reference neighboring pixels read out from the frame memory 169. Prior to this second order prediction, the second order prediction unit 411 uses the filter coefficients set by the neighboring pixel interpolation filter switching unit 412 to perform filtering processing on the difference of the current neighboring pixels and reference neighboring pixels. The second order prediction unit 411 then uses the difference of the current neighboring pixels and reference neighboring pixels subjected to filtering processing to perform second order prediction processing, and outputs the obtained second order difference information (second order residual) to the motion prediction/compensation unit 173.

That is to say, the second order prediction unit 411 is configured including the intra prediction unit 171 shown in FIG. 26.

The neighboring pixel interpolation filter switching unit 412 is configured basically the same way as with the neighboring pixel interpolation filter switching unit 172. That is to say, the neighboring pixel interpolation filter switching unit 412 sets filter coefficients corresponding to at least one of the quantization parameters from the lossless decoding unit 162 and the intra prediction mode. The neighboring pixel interpolation filter switching unit 412 supplies the set filter coefficients to the second order prediction unit 411.

Figure 24:
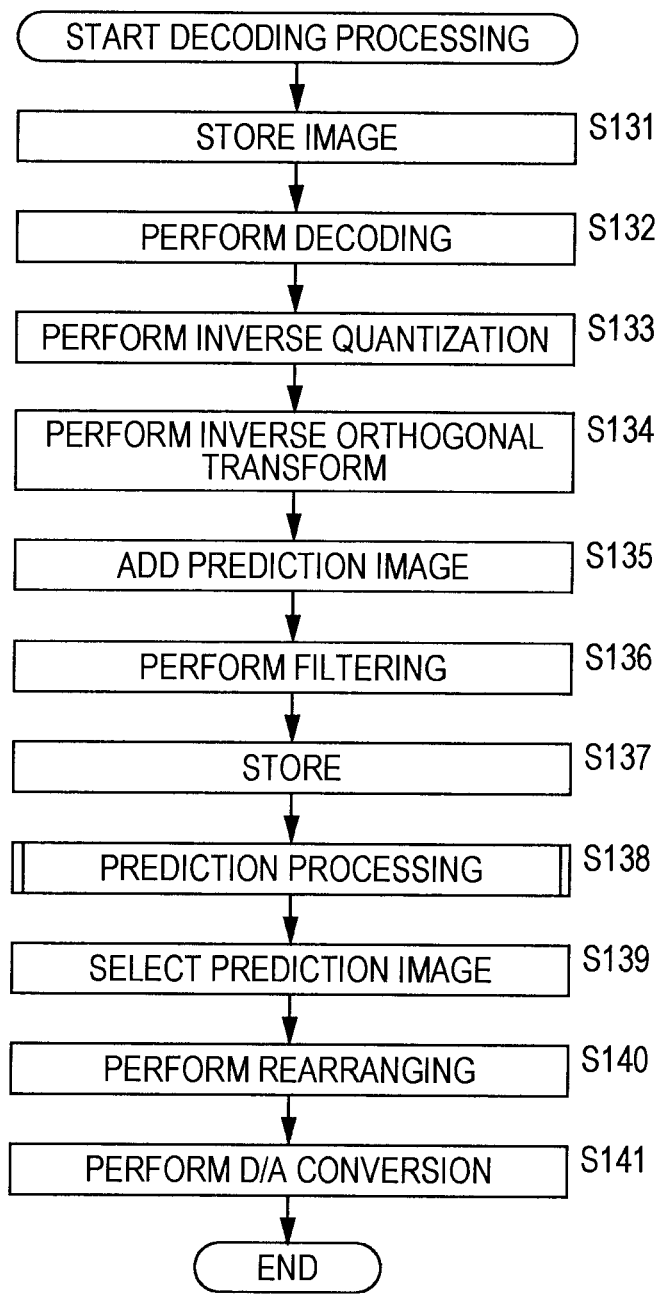
FIG. 24 is a flowchart for describing the decoding processing of the image decoding device in FIG. 22.

Note that the encoding processing of the image decoding device 401 in FIG. 33 only differs from the decoding processing in FIG. 24 of the image decoding device 151 in FIG. 22 except for the following intra processing and motion prediction processing, and other processing is basically the same processing, so description thereof will be omitted.

That is to say, with the image decoding device 401 in FIG. 33, intra prediction according to the H.264/AVC format is performed as intra processing. Also, as motion prediction processing, second order prediction (intra prediction) is performed at the time of motion prediction processing using the filter coefficients set by the neighboring pixel interpolation filter switching unit 412, and second order difference information is generated.

The present invention can also be applied to intra prediction in second order prediction processing such as described above.

Note that in the above description, an example has been described of performing filtering processing on neighboring pixels used for intra prediction, using filter coefficients adaptively set to an image, prior to the intra prediction.

Now, noise included in neighboring pixels used for the intra prediction system differs depending on encoding conditions, such as the contents of the image, quantization parameters, and so forth. Accordingly, there are blocks regarding which encoding efficiency improves by performing filtering processing performed in the H.264/AVC format for example, and blocks where this is not true.

Regardless of this, blanket filtering processing has been performed on all blocks at the time of performing 8×8 block-based intra processing on macro blocks with the H.264/AVC format, so there have occurred blocks where encoding efficiency is lowered thereby.

Accordingly, an example of a case of performing on/off of filtering processing as to neighboring pixels sued for intra prediction will be described next.

3. Third Embodiment

[Other Configuration Example of Image Encoding Device]

Figure 34:
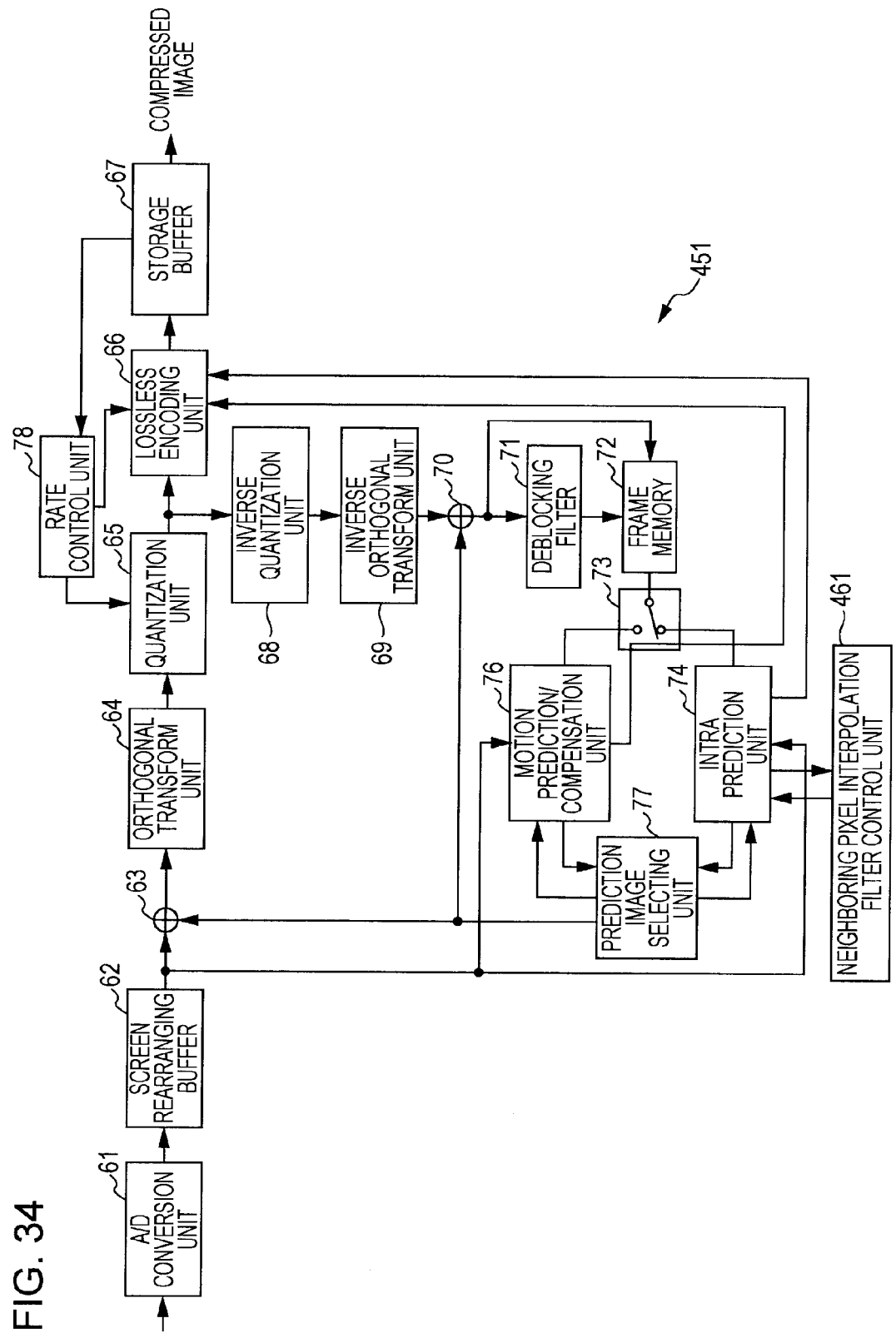
FIG. 34 is a block diagram illustrating the configuration of yet another embodiment of an image encoding device to which the present invention has been applied.

FIG. 34 shows the configuration of another embodiment of an image encoding device serving as an image processing device to which the present invention has been applied.

An image encoding device 451 has in common with the image encoding device 51 in FIG. 1 the point of having the A/D conversion unit 61, screen rearranging buffer 62, computing unit 63, orthogonal transform unit 64, quantization unit 65, lossless encoding unit 66, storing buffer 67, inverse quantization unit 68, inverse orthogonal transform unit 69, computing unit 70, deblocking filter 71, frame memory 72, switch 73, intra prediction unit 74, motion prediction/compensation unit 76, prediction image selecting unit 77, and rate control unit 78.

Also, the image encoding device 451 differs from the image encoding device 51 in FIG. 1 with regard to the point that the neighboring pixel interpolation filter switching unit 75 has been replaced with a neighboring pixel interpolation filter control unit 461.

That is to say, the neighboring pixel interpolation filter control unit 461 performs control of on or off of the blanket filtering processing which has been performed on neighboring pixels of all blocks at the time of performing 8×8 block-based intra processing on macro blocks with the H.264/AVC format. Note that while filtering processing has only been performed with 8×8 block-based intra processing with the H.264/AVC format, this is performed on intra 4×4 and intra 16×16 as well with the neighboring pixel interpolation filter control unit 461.

The on/off control signals from the neighboring pixel interpolation filter control unit 461 are supplied to the intra prediction unit 74.

The intra prediction unit 74 performs intra prediction processing for all candidate intra prediction modes, based on the image to be subjected to intra prediction that has been read out from the screen rearranging buffer 62 and the reference image supplied from the frame memory 72. At this time, at the intra prediction unit 74, prior to intra prediction, intra prediction is performed with the filter processing turned on or off in accordance with control signals from the neighboring pixel interpolation filter control unit 461, and the one with a smaller calculated cost function value as a result is employed.

Further, the intra prediction unit 74 generates a flag indicating on or off of the filter processing. This flag information is supplied to the lossless encoding unit 66 along with information indicating the optimal intra prediction mode, in the event that the prediction image generated with the optimal intra prediction mode is selected by the prediction image selecting unit 77.

[Configuration Example of Intra Prediction Unit]

Figure 35:
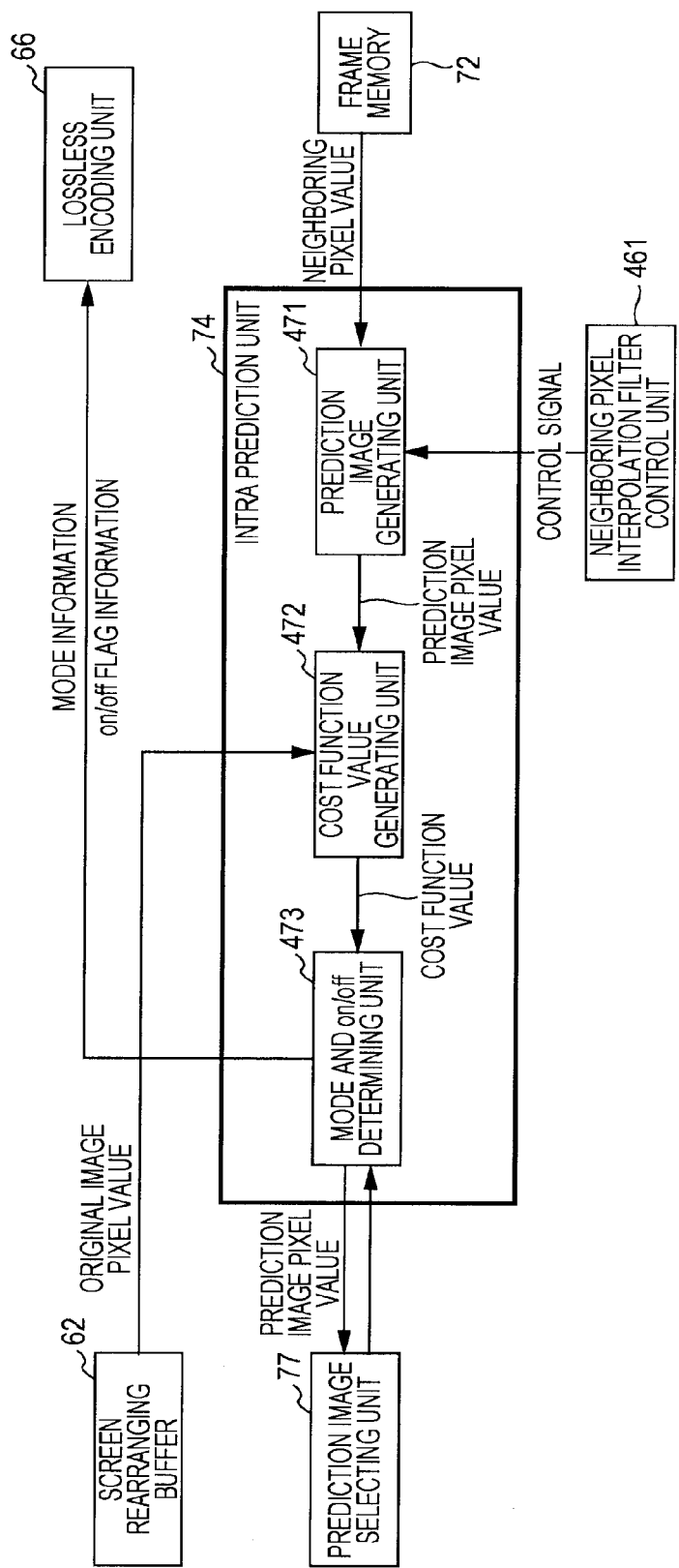
FIG. 35 is a block diagram illustrating a configuration example of an intra prediction unit in FIG. 34.

FIG. 35 is a block diagram illustrating a detailed configuration example of the intra prediction unit 74 in FIG. 34. In the case of the example in FIG. 35, the intra prediction unit 74 is configured of a prediction image generating unit 471, a cost function value generating unit 472, and an mode and on/off flag generating unit 473.

The prediction image generating unit 471 is supplied with neighboring pixel values of the current block of intra prediction from the frame memory 72. In the case in FIG. 35, the switch 73 is omitted from the illustration, but actually the neighboring pixel values are supplied from the frame memory 72 to the prediction image generating unit 471 via the switch 73. Note that in the case of intra prediction, pixel values not subjected to deblocking filtering by the deblocking filter 71 are used as neighboring pixel values.

Based on control signals from the neighboring pixel interpolation filter control unit 461, the prediction image generating unit 471 performs intra prediction in all candidate intra prediction modes, performing filtering processing on the neighboring pixel values, or not performing filtering processing, thereby generating prediction images. The on/off control by the neighboring pixel interpolation filter control unit 461 indicated by the control signals is performed in increments of blocks or increments of macro blocks as described later with reference to FIG. 36 through FIG. 38.

The prediction image generating unit 471 supplies the generated prediction image pixel values, and the intra prediction mode information thereof, to the cost function value generating unit 472.

The cost function value generating unit 472 is supplied with original image pixel values from the screen rearranging buffer 62. The cost function value generating unit 472 uses the original image pixel values and prediction image pixel values to calculate cost function values for each intra prediction mode, for cases of filtering processing being on and off. The cost function value generating unit 472 supplies the calculated cost function values, prediction image pixel values, and intra prediction mode information, to the mode and on/off flag generating unit 473.

The mode and on/off flag generating unit 473 uses the cost function values from the cost function value generating unit 472 to determine the optimal intra prediction mode, and which of on and off to set the filter processing to, and generates on/off flag information indicating whether the filter processing is on or off.

The mode and on/off flag generating unit 473 supplies the prediction image pixel values of the optima intra prediction mode to the prediction image selecting unit 77. In the event that a prediction image of the optimal intra prediction mode is selected by the prediction image selecting unit 77, the mode and on/off flag generating unit 473 supplies information indicating the optimal intra prediction mode and the corresponding on/off flag information to the lossless encoding unit 66.

Note that processing performed by the image encoding device 451 is basically the same as the processing of the image encoding device 51 in FIG. 1 except for the intra prediction described next, so redundant description thereof will be omitted.

Figure 36:
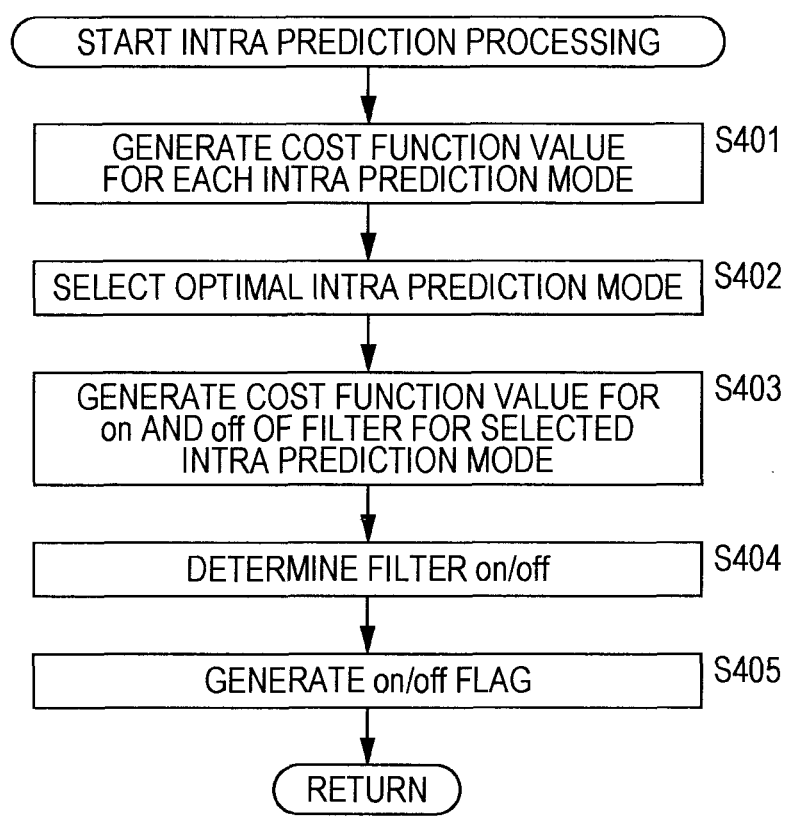
FIG. 36 is a flowchart for describing another example of the intra prediction processing in step S31 in FIG. 17.

Next, the intra prediction processing performed by the intra prediction unit 74 in FIG. 34 in the event of on or off control being performed in increments of blocks will be described with reference to the flowchart in FIG. 36. Note that this processing is another example of the intra prediction processing in step S31 in FIG. 17, and that in the example in FIG. 36, an example of intra 4×4 will be described. Also, in the following filter processing on/off may also be referred to simply as filter on/off.

In step S401, the cost function value generating unit 472 generates cost function values for the current block, for each of the nine types of intra prediction modes shown in FIG. 3 or FIG. 4.

That is to say, the prediction image generating unit 471 is supplied with neighboring pixel values of the current block for intra prediction from the frame memory 72. The prediction image generating unit 471 performs intra prediction on each of the nine types of intra prediction modes shown in FIG. 3 or FIG. 4, and generates prediction images for the current block.

At this time, control signals to the effect that filtering processing is not to be performed as to the neighboring pixels is supplied from the neighboring pixel interpolation filter control unit 461, and the prediction image generating unit 471 performs intra prediction without performing filtering processing on the neighboring pixels. Note that here, an arrangement may be made wherein control signals to the effect that filtering processing is to be performed on the neighboring pixels are supplied. Note however, different control is not made regarding the nine modes, such as performing on Vertical but not performing on Horizontal; rather, the same control regarding performing or not performing is made for the nine modes. Also note here that not performing filtering processing on all modes allows for less computation amount.

The prediction image generating unit 471 supplies the generated prediction image pixel values and the intra prediction mode information to the cost function value generating unit 472. The cost function value generating unit 472 uses the original image pixel values from the screen rearranging buffer 62 and prediction image pixel values to calculate the cost function values shown in the above-described Expression (73) or Expression (74) for each intra prediction mode in the case of filtering being off. The cost function value generating unit 472 supplies the calculated cost function values, prediction image pixel values, and intra prediction mode information, to the mode and on/off flag generating unit 473.

In step S402, the mode and on/off flag generating unit 473 uses the cost function values from the cost function value generating unit 472 to select an optimal intra prediction mode for the current block. The selected intra prediction mode information is supplied to the neighboring pixel interpolation filter control unit 461.

In step S403, the neighboring pixel interpolation filter control unit 461 causes the cost function value generating unit 472 to generate cost function values for the selected intra prediction mode with the filtering on and off. Note that in step S401, the cost function value for filtering being off has been generated, so actually in step S403, the const function value with filtering on is generated.

That is to say, the neighboring pixel interpolation filter control unit 461 supplies filtering on control signals and the selected intra prediction mode information to the prediction image generating unit 471. The prediction image generating unit 471 performs filtering processing as to the neighboring pixels used for the selected intra prediction mode, performs intra prediction in the selected intra prediction mode, and generates a prediction image of the current block.

The prediction image generating unit 471 supplies the generated prediction image pixel values and the selected intra prediction mode information to the cost function value generating unit 472. the cost function value generating unit 472 uses the original image pixel values from the screen rearranging buffer 62 and prediction image pixel values to calculate the cost function values shown in the above-described Expression (73) or Expression (74) for the selected intra prediction mode in the case of filtering being on. The cost function value generating unit 472 supplies the calculated cost function values and prediction image pixel values to the mode and on/off flag generating unit 473.

In step S404, the mode and on/off flag generating unit 473 determines filtering on/off for the current block by comparing the cost function values with filtering on and off for the selected intra prediction mode. That is to say, in the event that the cost function value for filtering on is smaller, filtering on is determined for the current block and in the event that the cost function value for filtering off is smaller, filtering off is determined for the current block. The mode and on/off flag generating unit 473 then supplies the determined prediction image values to the prediction image selecting unit 77.

In step S405, the mode and on/off flag generating unit 473 generates an on/off flag indicating the on or off decided upon in step S404 for the current block. For example, in the case of filtering on, the on/off filter value is 1. In the case of filtering off, the on/off filter value is 0.

In the event that a prediction image in the intra prediction mode has been selected in step S22 in FIG. 16 described above, the generated on/off flag information is supplied to the lossless encoding unit 66 along with the information indicating the optimal intra prediction mode. The supplied information is encoded in step S23 in FIG. 16, added to the header of the compressed image, and sent to the decoding side.

Figure 37:
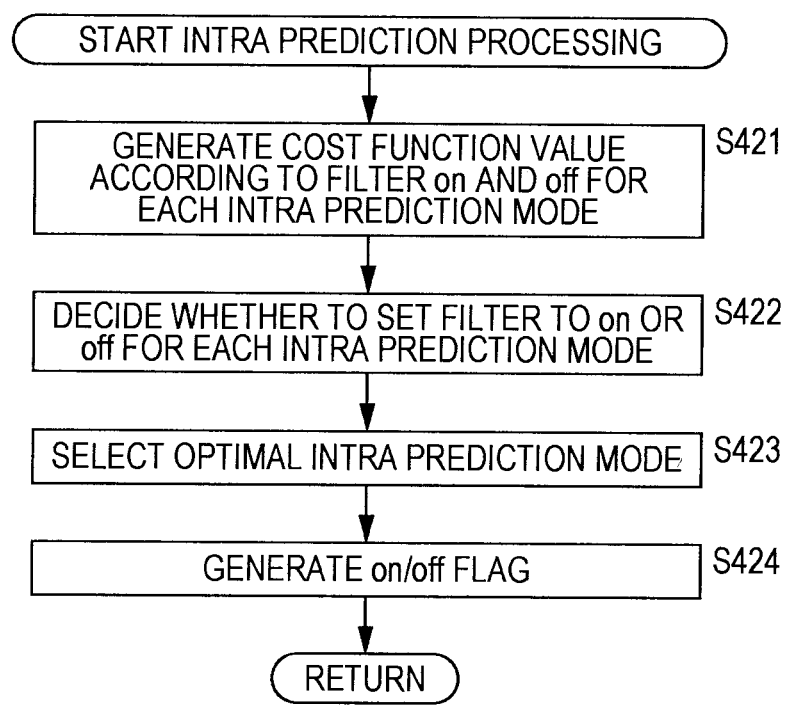
FIG. 37 is a flowchart for describing yet another example of the intra prediction processing in step S31 in FIG. 17.

Next, another example of intra prediction processing of the intra prediction unit 74 in FIG. 34 in the case of on or off control being performed in increments of blocks will be described with reference to the flowchart in FIG. 37. In the case of the example in FIG. 37 as well, an example of intra 4×4 will be described.

In step S421, the cost function value generating unit 472 generates cost function values for the current block according to filtering being on and off, for each of the intra prediction modes.

That is to say, the prediction image generating unit 471 is supplied with the neighboring pixel values of the current block for intra prediction from the frame memory 72. The prediction image generating unit 471 performs intra processing on each of the nine types of intra processing modes shown in FIG. 3 or FIG. 4, and generates prediction images of the current block.

At this time, first, control signals to the effect that filtering processing is not to be performed as to the neighboring pixels are supplied from the neighboring pixel interpolation filter control unit 461, and the prediction image generating unit 471 performs intra prediction on each of the intra prediction modes without performing filtering processing as to the neighboring pixels, and generates prediction images. Further, control signals to the effect that filtering processing is to be performed as to the neighboring pixels are supplied from the neighboring pixel interpolation filter control unit 461, and the prediction image generating unit 471 performs intra prediction on each of the intra prediction modes having performed filtering processing as to the neighboring pixels, and generates prediction images.

The prediction image generating unit 471 supplies the information of each of the intra prediction modes with filtering on and off, and the corresponding prediction image pixel values, to the cost function value generating unit 472. The cost function value generating unit 472 uses the original image pixel values from the screen rearranging buffer 62 and prediction image pixel values to calculate the cost function values shown in the above-described Expression (73) or Expression (74) for each intra prediction mode in each case of filtering being off and being on. The cost function value generating unit 472 supplies the calculated cost function values, prediction image pixel values, and intra prediction mode information, in each case of filtering being off and being on, to the mode and on/off flag generating unit 473.

In step S422, the mode and on/off flag generating unit 473 uses the cost function values from the cost function value generating unit 472 to determine whether filtering should be on or off for the current block with each intra prediction mode.

In step S423, the mode and on/off flag generating unit 473 selects the optimal intra prediction mode for the current block out from the intra prediction modes regarding which determination has been made for filtering on or off.

In step S424, the mode and on/off flag generating unit 473 generates on/off flag information indicating the state of the filter for the selected intra prediction mode (on or off). In the event that a prediction image in the intra prediction mode has been selected in step S22 in FIG. 16 described above, the generated on/off flag information is supplied to the lossless encoding unit 66 along with the information indicating the optimal intra prediction mode. The supplied information is encoded in step S23 in FIG. 16, added to the header of the compressed image, and sent to the decoding side.

Figure 38:
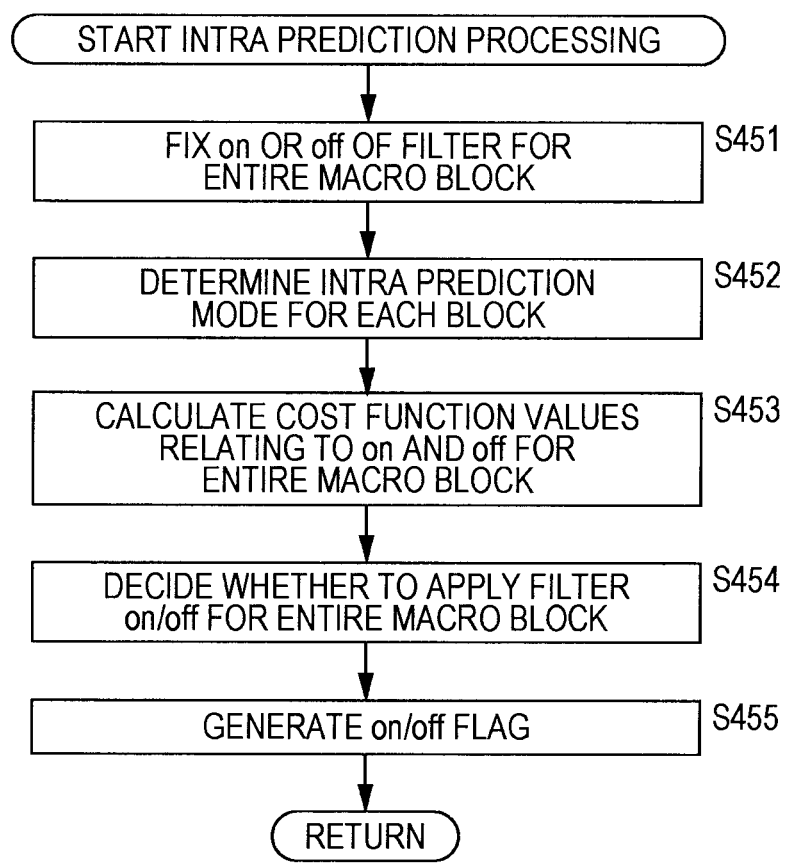
FIG. 38 is a flowchart for describing another example of the intra prediction processing in step S31 in FIG. 17.

Next, the intra prediction processing performed by the intra prediction unit 74 in FIG. 34 in the event of on or off control being performed in increments of macro blocks will be described with reference to the flowchart in FIG. 38. Note that this processing is another example of the intra prediction processing in step S31 in FIG. 17, and that an example of intra 4×4 will be described in the example in FIG. 38 as well.

In step S451, the neighboring pixel interpolation filter control unit 461 fixes the filtering as to the entire macro block to off or on. In this case, the neighboring pixel interpolation filter control unit 461 fixes the filtering to off, and supplies control signals for filtering off to the prediction image generating unit 471. Fixing of filtering may be either on or off, but fixing to off can be realized with less calculation amount.

In step S452, the intra prediction unit 74 determines the intra prediction mode for each block. That is to say, the prediction image generating unit 471 is supplied with neighboring pixel values of the current block for intra prediction from the frame memory 72. The prediction image generating unit 471 performs intra processing on each of the nine types of intra processing modes shown in FIG. 3 or FIG. 4, and generates prediction images of the current block.

At this time, first, control signals to the effect that filtering processing is not to be performed as to the neighboring pixels are supplied from the neighboring pixel interpolation filter control unit 461, and the prediction image generating unit 471 performs intra prediction on each of the intra prediction modes without performing filtering processing as to the neighboring pixels, and generates prediction images. The prediction image generating unit 471 supplies the generated prediction image pixel values and the intra prediction mode information thereof to the cost function value generating unit 472.

The cost function value generating unit 472 uses the original image pixel values from the screen rearranging buffer 62 and prediction image pixel values to calculate the cost function values shown in the above-described Expression (73) or Expression (74) for each intra prediction mode in each case of filtering being off. The cost function value generating unit 472 supplies the calculated cost function values, prediction image pixel values, and intra prediction mode information, in each case of filtering being off to the mode and on/off flag generating unit 473.

The mode and on/off flag generating unit 473 uses the cost function values from the cost function value generating unit 472 to determine an optimal intra prediction mode for each block. The decoded intra prediction mode information is supplied to the neighboring pixel interpolation filter control unit 461.

In step S453, the neighboring pixel interpolation filter control unit 461 causes the cost function value generating unit 472 to generate cost function values for filtering on and off for the entire macro block. Note that the cost function values for the optimal intra prediction mode for each block within the macro block (i.e., the entire macro block) with filtering off has been generated in step S452. Accordingly, actually in step S453, the cost function values for the entire macro block with filtering on are generated.

That is to say, the neighboring pixel interpolation filter control unit 461 supplies filtering on control signals, and information of the intra prediction mode determined for each of the blocks, to the prediction image generating unit 471. The prediction image generating unit 471 performs filtering processing as to the neighboring pixel values used in the determined intra prediction mode, performs intra prediction with the determined intra prediction mode, and generates a prediction image for the current block.

The prediction image generating unit 471 supplies the generated prediction image pixel values and determined intra prediction mode information to the cost function value generating unit 472. The cost function value generating unit 472 uses the original image pixel values from the screen rearranging buffer 62 and prediction image pixel values to calculate the cost function values shown in the above-described Expression (73) or Expression (74) for the determined intra prediction mode in each case of filtering being on. The cost function value generating unit 472 supplies the calculated cost function values, prediction image pixel values, and intra prediction mode information, in each case of filtering being on and off, to the mode and on/off flag generating unit 473.

In step S454, the mode and on/off flag generating unit 473 compares the cost function value of all blocks within the macro block in the cases of filtering on and off from the cost function value generating unit 472, and determines which of filtering on/off to apply to the entire macro block.

In step S455, the mode and on/off flag generating unit 473 generates an on/off flag indicating the on or off decided in step S454, as to the entire macro block. The generated on/off flag information is supplied to the lossless encoding unit 66 for each macro block. The supplied information is encoded in step S23 in FIG. 16, added to the header of the compressed image, and sent to the decoding side.

As described above, control of filtering on/off (on or off) can be performed in increments of blocks, or can be performed in increments of macro blocks. Note that while the prediction precision of intra prediction processing can be improved by controlling on/off in increments of blocks, the amount of information necessary for transmitting the flag information for each block increases. Conversely, with the case of controlling in increments of macro blocks, the improvement in prediction precision is lower than that of performing in increments of blocks, but one flag information per macro block is sufficient, is increase in flag information amount can be reduced.

While an example of luminance signals has been described in the above description, this can be used for intra prediction regarding color difference signals as well. Also, filter coefficients in the filtering processing to be controlled are not restricted to the three-tap {1, 2, 1}//4 in the H.264/AVC format, and this can be applied to any coefficients of any tap length set with the image encoding device 51 in FIG. 1.

That is to say, in the case of filtering on, filtering processing with the filter coefficients set by the image encoding device 51 in FIG. 1 may also be performed.

An image decoding device which receives a compressed image encoded by the image encoding device 451 and decodes this will be described with reference to FIG. 39.
[Other Example of Image Decoding Device]

Figure 39:
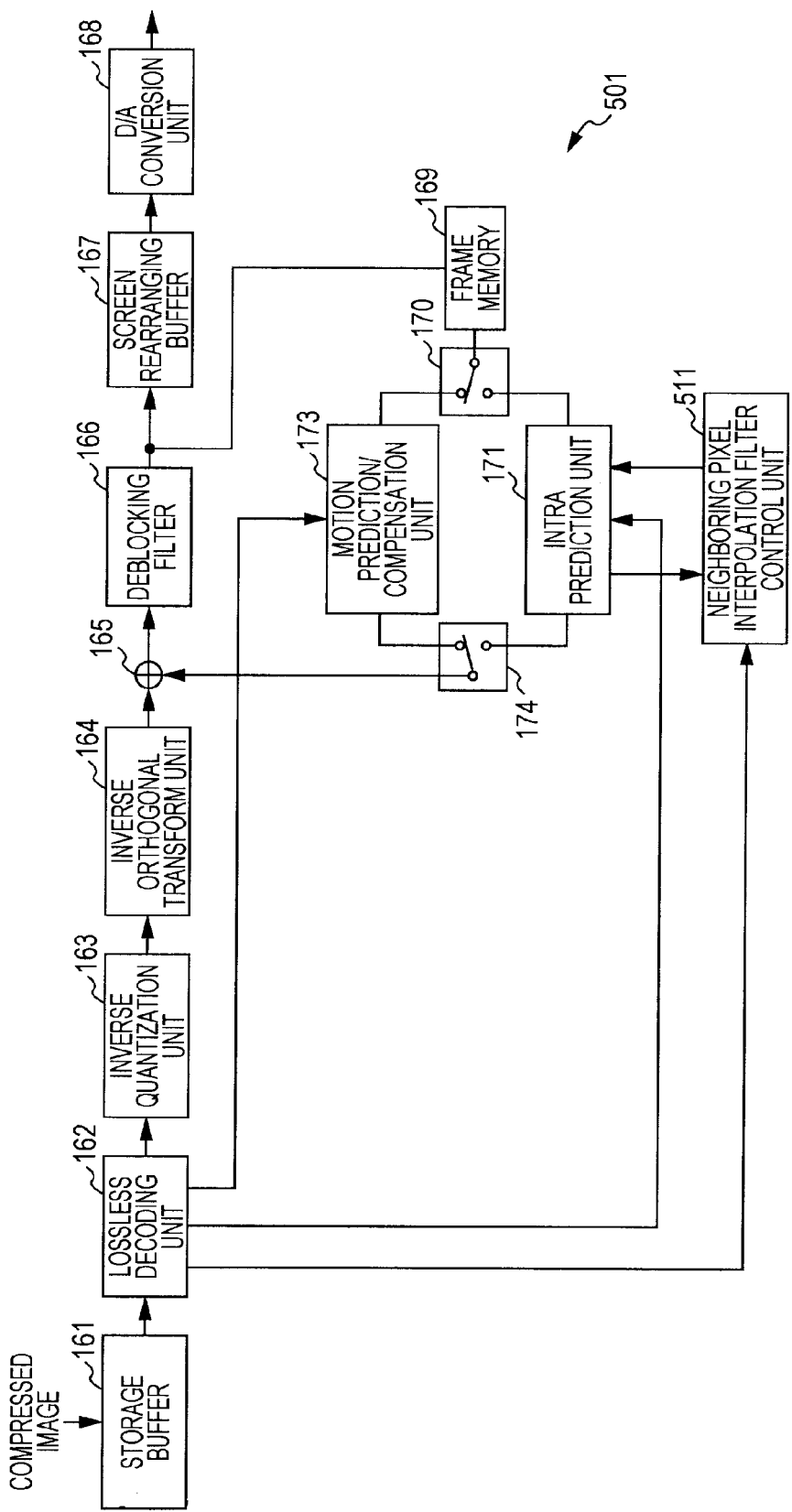
FIG. 39 is a block diagram illustrating the configuration of yet another embodiment of an image decoding device to which the present invention has been applied.

FIG. 39 illustrates the configuration of another embodiment of an image decoding device as an image processing device to which the present invention has been applied.

An image decoding device 501 has in common with the image decoding device 151 in FIG. 22 the point of including the storing buffer 161, lossless decoding unit 162, inverse quantization unit 163, inverse orthogonal transform unit 164, computing unit 165, deblocking filter 166, screen rearranging buffer 167, D/A conversion unit 168, frame memory 169, switch 170, intra prediction unit 171, motion prediction/compensation unit 173, and switch 174.

Also, the image decoding device 501 differs from the image decoding device 151 in FIG. 22 regarding the point of the neighboring pixel interpolation filter switching unit 172 having been replaced with a neighboring pixel interpolation filter control unit 511.

That is to say, information indicating the intra prediction mode obtained by decoding header information is supplied from the lossless decoding unit 162 to the intra prediction unit 171. Based on this information, the intra prediction unit 171 generates a prediction image, and outputs the generated prediction image to the switch 174. At this time, Prior to intra prediction, the intra prediction unit 171 performs (or does not perform) filtering processing as to the neighboring pixel values in accordance with control signals from the neighboring pixel interpolation filter control unit 511.

The neighboring pixel interpolation filter control unit 511 is supplied with on/off flag information for each macro block or each block from the lossless decoding unit 162, in accordance with the encoding at the image encoding device 451. The neighboring pixel interpolation filter control unit 511 supplies the intra prediction unit 171 with control signals to the effect that filtering processing is to be performed or not performed, in accordance with the supplied on/off flag information.

Note that with the image encoding device 451 in FIG. 34, both cases of filtering being on and being off are tested, and intra prediction processing is performed having selected the one which yields higher encoding efficiency by cost function values. On the other hand, with the image decoding device 501, filtering on or off is controlled based on the on/off flag information sent encoded, and intra prediction processing is performed.
[Configuration Example of Intra Prediction Unit and Neighboring Pixel Interpolation Filter Control Unit]

Figure 40:
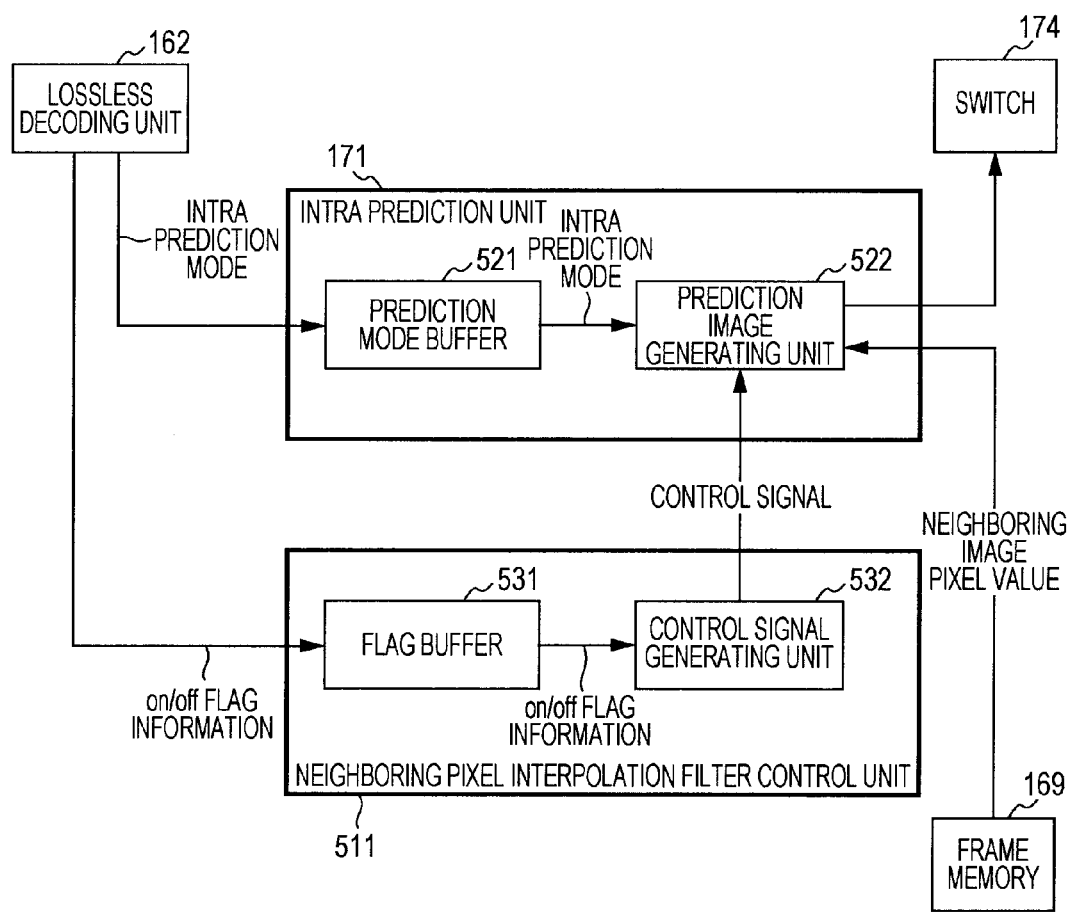
FIG. 40 is a block diagram illustrating a configuration example of an intra prediction unit and neighboring pixel interpolation filter control unit in FIG. 39.

FIG. 40 is a block diagram illustrating a detailed configuration example of the intra prediction unit and neighboring pixel interpolation filter control unit.

In the case of the example in FIG. 40, the intra prediction unit 171 is configured of a prediction mode buffer 521 and prediction image generating unit 522. The neighboring pixel interpolation filter control unit 511 is configured of a flag buffer 531 and control signal generating unit 532.

The prediction mode buffer 521 is supplied with the intra prediction mode information from the lossless decoding unit 162. The prediction image generating unit 522 is supplied with neighboring pixel values of the current block for intra prediction from the frame memory 169. In the case of FIG. 40 as well, the switch 170 is omitted from the illustration, but actually, the neighboring pixel values are supplied from the frame memory 169 to the prediction image generating unit 522 via the switch 170.

The prediction image generating unit 522 reads out the intra prediction mode information for the current block from the prediction mode buffer 521, performs intra prediction on the current block in the intra prediction mode that has been read out, and generates a prediction image. Prior to this intra prediction, the prediction image generating unit 522 performs filtering processing on the prediction image pixel values from the frame memory 169 in accordance to the control signals from the control signal generating unit 532.

The flag buffer 531 is supplied with on/off flag information from the lossless decoding unit 162 for each macro block or each block. The control signal generating unit 532 reads out the corresponding on/off flag from the flag buffer 531, generates control signals indicating whether to or not to perform filtering processing for each block, and supplies the generated control signals to the prediction image generating unit 522.

Note that the processing performed by the image decoding device 501 is basically the same as the processing of the image decoding device 151 in FIG. 22 except for the prediction processing described next, so redundant description thereof will be omitted.
[Description of Prediction Processing]

Figure 41:
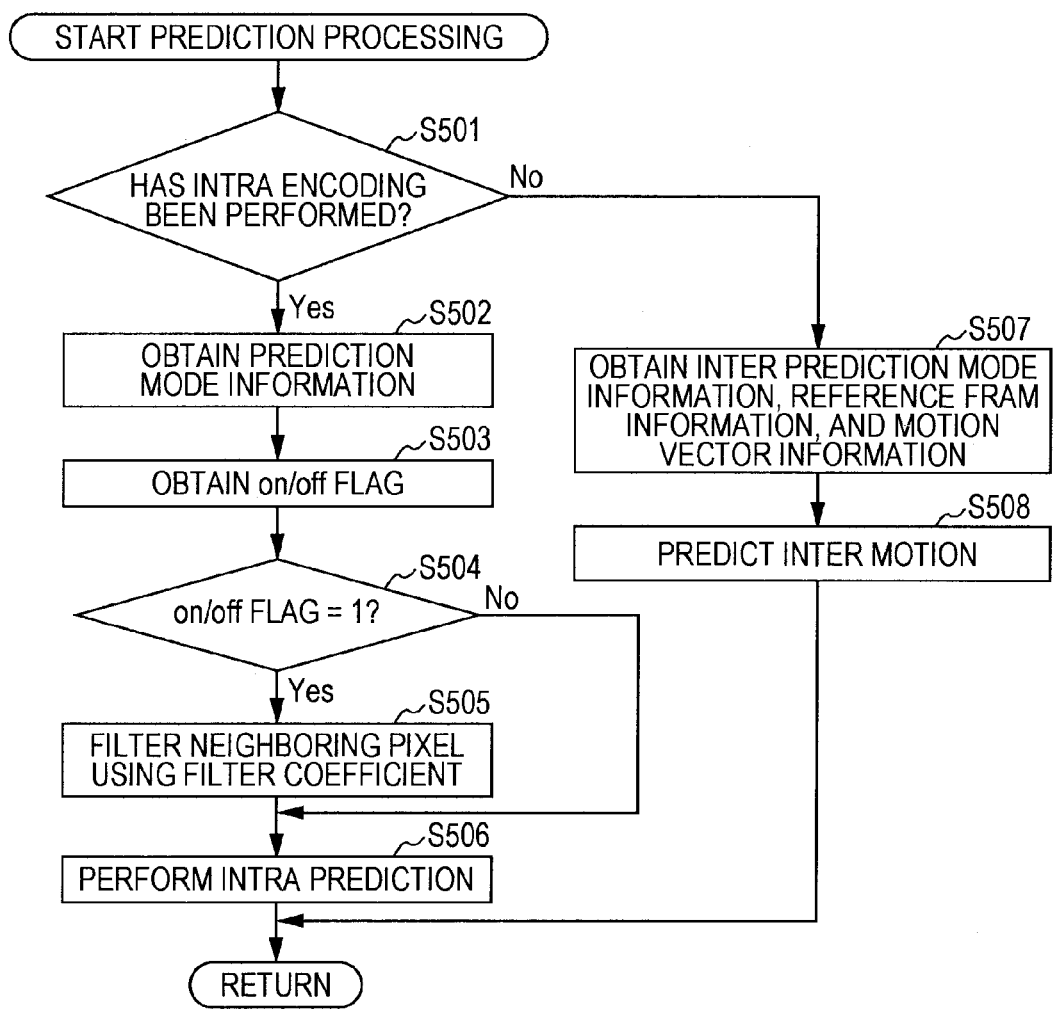
FIG. 41 is a flowchart for describing yet another example of the prediction processing in step S138 in FIG. 24.

Next, prediction processing of the image decoding device 501 in FIG. 39 will be described with reference to the flowchart in FIG. 41. Note that this intra prediction processing is another example of the prediction processing in step S138 in FIG. 24.

In step S501, the prediction image generating unit 522 determines whether or not the current block is intra encoded. Intra prediction mode information is supplied from the lossless decoding unit 162 to the prediction mode buffer 521, which is read by the prediction image generating unit 522. Accordingly, in step S501, the prediction image generating unit 522 determines that the current block is intra encoded, and the processing advances to step S502.

In step S502, the prediction image generating unit 522 obtains the intra prediction mode information of the prediction mode buffer 521.

Also, upon on/off flag information from the lossless decoding unit 162 being supplied to the flag buffer 531, the flag buffer 531 obtains an prediction image pixel values flag in step S503, and stores this.

The control signal generating unit 532 reads out the on/off flag corresponding to the current flag from the flag buffer 531, and in step S504 determines whether or not the on/off flag is 1. In the event that determination is made in step S504 that the on/off flag is 1, i.e., that the filtering processing is on, the control signal generating unit 532 supplies control signals to the prediction image generating unit 522 to cause filtering processing to be performed.

In accordance with the control signals, in step S505 the prediction image generating unit 522 subjects the neighboring pixels to filtering processing using filter coefficients. In step S506, the prediction image generating unit 522 performs intra prediction using the neighboring pixel values subjected to filtering processing, and generates a prediction image.

On the other hand, in the event that determination is made in step S504 that the on/off flag is not 1, i.e., that the filtering processing is off, the filtering processing in step S505 is skipped, and the processing advances to step S506.

In step S506, the prediction image generating unit 522 uses the prediction image pixel values from the frame memory 169 to perform intra prediction, and generates a prediction image.

The prediction image generated in step S506 is supplied to the switch 174.

On the other hand, in the event that determination is made in step S501 that intra encoding is not performed, the processing advances to step S507.

In step S507, the motion prediction/compensation unit 173 performs inter motion prediction. That is to say, in the event that the image to be processed is an image for inter prediction processing, the necessary image is read out from the frame memory 169, and supplied to the motion prediction/compensation unit 173 via the switch 170. In step S508, the motion prediction/compensation unit 173 performs motion prediction in the inter prediction mode based on the motion vector obtained in step S507, and generates a prediction image. The generated prediction image is output to the switch 174.

As described above, with the image encoding device 451 and image decoding device 501, on and off of filtering processing as to the neighboring pixels used for intra prediction is controlled, and filtering processing is not performed for blocks where encoding efficiency deteriorates. Accordingly, the encoding efficiency can be improved.

Note that while an example of performing intra prediction has been described in the above description, control of filtering processing on and off can be applied to the intra prediction in the second order prediction described above with reference to FIG. 32.

4. Fourth Embodiment

[Other Configuration Example of Image Encoding Device]

Figure 42:
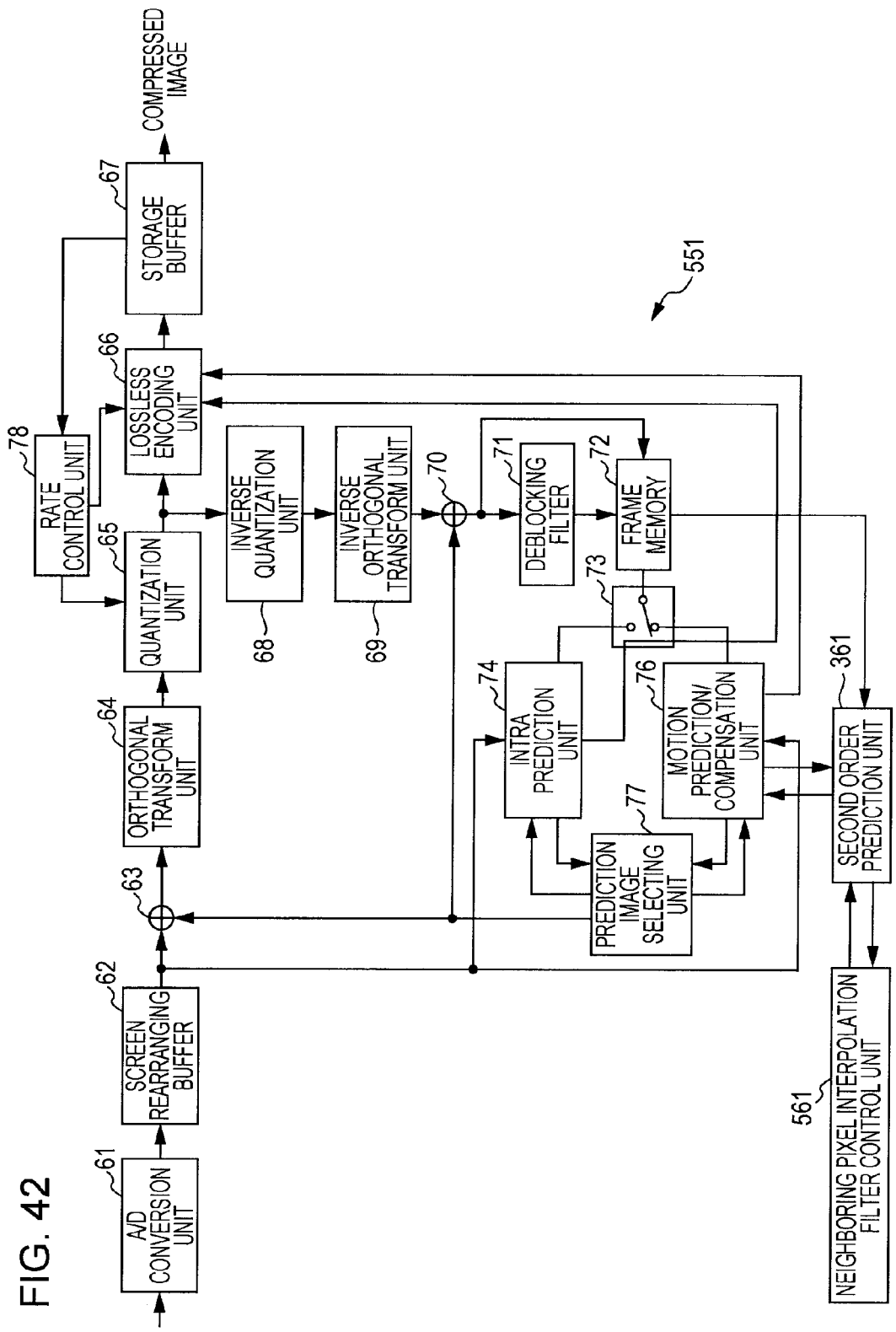
FIG. 42 is a block diagram illustrating the configuration of another embodiment of an image encoding device to which the present invention has been applied.

FIG. 42 shows the configuration of another embodiment of an image encoding device serving as an image processing device to which the present invention has been applied.

An image encoding device 551 has in common with the image encoding device 451 in FIG. 34 the point of having the A/D conversion unit 61, screen rearranging buffer 62, computing unit 63, orthogonal transform unit 64, quantization unit 65, lossless encoding unit 66, storing buffer 67, inverse quantization unit 68, inverse orthogonal transform unit 69, computing unit 70, deblocking filter 71, frame memory 72, switch 73, intra prediction unit 74, motion prediction/compensation unit 76, prediction image selecting unit 77, and rate control unit 78.

Also, the image encoding device 551 differs from the image encoding device 451 in FIG. 34 with regard to the points that the neighboring pixel interpolation filter control unit 461 has been omitted and that the second order prediction unit 361 in FIG. 31 and a neighboring pixel interpolation filter control unit 561 have been added.

That is to say, with the example in FIG. 42, the intra prediction unit 74 performs intra prediction according to H.264/AVC.

On the other hand, the motion prediction/compensation unit 76 detects motion vectors for all candidate inter prediction modes, based on the image for inter processing and a reference image, subjects the reference image to compensation processing based on the motion vectors, and generates a prediction image.

The motion prediction/compensation unit 76 supplies the second order prediction unit 361 with detected motion vector information, information of an image for inter processing (address, etc.), and first order residual which is the difference between the image for inter prediction and the generated prediction image.

The motion prediction/compensation unit 76 determines an optimal intra production mode in the second order prediction by comparing the second order residuals from the second order prediction unit 361. Also, the motion prediction/compensation unit 76 determines whether to encode the second order residual or to encode the first order residual, by comparing the second order residual with the first order residual. Note that this processing is performed on all candidate inter prediction modes.

The motion prediction/compensation unit 76 calculates cost function values for all candidate inter prediction modes. At this time, of the first order residual and second order residual, the residual determined for each inter prediction mode is used to calculate the cost function value. The motion prediction/compensation unit 76 determines the prediction mode of which yields the smallest value of the calculated cost function values to be the optimal inter prediction mode.

The motion prediction/compensation unit 76 supplies the prediction image generated in the optimal inter prediction mode (or difference between image for inter and second order residual), and the cost function value thereof to the prediction image selecting unit 77. In the event that the prediction image generated by the prediction image selecting unit 77 in the optimal inter prediction mode has been selected, the motion prediction/compensation unit 76 outputs information indicating the optimal inter prediction mode to the lossless encoding unit 66.

At this time, motion vector information, reference frame information, a second order prediction flag indicating that second order prediction is to be performed, information of the intra prediction mode in second order prediction, and so forth, are also output to the lossless encoding unit 66. The lossless encoding unit 66 also performs lossless encoding processing such as variable length encoding, arithmetic encoding, and so forth, on the information from the motion prediction/compensation unit 76, and inserts this to the header portion of the compressed image.

Based on the motion vector information from the motion prediction/compensation unit 76 and information of the image to be subjected to inter processing, the second order prediction unit 361 reads out current neighboring pixels neighboring the current block which is to be subjected to inter processing, from the frame memory 72. Also, the second order prediction unit 361 reads out reference neighboring pixels neighboring the reference block correlated with the current block by motion vector information, from the frame memory 72.

The second order prediction unit 361 performs second order prediction processing described above with reference to FIG. 32. Second order prediction processing is processing wherein intra prediction is performed between the first order residual and the difference between the current neighboring pixels and reference neighboring pixels, thereby generating information of second order difference (second order residual).

Note however, that prior to this second order prediction, the second order prediction unit 361 in FIG. 42 performs (or does not perform) filtering processing as to the difference between current neighboring pixels and reference neighboring pixels used for inter prediction, in accordance with control signals from the neighboring pixel interpolation filter control unit 561. The second order prediction unit 361 then uses the filtered (or unfiltered) difference between current neighboring pixels and reference neighboring pixels to perform second order prediction processing, and outputs the obtained second order difference information (second order residual) to the motion prediction/compensation unit 76. At this time, the second order prediction unit 361 also outputs on/off flag information indicating whether or not to perform filtering processing to the motion prediction/compensation unit 76.

That is to say, the second order prediction unit 361 includes the intra prediction unit 74 shown in FIG. 35.

The neighboring pixel interpolation filter control unit 561 is configured basically the same way as with the neighboring pixel interpolation filter control unit 461, and performs the same processing. That is to say, the neighboring pixel interpolation filter control unit 561 supplies control signals effecting control whether or not to perform filtering processing in increments of blocks or increments of macro blocks to the second order prediction unit 361.

Note that processing performed by the image encoding device 551 in FIG. 42 is basically the same as the processing of the image encoding device 451 in FIG. 34 (i.e., the encoding processing in FIG. 16) except for the following intra processing and motion prediction processing, so description thereof will be omitted.

That is to say, with the image encoding device 551 in FIG. 42, intra prediction according to the H.264/AVC format is performed as intra processing. Also, as motion prediction processing, filtering processing is controlled in accordance with control signals from the neighboring pixel interpolation filter control unit 561 at the time of motion prediction processing, whereby filtered (or unfiltered) second order difference information is generated. Of the first order difference information and second order difference information, that with better encoding efficiency is selected, and cost function values are compared, whereby an optimal inter prediction mode is determined.

An image decoding device which receives a compressed image encoded by this image encoding device 551 and decodes this will be described with reference to FIG. 43.
[Other Configuration Example of Image Decoding Device]

Figure 43:
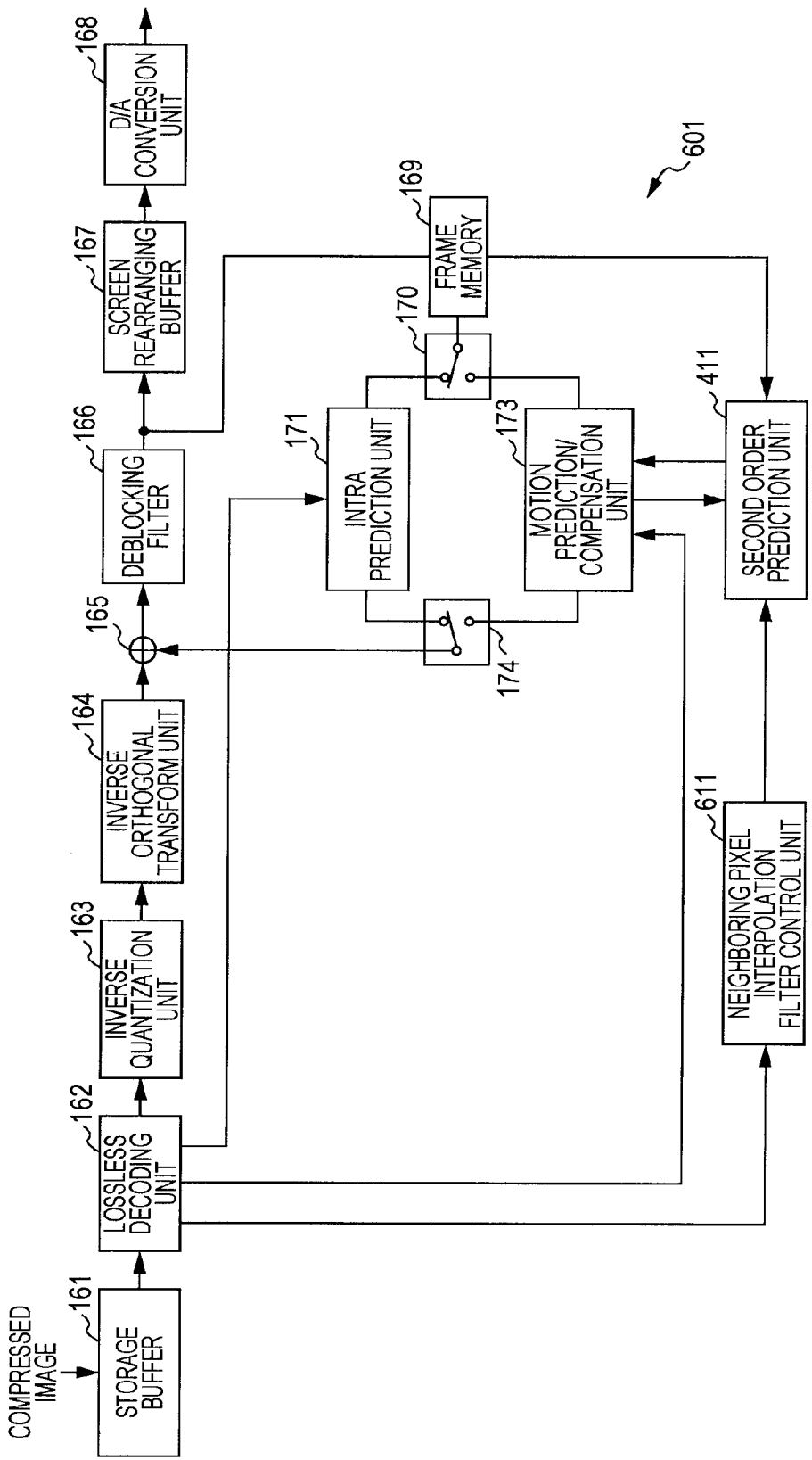
FIG. 43 is a block diagram illustrating the configuration of another embodiment of an image decoding device to which the present invention has been applied.

FIG. 43 illustrates the configuration of another embodiment of an image decoding device as an image processing device to which the present invention has been applied.

An image decoding device 601 has in common with the image decoding device 501 in FIG. 39 the point of including the storing buffer 161, lossless decoding unit 162, inverse quantization unit 163, inverse orthogonal transform unit 164, computing unit 165, deblocking filter 166, screen rearranging buffer 167, D/A conversion unit 168, frame memory 169, switch 170, intra prediction unit 171, motion prediction/compensation unit 173, and switch 174.

Also, the image decoding device 601 differs from the image decoding device 501 in FIG. 39 regarding the points that the neighboring pixel interpolation filter control unit 511 has been omitted, and that the second order prediction unit 411 in FIG. 33 and a neighboring pixel interpolation filter control unit 611 have been added.

That is to say, information indicating the intra prediction mode obtained by decoding header information is supplied from the lossless decoding unit 162 to the intra prediction unit 171. Based on this information, the intra prediction unit 171 generates a prediction image, and outputs the generated prediction image to the switch 174.

Of the information obtained by decoding the header information, the prediction mode information, motion vector information, reference frame information, and so forth, are supplied from the lossless decoding unit 162 to the motion prediction/compensation unit 173. Also, in the event that second order prediction processing has been applied to the current block, a second order prediction flag and intra prediction mode information for the second order prediction are also supplied from the lossless decoding unit 162 to the motion prediction/compensation unit 173.

In the event of having determined that second order prediction processing has been applied, the motion prediction/compensation unit 173 controls the second order prediction unit 411 so as to perform second order prediction with the intra prediction mode which the intra prediction mode information of second order prediction indicates.

The motion prediction/compensation unit 173 performs motion prediction and compensation processing on the image based on the motion vector information and reference frame information, and generates a prediction image. That is to say, a prediction image of the current block is generated using the pixel values of the reference block correlated to the current block, within the reference block. The motion prediction/compensation unit 173 then adds the generated prediction image and the prediction difference values from the second order prediction unit 411, and outputs to these to the switch 174.

The second order prediction unit 411 performs second order prediction using the difference between the current neighboring pixels and reference neighboring pixels read out from the frame memory 169. Note however, in the event that control signals effecting control to perform filtering processing have been received from the neighboring pixel interpolation filter control unit 611, the second order prediction unit 411 performs filtering processing on the difference of the current neighboring pixels and reference neighboring pixels prior to this second order prediction. The second order prediction unit 411 then uses the difference of the current neighboring pixels and reference neighboring pixels subjected to filtering processing to perform second order prediction processing, and outputs the obtained second order difference information (second order residual) to the motion prediction/compensation unit 173.

Note that in the event that control signals effecting control not to perform filtering processing have been received from the neighboring pixel interpolation filter control unit 611, the second order prediction unit 411 does not perform filtering processing, and performs second order processing using the difference of the current neighboring pixels and reference neighboring pixels.

That is to say, the second order prediction unit 411 is configured including the intra prediction unit 171 shown in FIG. 40.

The neighboring pixel interpolation filter control unit 611 is configured basically in the same way as the neighboring pixel interpolation filter control unit 511 in FIG. 39, and basically performs the same processing. That is to say, the neighboring pixel interpolation filter control unit 611 is supplied with, of the information obtained by decoding the header information, the on/off flag information, from the lossless decoding unit 162. The neighboring pixel interpolation filter control unit 611 supplies control signals to cause the second order prediction unit 411 to perform or not perform filtering processing of the neighboring pixels, in accordance with the on/off flag information.

Note that processing performed by the image decoding device 601 in FIG. 43 is basically the same as the processing of the image decoding device 501 in FIG. 39 (i.e., the decoding processing in FIG. 24) except for the following intra processing and motion prediction processing, so description thereof will be omitted.

That is to say, with the image decoding device 601 in FIG. 43, intra prediction according to the H.264/AVC format is performed as intra processing. Also, as motion prediction processing, filtering processing is controlled in accordance with control signals from the neighboring pixel interpolation filter control unit 611 at the time of motion prediction processing, second order prediction (intra prediction) is performed, and second order difference information is generated.

The on and off control of filtering processing can also be applied to intra prediction with second order prediction processing such as described above, as well.

Note that while description has been made with the above description regarding a case that the size of macro blocks is 16×16 pixels, but the present invention can be applied to the extended macro block sizes described in NPL 3 as well.

Figure 44:
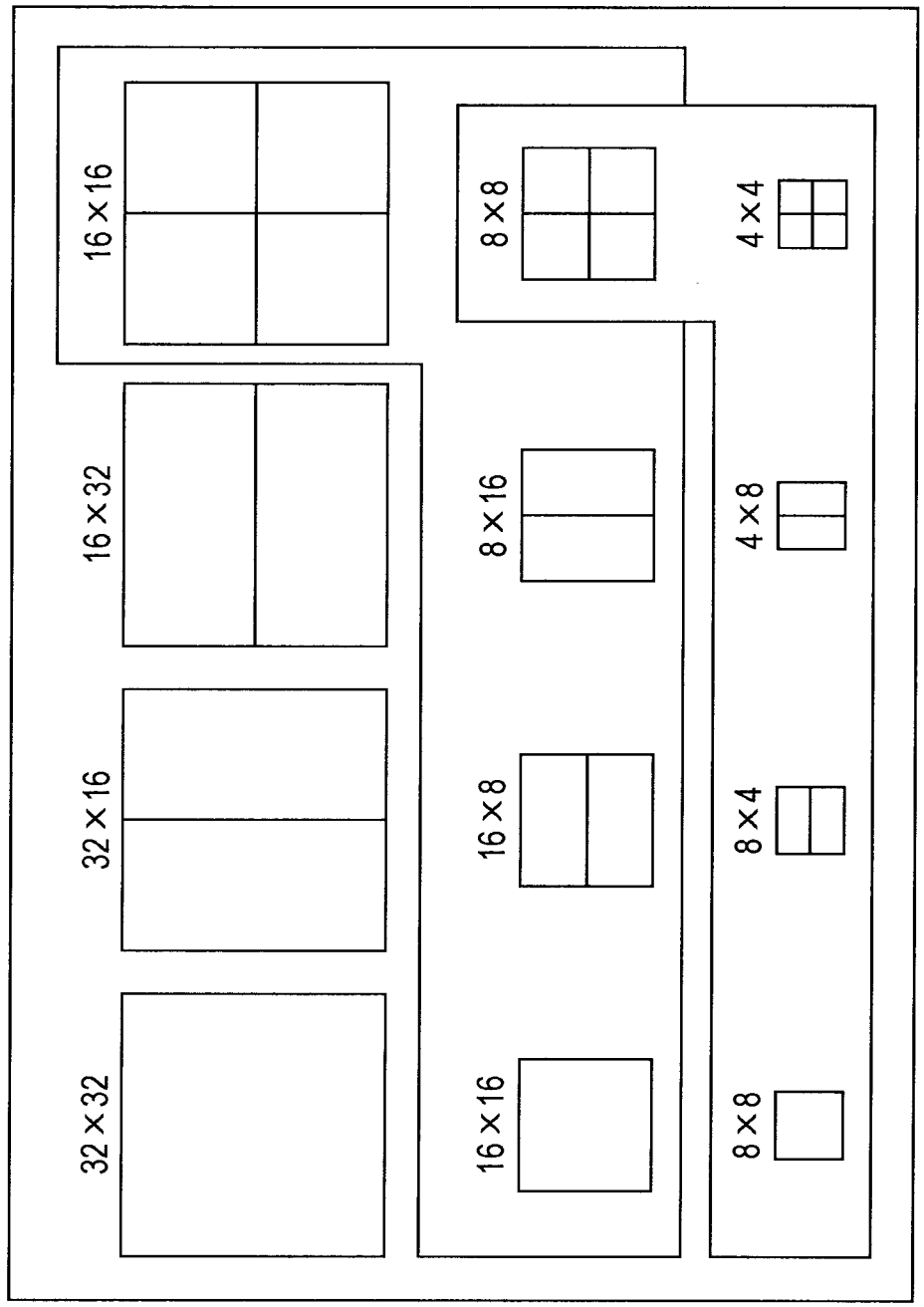
FIG. 44 is a diagram illustrating an example of an extended block size.

FIG. 44 is a diagram illustrating an example of an extended macro block size. With NPL 3, the macro block size is extended up to 32×32 pixels.

Macro blocks made up of 32×32 pixels divided into blocks (partitions) of 32×32 pixels, 32×16 pixels, 16×32 pixels, and 16×16 pixels are shown from the left in order on the upper tier in FIG. 44. Blocks made up of 16×16 pixels divided into blocks of 16×16 pixels, 16×8 pixels, 8×16 pixels, and 8×8 pixels are shown from the left in order on the middle tier in FIG. 44. Also, blocks made up of 8×8 pixels divided into blocks of 8×8 pixels, 8×4 pixels, 4×8 pixels, and 4×4 pixels are shown from the left in order on the lower tier in FIG. 44.

In other words, the macro blocks of 32×32 pixels may be processed with blocks of 32×32 pixels, 32×16 pixels, 16×32 pixels, and 16×16 pixels shown on the upper tier in FIG. 44.

Also, the blocks of 16×16 pixels shown on the right side on the upper tier may be processed with blocks of 16×16 pixels, 16×8 pixels, 8×16 pixels, and 8×8 pixels shown on the middle tier in the same way as with the H.264/AVC format.

Further, the blocks of 8×8 pixels shown on the right side on the middle tier may be processed with blocks of 8×8 pixels, 8×4 pixels, 4×8 pixels, and 4×4 pixels shown on the lower tier in the same way as with the H.264/AVC format.

With the extended macro block sizes, by employing such a hierarchical structure, regarding a 16×16 pixel block or less, a greater block is defined as a superset thereof while maintaining compatibility with the H.264/AVC format.

The filter coefficient setting, calculation, and filter processing on/off control, according to the present invention, may also be applied to the proposed macro block sizes extended as described above.

Description has been made so far with the H.264/AVC format employed as a encoding format, but the present invention is not restricted to this, and another encoding format/decoding format for performing prediction using neighboring pixels (e.g., intra prediction or second order prediction) may be employed.

Note that the present invention may be applied to an image encoding device and an image decoding device used at the time of receiving image information (bit streams) compressed by orthogonal transform such as discrete cosine transform or the like and motion compensation via a network medium such as satellite broadcasting, a cable television, the Internet, a cellular phone, or the like, for example, as with MPEG, H.26×, or the like. Also, the present invention may be applied to an image encoding device and an image decoding device used at the time of processing image information on storage media such as an optical disc, a magnetic disk, and flash memory. Further, the present invention may be applied to a motion prediction compensation device included in such an image encoding device and an image decoding device.

The above-mentioned series of processing may be executed by hardware, or may be executed by software. In the event of executing the series of processing by software, a program making up the software thereof is installed in a computer. Here, examples of the computer include a computer built into dedicated hardware, and a general-purpose personal computer whereby various functions can be executed by installing various programs therein.

Figure 45:
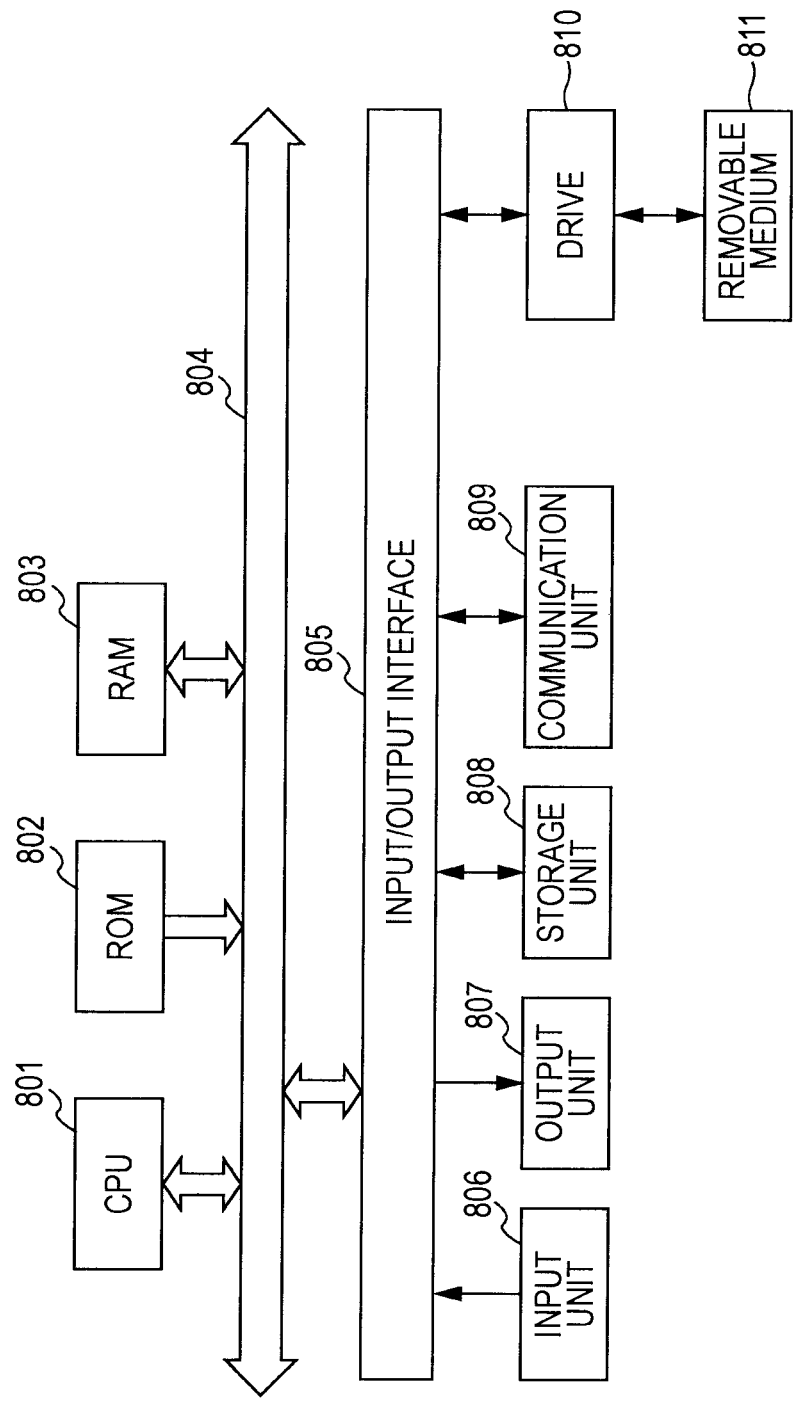
FIG. 45 is a block diagram illustrating a configuration example of the hardware of a computer.

FIG. 45 is a block diagram illustrating a configuration example of the hardware of a computer which executes the above-mentioned series of processing using a program.

With the computer, a CPU (Central Processing Unit) 801, ROM (Read Only Memory) 802, and RAM (Random Access Memory) 803 are mutually connected by a bus 804.

Further, an input/output interface 805 is connected to the bus 804. An input unit 806, an output unit 807, a storage unit 808, a communication unit 809, and a drive 810 are connected to the input/output interface 805.

The input unit 806 is made up of a keyboard, a mouse, a microphone, and so forth. The output unit 807 is made up of a display, a speaker, and so forth. The storage unit 808 is made up of a hard disk, nonvolatile memory, and so forth. The communication unit 809 is made up of a network interface and so forth. The drive 810 drives a removable medium 811 such as a magnetic disk, an optical disc, a magneto-optical disk, semiconductor memory, or the like.

With the computer thus configured, for example, the CPU 801 loads a program stored in the storage unit 808 to the RAM 803 via the input/output interface 805 and bus 804, and executes the program, and accordingly, the above-mentioned series of processing is performed.

The program that the computer (CPU 801) executes may be provided by being recorded in the removable medium 811 serving as a package medium or the like. Also, the program may be provided via a cable or wireless transmission medium such as a local area network, the Internet, or digital broadcasting.

With the computer, the program may be installed in the storage unit 808 via the input/output interface 805 by mounting the removable medium 811 on the drive 810. Also, the program may be received at the communication unit 809 via a cable or wireless transmission medium, and installed in the storage unit 808. Additionally, the program may be installed in the ROM 802 or storage unit 808 beforehand.

Note that the program that the computer executes may be a program wherein the processing is performed in the time sequence along the sequence described in the present Specification, or may be a program wherein the processing is performed in parallel or at necessary timing such as when call-up is performed.

The embodiments of the present invention are not restricted to the above-mentioned embodiment, and various modifications may be made without departing from the essence of the present invention.

For example, the above-mentioned image encoding devices 51, 351, 451, and 551, and the image decoding devices 151, 401, 501, and 601 may be applied to optional electronic devices. Hereafter, an example thereof will be described.

Figure 46:
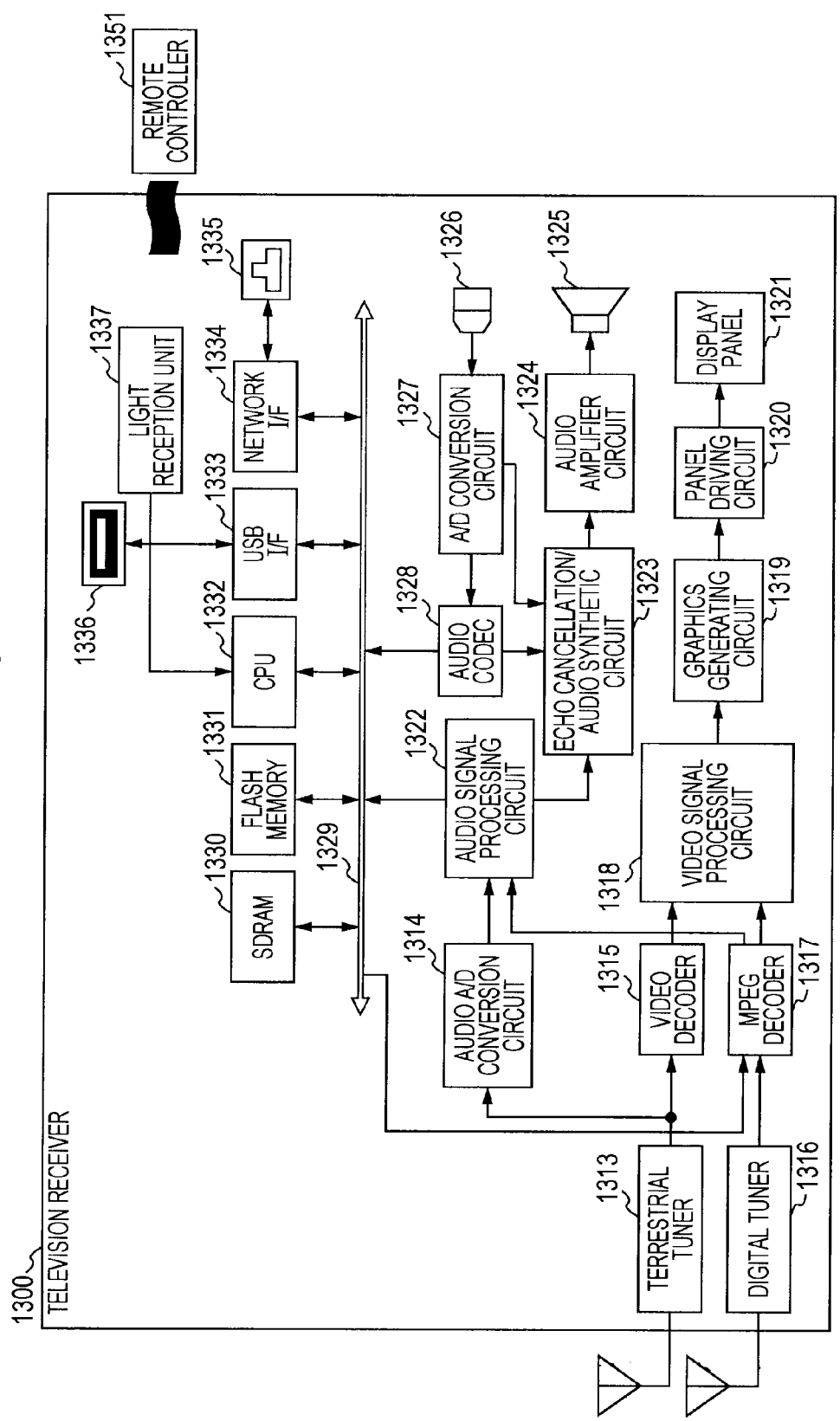
FIG. 46 is a block diagram illustrating a principal configuration example of a television receiver to which the present invention has been applied.

FIG. 46 is a block diagram illustrating a principal configuration example of a television receiver using the image decoding device to which the present invention has been applied.

A television receiver 1300 shown in FIG. 46 includes a terrestrial tuner 1313, a video decoder 1315, a video signal processing circuit 1318, a graphics generating circuit 1319, a panel driving circuit 1320, and a display panel 1321.

The terrestrial tuner 1313 receives the broadcast wave signals of a terrestrial analog broadcast via an antenna, demodulates, obtains video signals, and supplies these to the video decoder 1315. The video decoder 1315 subjects the video signals supplied from the terrestrial tuner 1313 to decoding processing, and supplies the obtained digital component signals to the video signal processing circuit 1318.

The video signal processing circuit 1318 subjects the video data supplied from the video decoder 1315 to predetermined processing such as noise removal or the like, and supplies the obtained video data to the graphics generating circuit 1319.

The graphics generating circuit 1319 generates the video data of a program to be displayed on a display panel 1321, or image data due to processing based on an application to be supplied via a network, or the like, and supplies the generated video data or image data to the panel driving circuit 1320. Also, the graphics generating circuit 1319 also performs processing such as supplying video data obtained by generating video data (graphics) for the user displaying a screen used for selection of an item or the like, and superimposing this on the video data of a program, to the panel driving circuit 1320 as appropriate.

The panel driving circuit 1320 drives the display panel 1321 based on the data supplied from the graphics generating circuit 1319 to display the video of a program, or the above-mentioned various screens on the display panel 1321.

The display panel 1321 is made up of an LCD (Liquid Crystal Display) and so forth, and displays the video of a program or the like in accordance with the control by the panel driving circuit 1320.

Also, the television receiver 1300 also includes an audio A/D (Analog/Digital) conversion circuit 1314, an audio signal processing circuit 1322, an echo cancellation/audio synthesizing circuit 1323, an audio amplifier circuit 1324, and a speaker 1325.

The terrestrial tuner 1313 demodulates the received broadcast wave signal, thereby obtaining not only a video signal but also an audio signal. The terrestrial tuner 1313 supplies the obtained audio signal to the audio A/D conversion circuit 1314.

The audio A/D conversion circuit 1314 subjects the audio signal supplied from the terrestrial tuner 1313 to A/D conversion processing, and supplies the obtained digital audio signal to the audio signal processing circuit 1322.

The audio signal processing circuit 1322 subjects the audio data supplied from the audio A/D conversion circuit 1314 to predetermined processing such as noise removal or the like, and supplies the obtained audio data to the echo cancellation/audio synthesizing circuit 1323.

The echo cancellation/audio synthesizing circuit 1323 supplies the audio data supplied from the audio signal processing circuit 1322 to the audio amplifier circuit 1324.

The audio amplifier circuit 1324 subjects the audio data supplied from the echo cancellation/audio synthesizing circuit 1323 to D/A conversion processing, subjects to amplifier processing to adjust to predetermined volume, and then outputs the audio from the speaker 1325.

Further, the television receiver 1300 also includes a digital tuner 1316, and an MPEG decoder 1317.

The digital tuner 1316 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 1317.

The MPEG decoder 1317 descrambles the scrambling given to the MPEG-TS supplied from the digital tuner 1316, and extracts a stream including the data of a program serving as a playback object (viewing object). The MPEG decoder 1317 decodes an audio packet making up the extracted stream, supplies the obtained audio data to the audio signal processing circuit 1322, and also decodes a video packet making up the stream, and supplies the obtained video data to the video signal processing circuit 1318. Also, the MPEG decoder 1317 supplies EPG (Electronic Program Guide) data extracted from the MPEG-TS to a CPU 1332 via an unshown path.

The television receiver 1300 uses the above-mentioned image decoding devices 151, 401, 501, or 601, as the MPEG decoder 1317 for decoding video packets in this way. Accordingly, in the same way as with the image encoding devices 151 and 401, the MPEG decoder 1317 switches filter coefficients according to the quantization parameter and prediction mode, and performs filtering processing of neighboring pixels, prior to intra prediction. Alternatively, in the same way as with the image encoding devices 501 and 601, the MPEG decoder 1317 controls whether or not to perform filtering processing of neighboring pixels performed prior to intra prediction, based on the on/off flag. Thus, encoding efficiency can be improved.

The video data supplied from the MPEG decoder 1317 is, in the same way as with the case of the video data supplied from the video decoder 1315, subjected to predetermined processing at the video signal processing circuit 1318. The video data subjected to predetermined processing is then superimposed on the generated video data and so forth at the graphics generating circuit 1319 as appropriate, supplied to the display panel 1321 via the panel driving circuit 1320, and the image thereof is displayed thereon.

The audio data supplied from the MPEG decoder 1317 is, in the same way as with the case of the audio data supplied from the audio A/D conversion circuit 1314, subjected to predetermined processing at the audio signal processing circuit 1322. The audio data subjected to predetermined processing is then supplied to the audio amplifier circuit 1324 via the echo cancellation/audio synthesizing circuit 1323, and subjected to D/A conversion processing and amplifier processing. As a result thereof, the audio adjusted in predetermined volume is output from the speaker 1325.

Also, the television receiver 1300 also includes a microphone 1326, and an A/D conversion circuit 1327.

The A/D conversion circuit 1327 receives the user's audio signal collected by the microphone 1326 provided to the television receiver 1300 serving as for audio conversation. The A/D conversion circuit 1327 subjects the received audio signal to A/D conversion processing, and supplies the obtained digital audio data to the echo cancellation/audio synthesizing circuit 1323.

In the event that the user (user A)'s audio data of the television receiver 1300 has been supplied from the A/D conversion circuit 1327, the echo cancellation/audio synthesizing circuit 1323 perform echo cancellation with the user A's audio data taken as a object. After echo cancellation, the echo cancellation/audio synthesizing circuit 1323 outputs audio data obtained by synthesizing the user A's audio data and other audio data, or the like from the speaker 1325 via the audio amplifier circuit 1324.

Further, the television receiver 1300 also includes an audio codec 1328, an internal bus 1329, SDRAM (Synchronous Dynamic Random Access Memory) 1330, flash memory 1331, a CPU 1332, a USB (Universal Serial Bus) I/F 1333, and a network I/F 1334.

The A/D conversion circuit 1327 receives the user's audio signal collected by the microphone 1326 provided to the television receiver 1300 serving as for audio conversation. The A/D conversion circuit 1327 subjects the received audio signal to A/D conversion processing, and supplies the obtained digital audio data to the audio codec 1328.

The audio codec 1328 converts the audio data supplied from the A/D conversion circuit 1327 into the data of a predetermined format for transmission via a network, and supplies to the network I/F 1334 via the internal bus 1329.

The network I/F 1334 is connected to the network via a cable mounted on a network terminal 1335. The network I/F 1334 transmits the audio data supplied from the audio codec 1328 to another device connected to the network thereof, for example. Also, the network I/F 1334 receives, via the network terminal 1335, the audio data transmitted from another device connected thereto via the network, and supplies this to the audio codec 1328 via the internal bus 1329, for example.

The audio codec 1328 converts the audio data supplied from the network I/F 1334 into the data of a predetermined format, and supplies this to the echo cancellation/audio synthesizing circuit 1323.

The echo cancellation/audio synthesizing circuit 1323 performs echo cancellation with the audio data supplied from the audio codec 1328 taken as a object, and outputs the data of audio obtained by synthesizing the audio data and other audio data, or the like, from the speaker 1325 via the audio amplifier circuit 1324.

The SDRAM 1330 stores various types of data necessary for the CPU 1332 performing processing.

The flash memory 1331 stores a program to be executed by the CPU 1332. The program stored in the flash memory 1331 is read out by the CPU 1332 at predetermined timing such as when activating the television receiver 1300, or the like. EPG data obtained via a digital broadcast, data obtained from a predetermined server via the network, and so forth are also stored in the flash memory 1331.

For example, MPEG-TS including the content data obtained from a predetermined server via the network by the control of the CPU 1332 is stored in the flash memory 1331. The flash memory 1331 supplies the MPEG-TS thereof to the MPEG decoder 1317 via the internal bus 1329 by the control of the CPU 1332, for example.

The MPEG decoder 1317 processes the MPEG-TS thereof in the same way as with the case of the MPEG-TS supplied from the digital tuner 1316. In this way, the television receiver 1300 receives the content data made up of video, audio, and so forth via the network, decodes using the MPEG decoder 1317, whereby video thereof can be displayed, and audio thereof can be output.

Also, the television receiver 1300 also includes a light reception unit 1337 for receiving the infrared signal transmitted from a remote controller 1351.

The light reception unit 1337 receives infrared rays from the remote controller 1351, and outputs a control code representing the content of the user's operation obtained by demodulation, to the CPU 1332.

The CPU 1332 executes the program stored in the flash memory 1331 to control the entire operation of the television receiver 1300 according to the control code supplied from the light reception unit 1337, and so forth. The CPU 1332, and the units of the television receiver 1300 are connected via an unshown path.

The USB I/F 1333 performs transmission/reception of data as to an external device of the television receiver 1300 which is connected via a USB cable mounted on a USB terminal 1336. The network I/F 1334 connects to the network via a cable mounted on the network terminal 1335, also performs transmission/reception of data other than audio data as to various devices connected to the network.

The television receiver 1300 uses the image decoding devices 151, 401, 501, or 601, as the MPEG decoder 1317, whereby encoding efficiency can be improved. As a result thereof, the television receiver 1300 can obtain a decoded image with higher precision from broadcast wave signals received via the antenna, or the content data obtained via the network, at higher speeds, and display this.

Figure 47:
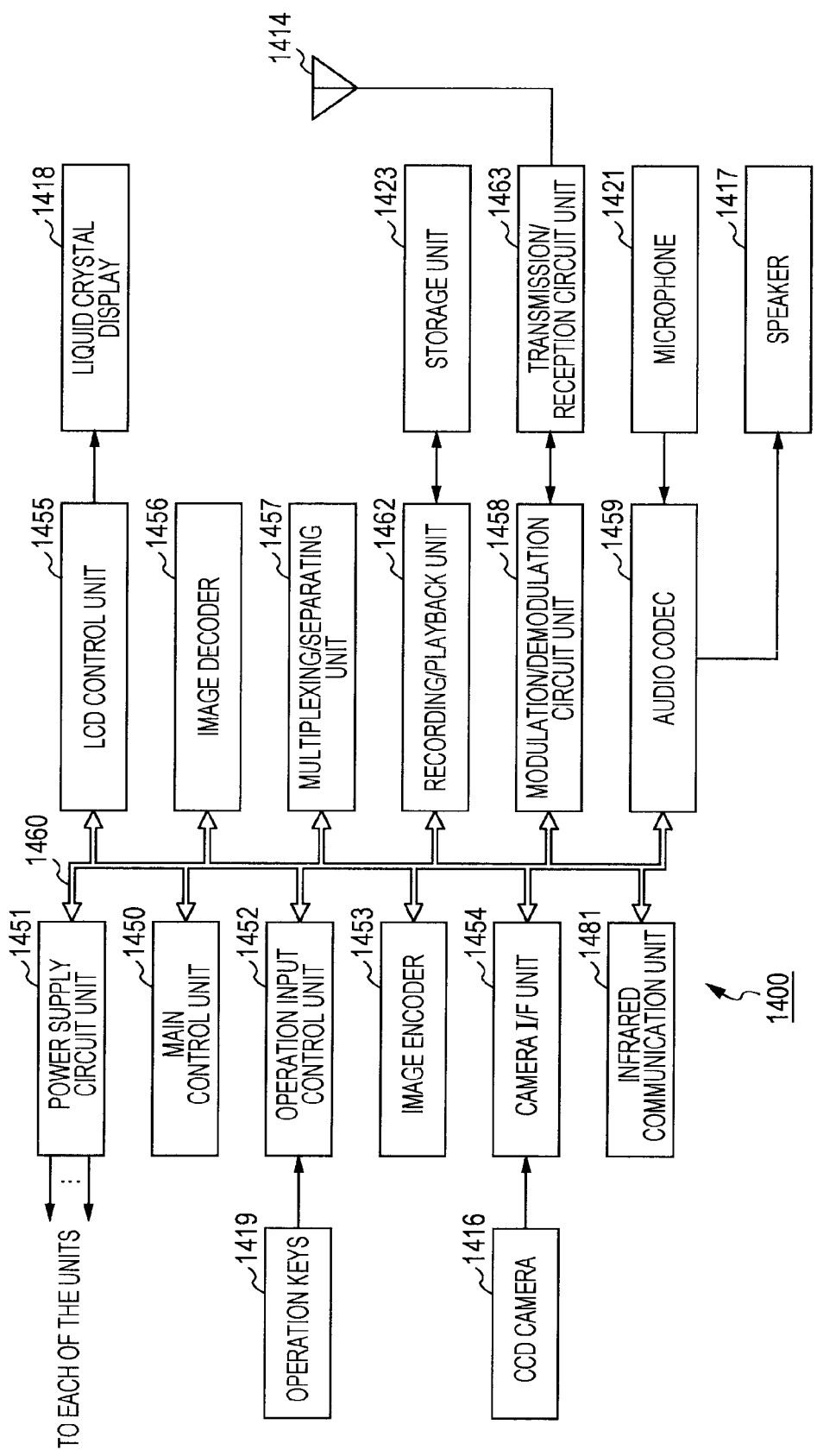
FIG. 47 is a block diagram illustrating a principal configuration example of a cellular phone to which the present invention has been applied.

FIG. 47 is a block diagram illustrating a principal configuration example of a cellular phone using the image encoding device and image decoding device to which the present invention has been applied.

A cellular phone 1400 shown in FIG. 47 includes a main control unit 1450 configured so as to integrally control the units, a power supply circuit unit 1451, an operation input control unit 1452, an image encoder 1453, a camera I/F unit 1454, an LCD control unit 1455, an image decoder 1456, a multiplexing/separating unit 1457, a recording/playback unit 1462, a modulation/demodulation circuit unit 1458, and an audio codec 1459. These are mutually connected via a bus 1460.

Also, the cellular phone 1400 includes operation keys 1419, a CCD (Charge Coupled Devices) camera 1416, a liquid crystal display 1418, a storage unit 1423, a transmission/reception circuit unit 1463, an antenna 1414, a microphone (MIC) 1421, and a speaker 1417.

Upon a call being ended and a power key being turned on by the user's operation, the power supply circuit unit 1451 activates the cellular phone 1400 in an operational state by supplying power to the units from a battery pack.

The cellular phone 1400 performs various operations, such as transmission/reception of an audio signal, transmission/ reception of an e-mail and image data, image shooting, data recoding, and so forth, in various modes such as a voice call mode, a data communication mode, and so forth, based on the control of the main control unit 1450 made up of a CPU, ROM, RAM, and so forth.

For example, in the voice call mode, the cellular phone 1400 converts the audio signal collected by the microphone (mike) 1421 into digital audio data by the audio codec 1459, subjects this to spectrum spread processing at the modulation/demodulation circuit unit 1458, and subjects this to digital/analog conversion processing and frequency conversion processing at the transmission/reception circuit unit 1463. The cellular phone 1400 transmits the signal for transmission obtained by the conversion processing thereof to an unshown base station via the antenna 1414. The signal for transmission (audio signal) transmitted to the base station is supplied to the communication partner's cellular phone via the public telephone network.

Also, for example, in the voice call mode, the cellular phone 1400 amplifies the reception signal received at the antenna 1414, at the transmission/reception circuit unit 1463, further subjects to frequency conversion processing and analog/digital conversion processing, subjects to spectrum inverse spread processing at the modulation/demodulation circuit unit 1458, and converts into an analog audio signal by the audio codec 1459. The cellular phone 1400 outputs the converted and obtained analog audio signal thereof from the speaker 1417.

Further, for example, in the event of transmitting an e-mail in the data communication mode, the cellular phone 1400 accepts the text data of the e-mail input by the operation of the operation keys 1419 at the operation input control unit 1452. The cellular phone 1400 processes the text data thereof at the main control unit 1450, and displays on the liquid crystal display 1418 via the LCD control unit 1455 as an image.

Also, the cellular phone 1400 generates e-mail data at the main control unit 1450 based on the text data accepted by the operation input control unit 1452, the user's instructions, and so forth. The cellular phone 1400 subjects the e-mail data thereof to spectrum spread processing at the modulation/demodulation circuit unit 1458, and subjects to digital/analog conversion processing and frequency conversion processing at the transmission/reception circuit unit 1463. The cellular phone 1400 transmits the signal for transmission obtained by the conversion processing thereof to an unshown base station via the antenna 1414. The signal for transmission (e-mail) transmitted to the base station is supplied to a predetermined destination via the network, mail server, and so forth.

Also, for example, in the event of receiving an e-mail in the data communication mode, the cellular phone 1400 receives the signal transmitted from the base station via the antenna 1414 with the transmission/reception circuit unit 1463, amplifies, and further subjects to frequency conversion processing and analog/digital conversion processing. The cellular phone 1400 subjects the reception signal thereof to spectrum inverse spread processing at the modulation/demodulation circuit unit 1458 to restore the original e-mail data. The cellular phone 1400 displays the restored e-mail data on the liquid crystal display 1418 via the LCD control unit 1455.

Note that the cellular phone 1400 may record (store) the received e-mail data in the storage unit 1423 via the recording/playback unit 1462.

This storage unit 1423 is an optional rewritable recording medium. The storage unit 1423 may be semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 1423 may be other than these.

Further, for example, in the event of transmitting image data in the data communication mode, the cellular phone 1400 generates image data by imaging at the CCD camera 1416. The CCD camera 1416 includes a CCD serving as an optical device such as a lens, diaphragm, and so forth, and serving as a photoelectric conversion device, which images a subject, converts the intensity of received light into an electrical signal, and generates the image data of an image of the subject. The image data thereof is subjected to compression encoding at the image encoder 1453 using a predetermined encoding format, for example, such as MPEG2, MPEG4, or the like, via the camera I/F unit 1454, and accordingly, the image data thereof is converted into encoded image data.

The cellular phone 1400 employs the above-mentioned image encoding devices 51, 351, 451, and 551, as the image encoder 1453 for performing such processing. Accordingly, in the same way as with the image encoding devices 51 and 351, the image encoder 1453 sets filter coefficients according to the quantization parameter and prediction mode, and performs filtering processing of neighboring pixels, prior to intra prediction. Alternatively, in the same way as with the image encoding devices 451 and 551, the image encoder 1453 controls whether or not to perform filtering processing of neighboring pixels performed prior to intra prediction. Thus, encoding efficiency can be improved.

Note that, at this time simultaneously, the cellular phone 1400 converts the audio collected at the microphone (mike) 1421, while shooting with the CCD camera 1416, from analog to digital at the audio codec 1459, and further encodes this.

The cellular phone 1400 multiplexes the encoded image data supplied from the image encoder 1453, and the digital audio data supplied from the audio codec 1459 at the multiplexing/separating unit 1457 using a predetermined method. The cellular phone 1400 subjects the multiplexed data obtained as a result thereof to spectrum spread processing at the modulation/demodulation circuit unit 1458, and subjects to digital/analog conversion processing and frequency conversion processing at the transmission/reception circuit unit 1463. The cellular phone 1400 transmits the signal for transmission obtained by the conversion processing thereof to an unshown base station via the antenna 1414. The signal for transmission (image data) transmitted to the base station is supplied to the communication partner via the network or the like.

Note that in the event that image data is not transmitted, the cellular phone 1400 may also display the image data generated at the CCD camera 1416 on the liquid crystal display 1418 via the LCD control unit 1455 instead of the image encoder 1453.

Also, for example, in the event of receiving the data of a moving image file linked to a simple website or the like in the data communication mode, the cellular phone 1400 receives the signal transmitted from the base station at the transmission/reception circuit unit 1463 via the antenna 1414, amplifies, and further subjects to frequency conversion processing and analog/digital conversion processing. The cellular phone 1400 subjects the received signal to spectrum inverse spread processing at the modulation/demodulation circuit unit 1458 to restore the original multiplexed data. The cellular phone 1400 separates the multiplexed data thereof at the multiplexing/separating unit 1457 into encoded image data and audio data.

The cellular phone 1400 decodes the encoded image data at the image decoder 1456 using the decoding format corresponding to a predetermined encoding format such as MPEG2, MPEG4, or the like, thereby generating playback moving image data, and displays this on the liquid crystal display 1418 via the LCD control unit 1455. Thus, moving image data included in a moving image file linked to a simple website is displayed on the liquid crystal display 1418, for example.

The cellular phone 1400 employs the above-mentioned image decoding device 151, 401, 501, or 601 as the image decoder 1456 for performing such processing. Accordingly, in the same way as with the image decoding devices 151 and 401, the image decoder 1456 switches filter coefficients according to the quantization parameter and prediction mode, and performs filtering processing of neighboring pixels, prior to intra prediction. Alternatively, in the same way as with the image decoding devices 501 and 601, the image decoder 1456 controls whether or not to perform filtering processing of neighboring pixels performed prior to intra prediction, based on the on/off flag. Thus, encoding efficiency can be improved.

At this time, simultaneously, the cellular phone 1400 converts the digital audio data into an analog audio signal at the audio codec 1459, and outputs this from the speaker 1417. Thus, audio data included in a moving image file linked to a simple website is played, for example.

Note that, in the same way as with the case of e-mail, the cellular phone 1400 may record (store) the received data linked to a simple website or the like in the storage unit 1423 via the recording/playback unit 1462.

Also, the cellular phone 1400 analyzes the imaged two-dimensional code obtained by the CCD camera 1416 at the main control unit 1450, whereby information recorded in the two-dimensional code can be obtained.

Further, the cellular phone 1400 can communicate with an external device at the infrared communication unit 1481 using infrared rays.

The cellular phone 1400 employs the image encoding device 51, 351, 451, or 551 as the image encoder 1453, whereby the encoding efficiency of encoded data to be generated by encoding the image data generated at the CCD camera 1416 can be improved, for example. As a result, the cellular phone 1400 can provide encoded data (image data) with excellent encoding efficiency to another device.

Also, the cellular phone 1400 employs the image decoding device 151, 401, 501, or 601 as the image decoder 1456, whereby a prediction image with high precision can be generated. As a result thereof, the cellular phone 1400 can obtain a decoded image with higher precision from a moving image file linked to a simple website, and display this, for example.

Note that description has been made so far wherein the cellular phone 1400 employs the CCD camera 1416, but the cellular phone 1400 may employ an image sensor (CMOS image sensor) using CMOS (Complementary Metal Oxide Semiconductor) instead of this CCD camera 1416. In this case as well, the cellular phone 1400 can image a subject and generate the image data of an image of the subject in the same way as with the case of employing the CCD camera 1416.

Also, description has been made so far regarding the cellular phone 1400, but the image encoding devices 51, 351, 451, and 551, and the image decoding devices 151, 401, 501, and 601 may be applied to any kind of device in the same way as with the case of the cellular phone 1400 as long as it is a device having the same imaging function and communication function as those of the cellular phone 1400, for example, such as a PDA (Personal Digital Assistants), smart phone, UMPC (Ultra Mobile Personal Computer), net book, notebook-sized personal computer, or the like.

Figure 48:
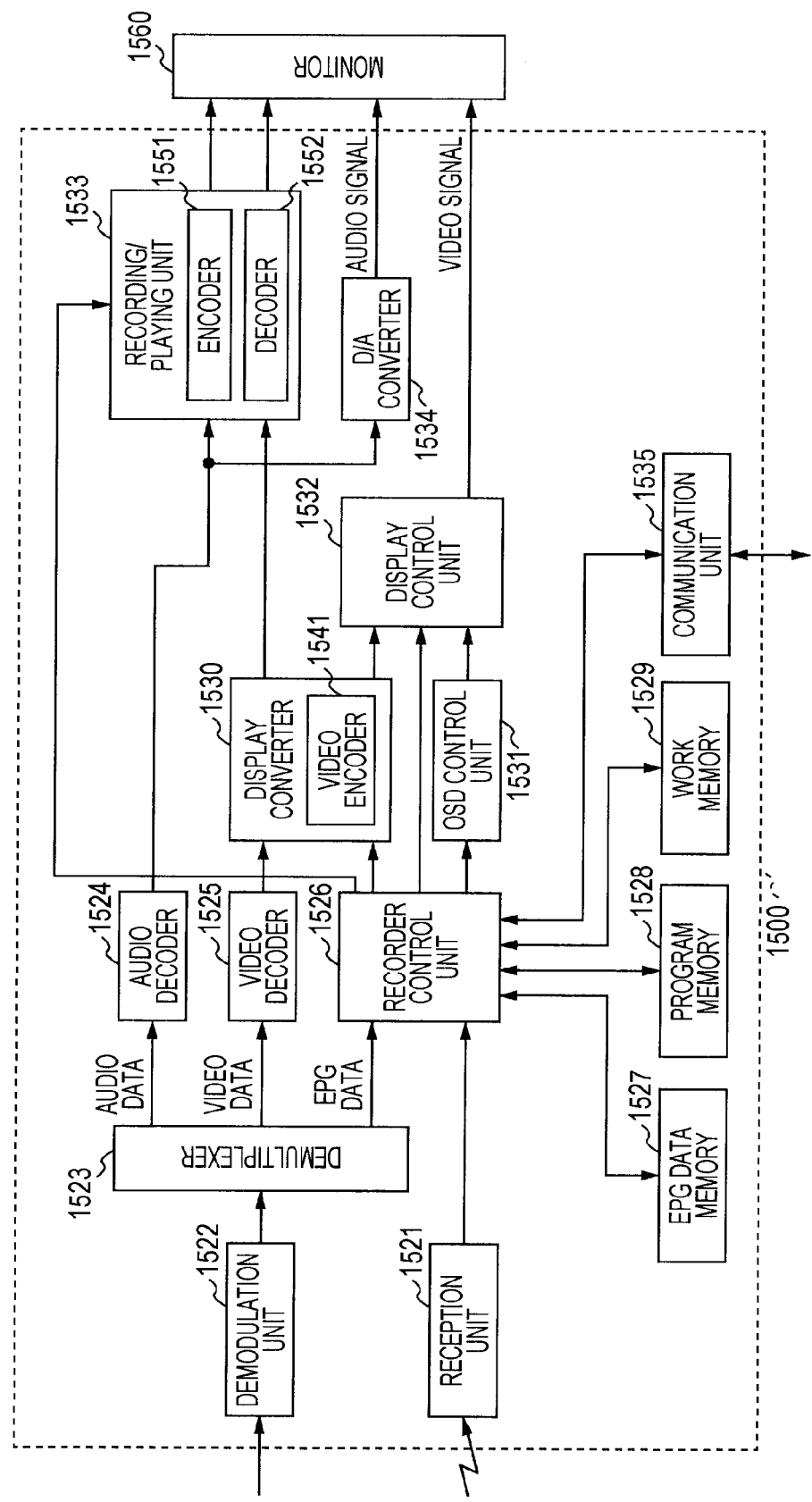
FIG. 48 is a block diagram illustrating a principal configuration example of a hard disk recorder to which the present invention has been applied.

FIG. 48 is a block diagram illustrating a principal configuration example of a hard disk recorder which employs the image encoding device and image decoding device to which the present invention has been applied.

A hard disk recorder (HDD recorder) 1500 shown in FIG. 48 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 1500 can extract audio data and video data from broadcast wave signals, decode these as appropriate, and store in the built-in hard disk, for example. Also, the hard disk recorder 1500 can also obtain audio data and video data from another device via the network, decode these as appropriate, and store in the built-in hard disk, for example.

Further, the hard disk recorder 1500 decodes audio data and video data recorded in the built-in hard disk, supplies to a monitor 1560, and displays an image thereof on the screen of the monitor 1560, for example. Also, the hard disk recorder 1500 can output audio thereof from the speaker of the monitor 1560.

The hard disk recorder 1500 decodes audio data and video data extracted from the broadcast wave signals obtained via the tuner, or the audio data and video data obtained from another device via the network, supplies to the monitor 1560, and displays an image thereof on the screen of the monitor 1560, for example. Also, the hard disk recorder 1500 can output audio thereof from the speaker of the monitor 1560.

It goes without saying that operations other than these may be performed.

As shown in FIG. 48, the hard disk recorder 1500 includes a reception unit 1521, a demodulation unit 1522, a demultiplexer 1523, an audio decoder 1524, a video decoder 1525, and a recorder control unit 1526. The hard disk recorder 1500 further includes EPG data memory 1527, program memory 1528, work memory 1529, a display converter 1530, an OSD (On Screen Display) control unit 1531, a display control unit 1532, a recording/playback unit 1533, a D/A converter 1534, and a communication unit 1535.

Also, the display converter 1530 includes a video encoder 1541. The recording/playback unit 1533 includes an encoder 1551 and a decoder 1552.

The reception unit 1521 receives the infrared signal from the remote controller (not shown), converts into an electrical signal, and outputs to the recorder control unit 1526. The recorder control unit 1526 is configured of, for example, a microprocessor and so forth, and executes various types of processing in accordance with the program stored in the program memory 1528. At this time, the recorder control unit 1526 uses the work memory 1529 according to need.

The communication unit 1535, which is connected to the network, performs communication processing with another device via the network. For example, the communication unit 1535 is controlled by the recorder control unit 1526 to communicate with a tuner (not shown), and to principally output a channel selection control signal to the tuner.

The demodulation unit 1522 demodulates the signal supplied from the tuner, and outputs to the demultiplexer 1523. The demultiplexer 1523 separates the data supplied from the demodulation unit 1522 into audio data, video data, and EPG data, and outputs to the audio decoder 1524, video decoder 1525, and recorder control unit 1526, respectively.

The audio decoder 1524 decodes the input audio data, for example, using the MPEG format, and outputs to the recording/playback unit 1533. The video decoder 1525 decodes the input video data, for example, using the MPEG format, and outputs to the display converter 1530. The recorder control unit 1526 supplies the input EPG data to the EPG data memory 1527 for storing.

The display converter 1530 encodes the video data supplied from the video decoder 1525 or recorder control unit 1526 into, for example, the video data conforming to the NTSC (National Television Standards Committee) format using the video encoder 1541, and outputs to the recording/playback unit 1533. Also, the display converter 1530 converts the size of the screen of the video data supplied from the video decoder 1525 or recorder control unit 1526 into the size corresponding to the size of the monitor 1560. The display converter 1530 further converts the video data of which the screen size has been converted into the video data conforming to the NTSC format using the video encoder 1541, converts into an analog signal, and outputs to the display control unit 1532.

The display control unit 1532 superimposes, under the control of the recorder control unit 1526, the OSD signal output from the OSD (On Screen Display) control unit 1531 on the video signal input from the display converter 1530, and outputs to the display of the monitor 1560 for display.

Also, the audio data output from the audio decoder 1524 has been converted into an analog signal using the D/A converter 1534, and supplied to the monitor 1560. The monitor 1560 outputs this audio signal from a built-in speaker.

The recording/playback unit 1533 includes a hard disk as a recording medium in which video data, audio data, and so forth are recorded.

The recording/playback unit 1533 encodes the audio data supplied from the audio decoder 1524 by the encoder 1551 using the MPEG format, for example. Also, the recording/playback unit 1533 encodes the video data supplied from the video encoder 1541 of the display converter 1530 by the encoder 1551 using the MPEG format. The recording/playback unit 1533 synthesizes the encoded data of the audio data thereof, and the encoded data of the video data thereof using the multiplexer. The recording/playback unit 1533 amplifies the synthesized data by channel coding, and writes the data thereof in the hard disk via a recording head.

The recording/playback unit 1533 plays the data recorded in the hard disk via a playback head, amplifies, and separates into audio data and video data using the demultiplexer. The recording/playback unit 1533 decodes the audio data and video data by the decoder 1552 using the MPEG format. The recording/playback unit 1533 converts the decoded audio data from digital to analog, and outputs to the speaker of the monitor 1560. Also, the recording/playback unit 1533 converts the decoded video data from digital to analog, and outputs to the display of the monitor 1560.

The recorder control unit 1526 reads out the latest EPG data from the EPG data memory 1527 based on the user's instructions indicated by the infrared signal from the remote controller which is received via the reception unit 1521, and supplies to the OSD control unit 1531. The OSD control unit 1531 generates image data corresponding to the input EPG data, and outputs to the display control unit 1532. The display control unit 1532 outputs the video data input from the OSD control unit 1531 to the display of the monitor 1560 for display. Thus, EPG (Electronic Program Guide) is displayed on the display of the monitor 1560.

Also, the hard disk recorder 1500 can obtain various types of data such as video data, audio data, EPG data, and so forth supplied from another device via the network such as the Internet or the like.

The communication unit 1535 is controlled by the recorder control unit 1526 to obtain encoded data such as video data, audio data, EPG data, and so forth transmitted from another device via the network, and to supply this to the recorder control unit 1526. The recorder control unit 1526 supplies the encoded data of the obtained video data and audio data to the recording/playback unit 1533, and stores in the hard disk, for example. At this time, the recorder control unit 1526 and recording/playback unit 1533 may perform processing such as re-encoding or the like according to need.

Also, the recorder control unit 1526 decodes the encoded data of the obtained video data and audio data, and supplies the obtained video data to the display converter 1530. The display converter 1530 processes, in the same way as the video data supplied from the video decoder 1525, the video data supplied from the recorder control unit 1526, supplies to the monitor 1560 via the display control unit 1532 for displaying an image thereof.

Alternatively, an arrangement may be made wherein in accordance with this image display, the recorder control unit 1526 supplies the decoded audio data to the monitor 1560 via the D/A converter 1534, and outputs audio thereof from the speaker.

Further, the recorder control unit 1526 decodes the encoded data of the obtained EPG data, and supplies the decoded EPG data to the EPG data memory 1527.

The hard disk recorder 1500 thus configured employs the image decoding device 151, 401, 501, or 601 as the video decoder 1525, decoder 1552, and a decoder housed in the recorder control unit 1526. Accordingly, in the same way as with the image decoding devices 151 and 401, the video decoder 1525, decoder 1552, and decoder housed in the recorder control unit 1526 switch filter coefficients according to the quantization parameter and prediction mode, and perform filtering processing of neighboring pixels, prior to intra prediction. Alternatively, in the same way as with the image decoding devices 501 and 601, the video decoder 1525, decoder 1552, and decoder housed in the recorder control unit 1526 control whether or not to perform filtering processing of neighboring pixels performed prior to intra prediction, based on the on/off flag. Thus, encoding efficiency can be improved.

Accordingly, the hard disk recorder 1500 can generate a prediction image with high precision. As a result thereof, the hard disk recorder 1500 can obtain a decoded image with higher precision, for example, from the encoded data of video data received via the tuner, the encoded data of video data read out from the hard disk of the recording/playback unit 1533, or the encoded data of video data obtained via the network, and display on the monitor 1560.

Also, the hard disk recorder 1500 employs the image encoding device 51, 351, 451, or 551 as the encoder 1551. Accordingly, in the same way as with the image encoding devices 51 and 351, the encoder 1551 sets filter coefficients according to the quantization parameter and prediction mode, and performs filtering processing of neighboring pixels, prior to intra prediction. Alternatively, in the same way as with the image encoding devices 451 and 551, the encoder 1551 controls whether or not to perform filtering processing of neighboring pixels performed prior to intra prediction. Thus, encoding efficiency can be improved.

Accordingly, the hard disk recorder 1500 can improve the encoding efficiency of encoded data to be recorded in the hard disk, for example. As a result thereof, the hard disk recorder 1500 can use the storage region of the hard disk in a more effective manner.

Note that description has been made so far regarding the hard disk recorder 1500 for recording video data and audio data in the hard disk, but it goes without saying that any kind of recording medium may be employed. For example, even with a recorder to which a recording medium other than a hard disk, such as flash memory, optical disc, a video tape, or the like, is applied, in the same way as with the case of the above-mentioned hard disk recorder 1500, the image encoding devices 51, 351, 451, and 551, and the image decoding devices 151, 401, 501, and 601 can be applied thereto.

Figure 49:
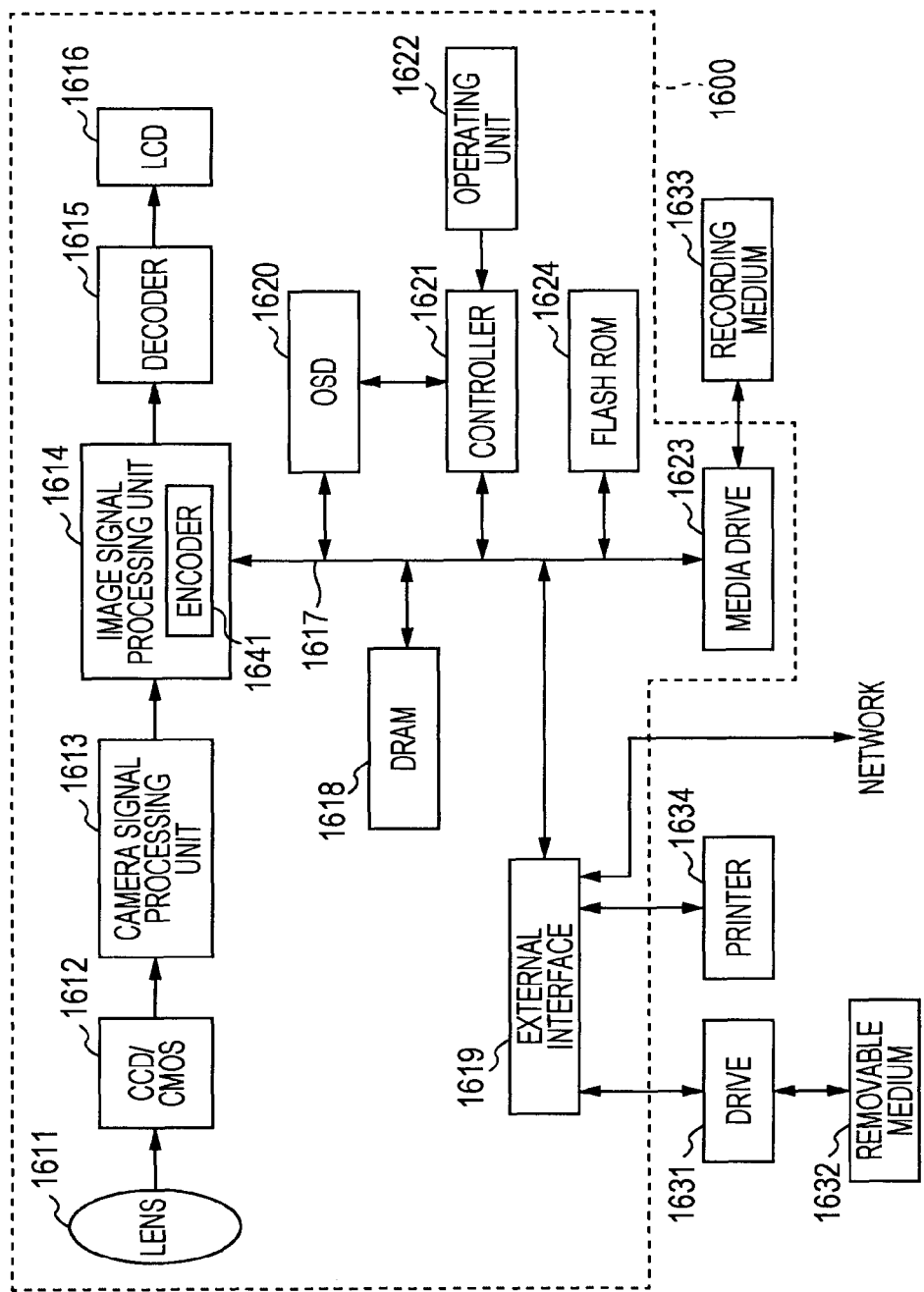
FIG. 49 is a block diagram illustrating a principal configuration example of a camera to which the present invention has been applied.

FIG. 49 is a block diagram illustrating a principal configuration example of a camera employing the image decoding device and image encoding device to which the present invention has been applied.

A camera 1600 shown in FIG. 49 images a subject, displays an image of the subject on an LCD 1616, and records this in a recording medium 1633 as image data.

A lens block 1611 inputs light (i.e., video of a subject) to a CCD/CMOS 1612. The CCD/CMOS 1612 is an image sensor employing a CCD or CMOS, converts the intensity of received light into an electrical signal, and supplies to a camera signal processing unit 1613.

The camera signal processing unit 1613 converts the electrical signal supplied from the CCD/CMOS 1612 into color difference signals of Y, Cr, and Cb, and supplies to an image signal processing unit 1614. The image signal processing unit 1614 subjects, under the control of a controller 1621, the image signal supplied from the camera signal processing unit 1613 to predetermined image processing, or encodes the image signal thereof by an encoder 1641 using the MPEG format for example. The image signal processing unit 1614 supplies encoded data generated by encoding an image signal, to a decoder 1615. Further, the image signal processing unit 1614 obtains data for display generated at an on-screen display (OSD) 1620, and supplies this to the decoder 1615.

With the above-mentioned processing, the camera signal processing unit 1613 appropriately takes advantage of DRAM (Dynamic Random Access Memory) 1618 connected via a bus 1617 to hold image data, encoded data encoded from the image data thereof, and so forth in the DRAM 1618 thereof according to need.

The decoder 1615 decodes the encoded data supplied from the image signal processing unit 1614, and supplies obtained image data (decoded image data) to the LCD 1616. Also, the decoder 1615 supplies the data for display supplied from the image signal processing unit 1614 to the LCD 1616. The LCD 1616 synthesizes the image of the decoded image data, and the image of the data for display, supplied from the decoder 1615 as appropriate, and displays a synthesizing image thereof.

The on-screen display 1620 outputs, under the control of the controller 1621, data for display such as a menu screen or icon or the like made up of a symbol, characters, or a figure to the image signal processing unit 1614 via the bus 1617.

Based on a signal indicating the content commanded by the user using an operating unit 1622, the controller 1621 executes various types of processing, and also controls the image signal processing unit 1614, DRAM 1618, external interface 1619, on-screen display 1620, media drive 1623, and so forth via the bus 1617. A program, data, and so forth necessary for the controller 1621 executing various types of processing are stored in FLASH ROM 1624.

For example, the controller 1621 can encode image data stored in the DRAM 1618, or decode encoded data stored in the DRAM 1618 instead of the image signal processing unit 1614 and decoder 1615. At this time, the controller 1621 may perform encoding and decoding processing using the same format as the encoding and decoding format of the image signal processing unit 1614 and decoder 1615, or may perform encoding and decoding processing using a format that neither the image signal processing unit 1614 nor the decoder 1615 can handle.

Also, for example, in the event that start of image printing has been instructed from the operating unit 1622, the controller 1621 reads out image data from the DRAM 1618, and supplies this to a printer 1634 connected to the external interface 1619 via the bus 1617 for printing.

Further, for example, in the event that image recording has been instructed from the operating unit 1622, the controller 1621 reads out encoded data from the DRAM 1618, and supplies this to a recording medium 1633 mounted on the media drive 1623 via the bus 1617 for storing.

The recording medium 1633 is an optional readable/writable removable medium, for example, such as a magnetic disk, a magneto-optical disk, an optical disc, semiconductor memory, or the like. It goes without saying that the recording medium 1633 is also optional regarding the type of a removable medium, and accordingly may be a tape device, or may be a disc, or may be a memory card. It goes without saying that the recoding medium 1633 may be a non-contact IC card or the like.

Alternatively, the media drive 1623 and the recording medium 1633 may be configured so as to be integrated into a non-transportability recording medium, for example, such as a built-in hard disk drive, SSD (Solid State Drive), or the like.

The external interface 1619 is configured of, for example, a USB input/output terminal and so forth, and is connected to the printer 1634 in the event of performing printing of an image. Also, a drive 1631 is connected to the external interface 1619 according to need, on which the removable medium 1632 such as a magnetic disk, optical disc, or magneto-optical disk is mounted as appropriate, and a computer program read out therefrom is installed in the FLASH ROM 1624 according to need.

Further, the external interface 1619 includes a network interface to be connected to a predetermined network such as a LAN, the Internet, or the like. For example, in accordance with the instructions from the operating unit 1622, the controller 1621 can read out encoded data from the DRAM 1618, and supply this from the external interface 1619 to another device connected via the network. Also, the controller 1621 can obtain, via the external interface 1619, encoded data or image data supplied from another device via the network, and hold this in the DRAM 1618, or supply this to the image signal processing unit 1614.

The camera 1600 thus configured employs the image decoding device 151, 401, 501, or 601 as the decoder 1615. Accordingly, in the same way as with the image decoding devices 151 and 401, the decoder 1615 switches filter coefficients according to the quantization parameter and prediction mode, and performs filtering processing of neighboring pixels, prior to intra prediction. Alternatively, in the same way as with the image decoding devices 501 and 601, the decoder 1615 controls whether or not to perform filtering processing of neighboring pixels performed prior to intra prediction, based on the on/off flag. Thus, encoding efficiency can be improved.

Accordingly, the camera 1600 can generate a prediction image with high precision. As a result thereof, the camera 1600 can obtain a decoded image with higher precision, for example, from the image data generated at the CCD/CMOS 1612, the encoded data of video data read out from the DRAM 1618 or recording medium 1633, or the encoded data of video data obtained via the network, and display on the LCD 1616.

Also, the camera 1600 employs the image encoding device 51, 351, 451, or 551, as the encoder 1641. Accordingly, in the same way as with the image encoding devices 51 and 351, the encoder 1641 sets filter coefficients according to the quantization parameter and prediction mode, and performs filtering processing of neighboring pixels, prior to intra prediction. Alternatively, in the same way as with the image encoding devices 451 and 551, the encoder 1641 controls whether or not to perform filtering processing of neighboring pixels performed prior to intra prediction. Thus, encoding efficiency can be improved.

Accordingly, the camera 1600 can improve encoding efficiency of encoded data to be recorded in the hard disk, for example. As a result thereof, the camera 1600 can use the storage region of the DRAM 1618 or recording medium 1633 in a more effective manner.

Note that the decoding method of the image decoding devices 151, 401, 501, and 601 may be applied to the decoding processing that the controller 1621 performs. Similarly, the encoding method of the image encoding devices 51, 351, 451, and 551 may be applied to the encoding processing that the controller 1621 performs.

Also, the image data that the camera 1600 images may be a moving image, or may be a still image.

It goes without saying that the image encoding devices 51, 351, 451, and 551, and the image decoding devices 151, 401, 501, and 601 may be applied to a device or system other than the above-mentioned devices.

REFERENCE SIGNS LIST 51 image encoding device
66 lossless encoding unit
74 intra prediction unit
75 neighboring pixel interpolation filter switching unit
81 neighboring pixel setting unit
82 prediction image generating unit
83 optimal prediction mode determining unit
91 prediction mode buffer
92 quantization parameter buffer
93 low-pass filter setting unit
94 frame coefficient memory
111 neighboring pixel setting unit
112 prediction image generating unit
113 optimal prediction mode determining unit
121 prediction mode buffer
122 optimal filter calculating unit
151 image decoding device
162 lossless decoding unit
171 intra prediction unit
172 neighboring pixel interpolation filter switching unit
181 prediction image generating unit
182 neighboring pixel setting unit
191 prediction mode buffer
192 quantization parameter buffer
193 low-pass filter setting unit
194 filter coefficient memory
202 low-pass filter setting unit
251 learning device
261 neighboring interpolation filter calculating unit
271 filter coefficient storage unit
351 image encoding device
361 second order prediction unit
362 neighboring pixel interpolation filter switching unit
401 image decoding device
411 second order prediction unit
412 neighboring pixel interpolation filter switching unit
451 image encoding device
461 neighboring pixel interpolation filter control unit
501 image decoding device
511 neighboring pixel interpolation filter control unit
551 image encoding device
561 neighboring pixel interpolation filter control unit
601 image decoding device
611 neighboring pixel interpolation filter control unit

The invention claimed is:

1. An image processing device comprising:
    filter control unit configured to perform, on the basis of an intra prediction mode, filter processing turned on or off as to neighboring pixels that are adjacently located to a current block for intra prediction, which is to be the object of encoding processing, the neighboring pixels subjected to the filter processing turned on or off being used as reference pixels for the intra prediction of the current block;
    intra prediction unit configured to perform intra prediction on the current block using the reference pixels to generate a prediction image; and
    encoding unit configured to encode an image of said current block using the prediction image,
    wherein the neighboring pixels are not included within the current block,
    wherein the filter processing changes value of respective pixels being filtered,
    wherein the filter control unit determines filter processing on or filter processing off as to the neighboring pixels on the basis of a mode number of the intra prediction mode,
    wherein the filter control unit determines filter processing on or filter processing off on the basis of a control data indicating whether or not to perform filter processing on the current block, and
    wherein at least one of the filter control unit, the intra prediction unit, and the encoding unit is implemented via a processor.

2. The image processing device according to claim 1, wherein said decoding means decode the mode of intra prediction of said current block,
    wherein a filter setting means sets a coefficient in accordance with a mode of intra prediction decoded by said decoding means, wherein said coefficient is configured of a filter coefficient and offset value.

3. The image processing device according to claim 1, further comprising:
    a modulation/demodulation circuit unit configured to subject the object of decoding processing to at least one of spectrum spread processing and spectrum inverse spread processing,
    wherein the modulation/demodulation circuit unit is implemented via a processor.

4. The image processing device according to claim 1, wherein the neighboring pixels border to the current block but are not included within pixels of the current block.

5. An image processing method comprising the steps of:
    performing, on the basis of an intra prediction mode, filter processing turned on or off as to neighboring pixels that are adjacently located to a current block for intra prediction, which is to be the object of encoding processing, the neighboring pixels subjected to the filter processing turned on or off being used as reference pixels for the intra prediction of the current block;

performing intra prediction on the current block using the reference pixels to generate a prediction image; and encoding an image of said current block using the prediction image, wherein the neighboring pixels are not included within the current block, wherein the filter processing changes value of respective pixels being filtered, wherein the filter processing on or filter processing off is performed as to the neighboring pixels on the basis of a mode number of the intra prediction mode, and wherein the filter processing on or filter processing off is performed on the basis of a control data indicating whether or not to perform filter processing on the current block.

6. The image processing device according to claim 3, further comprising:

a transmission/reception circuit unit configured to subject a signal received from the modulation/demodulation circuit to frequency conversion processing and digital/analog conversion processing, wherein the transmission/reception circuit unit is implemented via a processor.

7. The image processing device according to claim 6, further comprising:

a multiplexing/separating circuit unit configured to subject an audio data and the image to at least one of modulating processing and separating processing, wherein the multiplexing/separating circuit unit is implemented via a processor.

8. The image processing device according to claim 7, further comprising:

a power supply circuit unit configured to activate the image processing device in an operational state by supplying power, wherein the power supply circuit unit is implemented via a processor.

9. The image processing method according to claim 5, wherein a filter coefficient set in accordance with a mode of the intra prediction mode is configured of three taps.

10. The image processing method according to claim 5, wherein a filter coefficient set in accordance with a mode of the intra prediction mode has symmetry centered on a coefficient corresponding to zero-phase.

11. The image processing method according to claim 5, wherein the neighboring pixels border to the current block but are not included within pixels of the current block.

* * * * *